United States Patent
Hirata et al.

(10) Patent No.: US 11,601,786 B2
(45) Date of Patent: Mar. 7, 2023

(54) POSTING RIGHT GIVING DEVICE, POSTING RIGHT GIVING METHOD, AND POSTING RIGHT GIVING PROGRAM

(71) Applicant: Rakuten Group, Inc., Tokyo (JP)

(72) Inventors: Yoshihiro Hirata, Tokyo (JP); Yasuaki Shirogane, Tokyo (JP); Takashi Shirota, Tokyo (JP); Yutaka Tachi, Tokyo (JP); Kenji Fukuda, Tokyo (JP)

(73) Assignee: Raukten Group, Inc., Tokyo (JP)

( * ) Notice: Subject to any disclaimer, the term of this patent is extended or adjusted under 35 U.S.C. 154(b) by 0 days.

(21) Appl. No.: 17/070,555

(22) Filed: Oct. 14, 2020

(65) Prior Publication Data
US 2021/0152987 A1 May 20, 2021

(30) Foreign Application Priority Data

Oct. 16, 2019 (JP) .............................. JP2019-189552
Jan. 21, 2020 (JP) .............................. JP2020-007575

(51) Int. Cl.
*H04W 4/21* (2018.01)
*H04W 4/021* (2018.01)
*H04W 4/029* (2018.01)

(52) U.S. Cl.
CPC ............. *H04W 4/21* (2018.02); *H04W 4/021* (2013.01); *H04W 4/029* (2018.02)

(58) Field of Classification Search
CPC ........ H04W 4/21; H04W 4/021; H04W 4/029
See application file for complete search history.

(56) References Cited

U.S. PATENT DOCUMENTS

| 2010/0317392 A1* | 12/2010 | Davis | H04W 4/02 455/518 |
| 2012/0197986 A1 | 8/2012 | Chen et al. | |
| 2013/0173798 A1* | 7/2013 | Micucci | H04W 4/21 709/225 |

(Continued)

FOREIGN PATENT DOCUMENTS

| AU | 2013303098 A1 * | 2/2015 | ......... G06F 16/9535 |
| JP | 2007-306409 A | 11/2007 | |

(Continued)

*Primary Examiner* — Charles N Appiah
*Assistant Examiner* — Frank E Donado
(74) *Attorney, Agent, or Firm* — Sughrue Mion, PLLC

(57) ABSTRACT

A posting right giving device acquires region information indicating a region designated by an establisher requesting creation of a community. The posting right giving device stores the acquired region information and community identification information for identifying the community in association with each other in a storage. The posting right giving device acquires positional information indicating a position of a terminal device used by a user different from the establisher. The posting right giving device executes, when the position indicated by the acquired positional information is included in the region indicated by the stored region information, processing for giving the user a right to post information to the community identified with the community identification information stored in association with the region information. The right to post information allows the user to post the information regardless of whether the terminal device is located within the region.

16 Claims, 41 Drawing Sheets

(56) References Cited

U.S. PATENT DOCUMENTS

| | | | | |
|---|---|---|---|---|
| 2014/0237053 A1* | 8/2014 | Abhyanker | ............ | G06Q 10/087 |
| | | | | 709/204 |
| 2014/0337938 A1* | 11/2014 | Abhyanker | ............ | G06Q 50/01 |
| | | | | 726/5 |
| 2014/0344895 A1 | 11/2014 | Jimenez Arreola et al. | | |
| 2019/0108495 A1* | 4/2019 | Narayanan | ............ | G06Q 50/01 |
| 2019/0158980 A1* | 5/2019 | Holden | ............ | H04W 4/21 |

FOREIGN PATENT DOCUMENTS

| | | |
|---|---|---|
| JP | 2009-266182 A | 11/2009 |
| JP | 2010-055222 A | 3/2010 |
| JP | 2010-273096 A | 12/2010 |
| JP | 2011-55053 A | 3/2011 |
| JP | 2013-161329 A | 8/2013 |

* cited by examiner

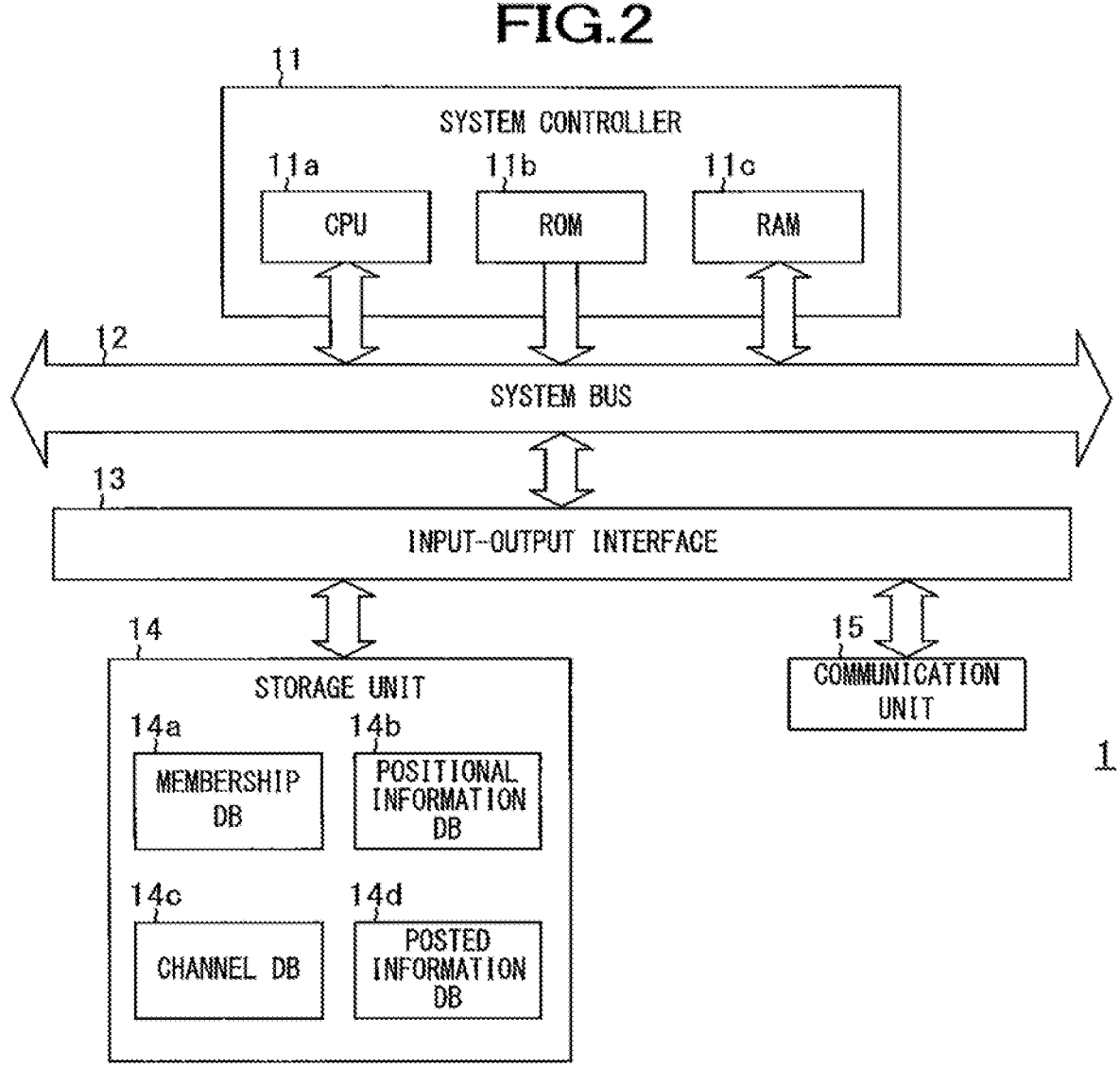

FIG.3

MEMBERSHIP DB — 14a
- USER ID
- NICKNAME
- GENDER
- DATE OF BIRTH
- TELEPHONE NUMBER
- EMAIL ADDRESS
- ADDRESS
- PREFERENCE INFORMATION
- NOTIFICATION CHANNEL LIST
- JOINED CHANNEL LIST
- . . .

POSITIONAL INFORMATION DB — 14b
- USER ID
- RECORDING DATE AND TIME
- TERMINAL POSITIONAL INFORMATION
- . . .

CHANNEL DB — 14c
- CHANNEL ID
- ESTABLISHER ID
- CHANNEL NAME
- CHANNEL OUTLINE
- TAG INFORMATION
- REGION INFORMATION
- JOINABLE PERIOD
- PUBLIC TYPE
- MEMBER LIST
- . . .

POSTED INFORMATION DB — 14d
- CHANNEL ID
- USER ID
- POSTED DATE AND TIME
- POSTED INFORMATION
- . . .

FIG.21

CHANNEL DB — 14c
- CHANNEL ID
- ESTABLISHER ID
- CHANNEL NAME
- CHANNEL OUTLINE
- TAG INFORMATION
- REGION INFORMATION
- JOINABLE PERIOD
- PUBLIC TYPE
- MEMBER LIST
- SUBCOMMUNITY LIST
- . . .

SUBCOMMUNITY DB — 14e
- COMMUNITY ID
- CHANNEL ID
- ESTABLISHER ID
- COMMUNITY NAME
- COMMUNITY OUTLINE
- REGION INFORMATION
- JOINABLE PERIOD
- PUBLIC TYPE
- MEMBER LIST
- . . .

FIG.35
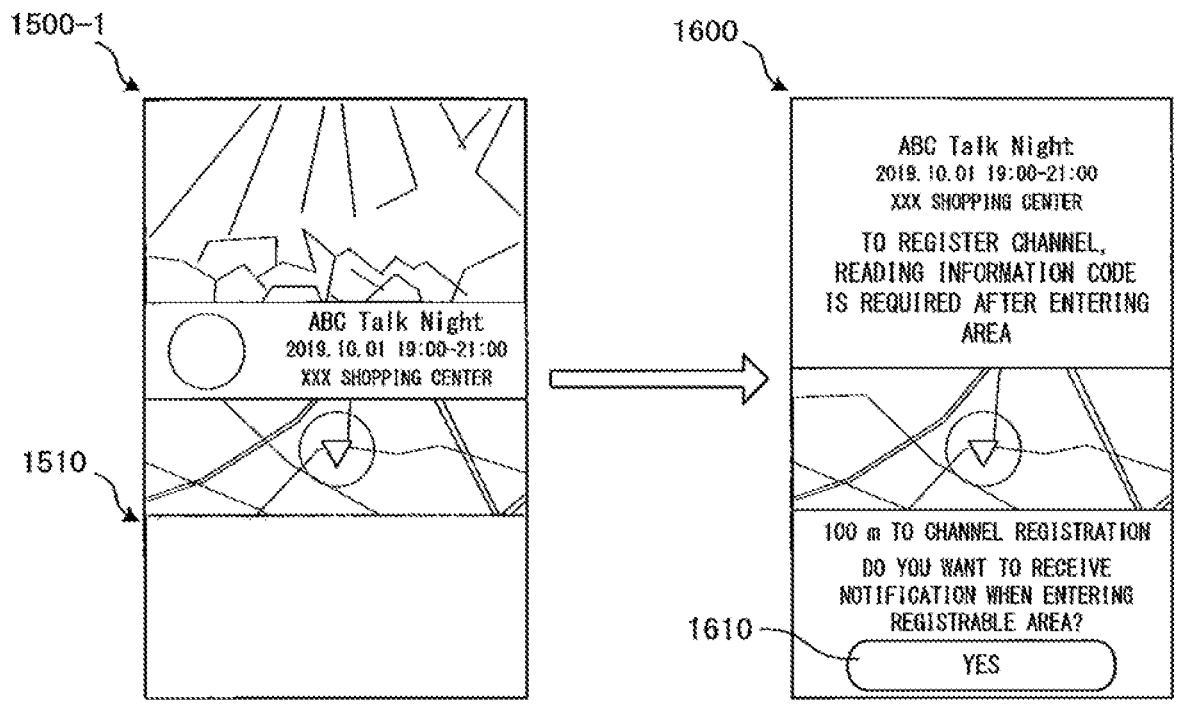
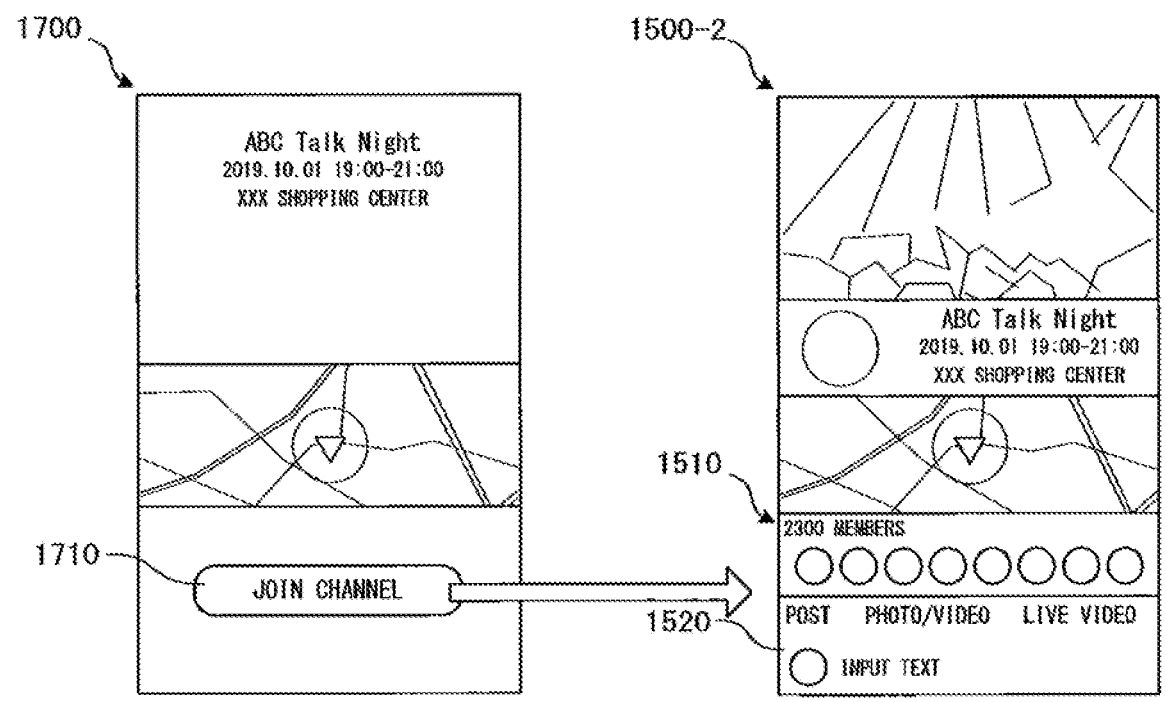

FIG.39

| REGION DB | 14c-2 |
|---|---|
| REGION ID | |
| REGION INFORMATION | REGION TYPE |
| . . . | |

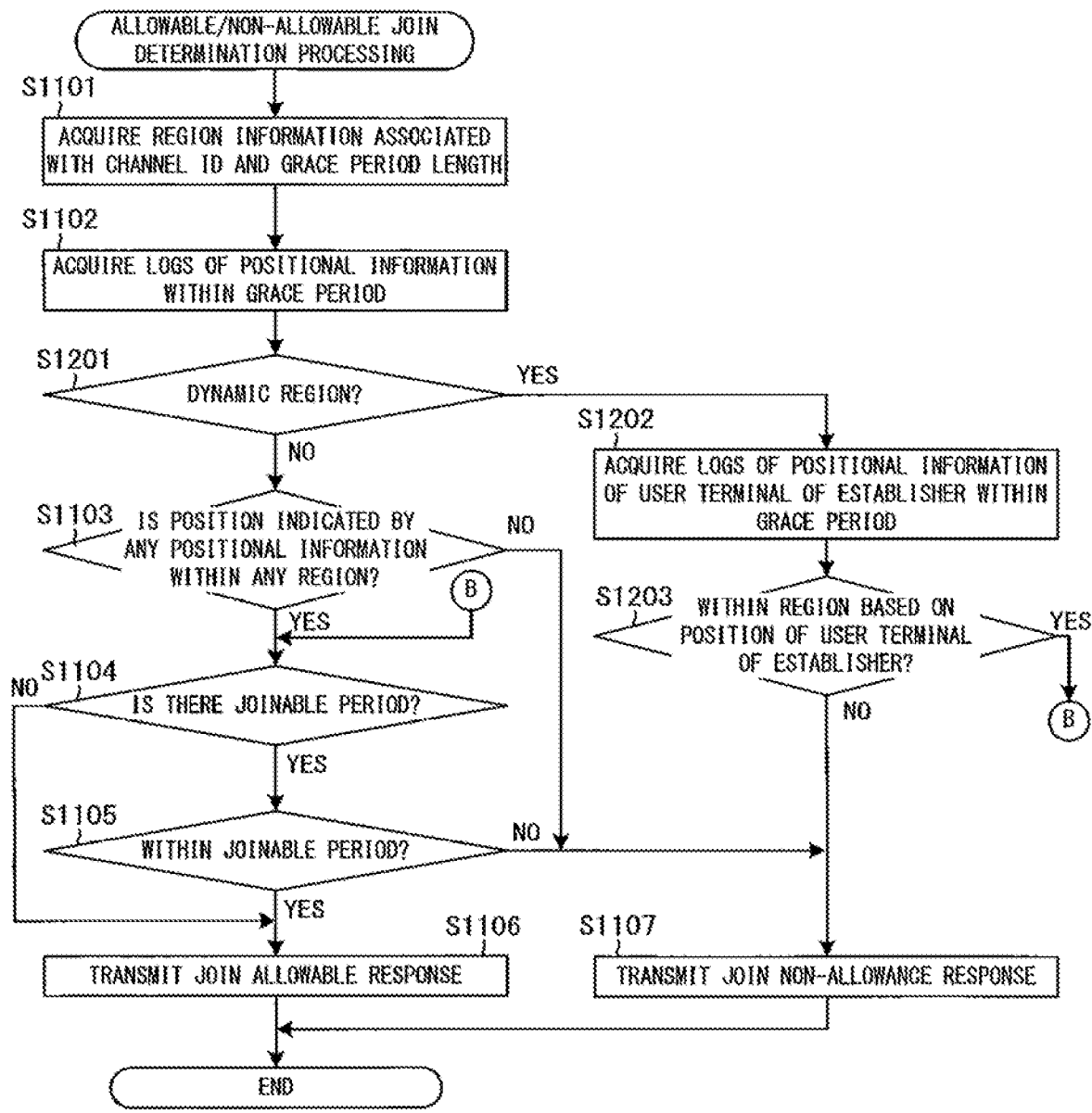

POSTING RIGHT GIVING DEVICE, POSTING RIGHT GIVING METHOD, AND POSTING RIGHT GIVING PROGRAM

CROSS-REFERENCE TO RELATED PATENT APPLICATION

This application claims priority from Japanese Patent Application No. 2019-189552 filed Oct. 16, 2019, and Japanese Patent Application No. 2020-7575, filed Jan. 21, 2020, the entire disclosures of which, including the specification, the scope of claims, drawings, and abstract, are incorporated herein by reference in their entirety.

TECHNICAL FIELD

The present invention relates to a technical field of a method of allowing a user to join a community on a network.

BACKGROUND

Currently, systems that enable information exchange between users via a network have come into wide use such as, for example, social networking services (SNS) (for example, JP 2010-055222 A). Such a system allows access by specific or unspecific users to information posted by a certain user. It is generally possible to create an Internet community for the purpose of exchanging information between users who have common interests or concerns. Usually, only users who have joined the community can post information to the community.

Conventionally, systems using an information code such as a one-dimensional code and two-dimensional code are known. For: example, some required information is encoded to generate an information code. The information code is displayed on a screen or printed on some object. The information code displayed in this way is optically read by a terminal device. The read information code is decoded to restore original information. Predetermined processing is executed using the restored information. For example, JP 2009-266182 A discloses a system for confirming a visit that accesses a server in a center by reading a card with a QR code (registered trademark) or the like with a cellular phone or a portable terminal and informs a client, company, or parent of start and end times or a message by email.

SUMMARY

If any user can easily join such a community, there is a high probability that a considerable number of users who are not very interested in an object about which information should be exchanged in the community will also join the community. This may lower the quality of information posted to the community. However, if conditions for users who can join the community are too strict, the number of members of the community will decrease. In that case, the information exchange in the community may become inactive.

Incidentally, a system is assumed that allows a user to join a specific community by a terminal device used by the user reading an information code. In this case, the information code may be generated, for example, by encoding information with which the community can be identified. For example, it can be considered that the generated information code is displayed in a place related to the community, that a person concerned in the community hands out a printed matter of the information code, and that the information code is displayed on a terminal device of the person concerned. When the information code displayed in this way is read by the user's terminal device, joining the community is permitted.

However, the information code can be easily copied and spread. For example, there is a possibility that an image of the information code will be photographed and the image of the information code will be transmitted by email, instant message, or other means. In view of such a circumstance, if any user can easily join the community because the user has read the information code, there is a high probability that a considerable number of users who are not very interested in an object about which information should be exchanged in the community will also join the community. This may lower the quality of information posted to the community.

The present invention has been made in view of the above points, and one example of problems to be solved by the present invention is to provide a posting right giving device, a posting right giving method, and a posting right giving program that make it possible to form a community from users who have no less than a certain degree of interest in an object about which information is exchanged in the community.

Solution to Problem

An aspect on the present invention is a posting right giving device comprising: at least one memory configured to store computer program code; and at least one processor configured to access the at least one memory and operate according to the computer program code, the computer program code comprising: a region information acquisition code configured to cause at least one of the at least one processor to acquire region information indicating a region designated by an establisher requesting creation of a community in which posting information and receiving the posted information via a network are allowed; a storage control code configured to cause at least one of the at least one processor to store the acquired region information and community identification information for identifying the community in association with each other in a storage; a positional information acquisition code configured to cause at least one of the at least one processor to acquire positional information indicating a position of a terminal device used by a user different from the establisher; and a giving code configured to cause at least one of the at least one processor to execute, in response to the position indicated by the acquired positional information being included in the region indicated by the stored region information, processing for giving the user a right to post information to the community identified with the community identification information stored in association with the region information, the right to post information allowing the user to post the information regardless of whether the terminal device is located within the region.

Another aspect of the present invention is a posting right giving method performed by a computer, the method comprising: acquiring region information indicating a region designated by an establisher requesting creation of a community in which posting information and receiving the posted information via a network are allowed; storing the acquired region information and community identification information for identifying the community in association with each other in a storage; acquiring positional information indicating a position of a terminal device used by a user different from the establisher, and executing, in response to the position indicated by the acquired positional information being included in the region indicated by the stored region information, processing for giving the user a right to post information to the community identified with the community identification information stored in association with the region information, the right to post information allowing the user to post the information regardless of whether the terminal device is located within the region.

Yet another aspect of the present invention is a non-transitory computer readable medium storing thereon a computer program, the computer program causing a computer to: acquire region information indicating a region designated by an establisher requesting creation of a community in which posting information and receiving the posted information via a network are allowed; store the acquired region information and community identification information for identifying the community in association with each other in a storage; acquire positional information indicating a position of a terminal device used by a user different from the establisher; and execute, in response to the position indicated by the acquired positional information being included in the region indicated by the stored region information, processing for giving the user a right to post information to the community identified with the community identification information stored in association with the region information, the right to post information allowing the user to post the information regardless of whether the terminal device is located within the region.

Yet another aspect on the present invention is a posting right giving device comprising: at least one memory configured to store computer program code; and at least one processor configured to access the at least one memory and operate according to the computer program code, the computer program code comprising: a positional information acquisition code configured to cause at least one of the at least one processor to acquire positional information indicating a position of a user terminal; a region information acquisition code configured to cause at least one of the at least one processor to acquire, in response to an information code corresponding to a community being read by the terminal device, region information indicating a region corresponding to the community from a storage, posting information and receiving the posted information via a network being allowed in the community; and a giving code configured to cause at least one of the at least one processor to give, in response to the position of the terminal device indicated by the acquired positional information is included in the region indicated by the acquired region information, a right to a user of the terminal device to post information to the community, the right to post information allowing the user to post the information regardless of whether the terminal device is located within the region.

Yet another aspect on the present invention is a posting right giving method performed by a computer, the method comprising: acquiring positional information indicating a position of a user terminal; acquiring, in response to an information code corresponding to a community being read by the terminal device, region information indicating a region corresponding to the community from a storage, posting information and receiving the posted information via a network being allowed in the community; and giving, in response to the position of the terminal device indicated by the acquired positional information is included in the region indicated by the acquired region information, a right to a user of the terminal device to post information to the community, the right to post information allowing the user to post the information regardless of whether the terminal device is located within the region.

Yet another aspect or the present invention is a non-transitory computer readable medium storing thereon a computer program, the computer program causing a computer to: acquire positional information indicating a position of a user terminal; acquire, in response to an information code corresponding to a community being read by the terminal device, region information indicating a region corresponding to the community from a storage, posting information and receiving the posted information via a network being allowed in the community; and give, in response to the position of the terminal device indicated by the acquired positional information is included in the region indicated by the acquired region information, a right to a user of the terminal device to post information to the community, the right to post information allowing the user to post the information regardless of whether the terminal device is located within the region.

BRIEF DESCRIPTION OF DRAWINGS

FIG. 2 is a block diagram showing one example of a schematic configuration of a center server according to one embodiment;

FIG. 3 is a diagram showing one example of details stored in databases;

FIG. 21 is a diagram showing an example of information stored in the channel DB and a subcommunity DB in one embodiment;

FIG. 35 is a view showing screen examples in a dedicated application;

FIG. 39 is a diagram showing an example of information stored in the region DB in one embodiment;

FIG. 41 is a flowchart showing one example of the allowable/non-allowable join determination processing by the system controller of the renter server according to one embodiment.

DETAILED DESCRIPTION

Embodiments of the present invention will be described in detail below with reference to the drawings. In the embodiments described below, each Internet community is referred to as a channel.

1. First Embodiment

[1-1. Configuration of Channel System]

Figure 1:
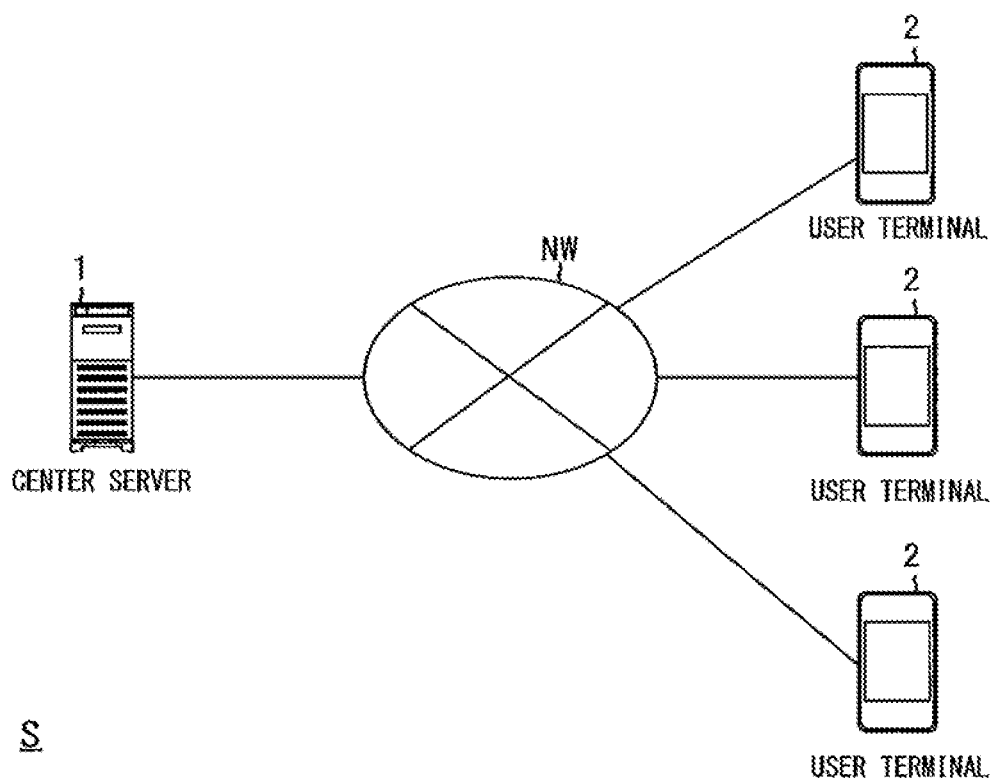
FIG. 1 is a diagram showing one example of a schematic configuration of a channel system according to one embodiment.

To begin with, a configuration and functional outline of a channel system S according to the present embodiment will be described with reference to FIG. 1. FIG. 1 is a diagram showing one example of the schematic configuration of the channel system S according to the present embodiment.

As shown in FIG. 1, the channel system S includes a center server 1 and a plurality of user terminals 2. The center server 1 and each user terminal. 2 are connected to each other via a network NW. The network NW includes, for example, the Internet, a dedicated communication line (for example, community antenna television (CATV) line), a mobile communication network (including base stations and the like), a gateway, and the like.

The center server 1 manages channels in which information is exchanged. Each member of the channel can post information to the channel and receive information posted to the channel via the network NW by using the user terminal 2. Examples of an information exchange method in the channel include a bulletin board method, a chat method, and the like. The center server 1 performs processing for controlling creation of the channel, user's joining the channel, exchange of information between users enrolled in the channel, and the like.

Each user terminal 2 is a portable terminal device to be used by a user who uses the channel system S. Examples of the user terminal 2 include a portable information terminal such as a smartphone and a tablet computer, a cellular phone, a personal digital assistant (PDA), and the like. Each user terminal 2 has a function of acquiring positional information indicating the position of the user terminal 2. For example, a satellite positioning system such as global positioning system (GPS) may be used to calculate the latitude and longitude as the positional information. For example, a mobile communication carrier may provide the user terminal 2 with positional information using base stations. In this case, the user terminal 2 acquires the latitude and longitude, address or zip code corresponding to the position of a base station near the user terminal 2 as the positional information. Alternatively, for example, the positional information may be able to be acquired by using a wireless local area network (LAN). For example, when receiving wireless signals from a plurality of access points, the user terminal. 2 measures radio field intensity from each access point and acquires a service set identifier (SSID) of each access point. The user terminal 2 transmits information including the radio field intensity and the SSID to a predetermined server device (not shown). The server device stores the latitude and longitude of installation positions of the access points and other information. The server device uses the information received from the user terminal 2 to calculate the position of the user terminal 2 by, for example, triangulation. A user terminal 2 used by the user who is the establisher of a channel may not have the function of acquiring the positional information, or may be a stationary terminal device such as a personal computer.

In the channel system S, the establisher designates a geographical region when creating the channel. The designated region usually includes a place about which information is exchanged in the channel, a place where an event about which information is exchanged occurs, and the like. For example, the establisher can designate a region to include a specific store, facility, landmark, or the like. The establisher can designate a region to include a place where specific people, animals, or plants are in, and a place where a specific object or service is provided. The establisher can designate a region to include a place where a specific event is held.

Among users who use the channel system S, only a user who enters a designated region can join the channel. The user who has joined the channel acquires a right to post information to the channel. This right is continuously given to the member even after the member leaves the designated region. A user who has even slight interest in a thing within the designated region may or may not go into the region. However, an action of going to a certain place consumes the user's time and labor. Therefore, there is a high probability that the user who has gone into the designated region has no less than a certain degree of interest in a thing within the region. Therefore, it is possible to form a community from users who have no less than a certain degree of interest in a specific thing. The establisher may have the right to post information from the beginning regardless of whether the establisher has entered the designated region.

When creating the channel, the establisher may be able to designate a joinable period in addition to the region. In this case, only a user who enters the designated region during the joinable period can join the channel. For example, when designating a region for a place where an event with a fixed period or date and time occurs, or for a place with fixed business hours, it is preferable to designate the joinable period according to the period or date and time.

[1-2. Configuration of Center Server]

Next, the configuration of the center server 1 will be described with reference to FIGS. 2 and 3. FIG. 2 is a block diagram showing one example of the schematic configuration of the center server 1 according the present embodiment. As shown in FIG. 2, the center server 1 includes a system controller 11, a system bus 12, an input-output interface 13, a storage unit 14, and a communication unit 15. The system controller 11 and the input-output interface 13 are connected to each other via the system bus 12.

The system controller 11 includes a central processing unit (CPU) 11*a*, a read only memory (RON) 11*b*, a random access memory (RAM) 11*c*, and the like.

The input-output interface 13 performs interface processing between the storage unit 14 and the communication unit 15, and the system controller 11.

The storage unit 14 includes, for example, a hard disk drive or the like. The storage unit 14 stores databases such as a membership DB 14*a*, a positional information DB 14*b*, a channel DB 14*c*, a posted information DB 14*d*, and other databases. "DB" is an abbreviation for database.

FIG. 3 is a diagram showing one example of details stored in the databases. The membership DB 14*a* stores membership information about each user of the channel system S. Specifically, as the membership information, information such as user ID, nickname, gender, date of birth, telephone number, email address, address, preference information, notification channel list, and joined channel list is stored in association with each other in the membership DB 14*a*. The user ID is identification information for identifying the user. The preference information is information indicating the preference of the user. For example, the preference information may include a list of genres and categories the user likes. The notification channel, list is, for example, a list of channel IDs of channels registered by the user. The channel ID is identification information for identifying the channel. When the user goes into the region designated for the channel whose channel ID has been added to the notification channel list, the user is notified that the user can join the channel. The joined channel list is a list of channel IDs of the channels in which the user has joined.

The positional information DB 14*b* stores the positional information of the user terminal 2 for each user. Specifically, the user ID, recording date and time, and terminal positional information are stored in association with each other in the positional information DB 14*b* as the positional information. The user ID indicates the user who uses the user terminal 2. The recording date and time is the date and time when the positional information is recorded by the user terminal 2. The terminal positional information may be, for example, the latitude and longitude indicating the position of the user terminal. Only the latest positional information ay be stored for each user, or the positional information acquired at a plurality of time points may be stored as a history of the positional information.

The channel DD 14*c* stores channel information regarding the created channel for each channel. As the channel information, specifically, the channel ID, establisher ID, channel name, channel outline, tag information, region information, joinable period, public type, member list, and the like are stored in association with each other in the channel. DB 14*c*. Among these pieces of information, the channel name, channel outline, tag information, region information, joinable period, and public type can be set by the establisher of the channel. The establisher ID is a user ID of the establisher. The tag information is a list of genres, keywords, and the like related to the channel. The region information indicate a region designated by the establisher of the channel. For example, when the designated region is a circular region, the region information may include the latitude and longitude of the center point and a radius. Alternatively, the region information may include the latitude and longitude of each line segment constituting the boundary of the region. Alternatively, the region information may include a place name, an address, or the like. The joinable period may or may not be stored in the channel DB 14*c* according to the selection by the establisher. The public type indicates whether to open information posted to the channel to users who have not joined the channel. The member list is a list of user IDs of users that have joined the channel. The member list may also include the user ID of the establisher.

The posted information DB 14*d* stores information posted to the channel. Specifically, the channel ID, user ID, posted date and time, posted information, and the like are stored in association with each other in the posted information DB 14*d*. The channel. ID indicates a channel to which information is posted. The user ID indicates a posting person. The posted information is information that is posted. Examples of the posted information include still images, videos, sounds, and texts.

The storage unit 14 further stores various programs such as an operating system, a database management system (DBMS), and a server program. The server program is a program that causes the system controller 11 to execute various processes related to the channel system S. The server program may be, for example, acquired from another device via the Internet NW, or may be recorded in a recording medium such as a magnetic tape, an optical disk, or a memory card, and read via a drive device.

The communication unit 15 connects to the user terminals 2 via the network NW, and controls the communication state with these devices.

[1-3. Functional Outline of System Controller of Center Server]

Figure 4:
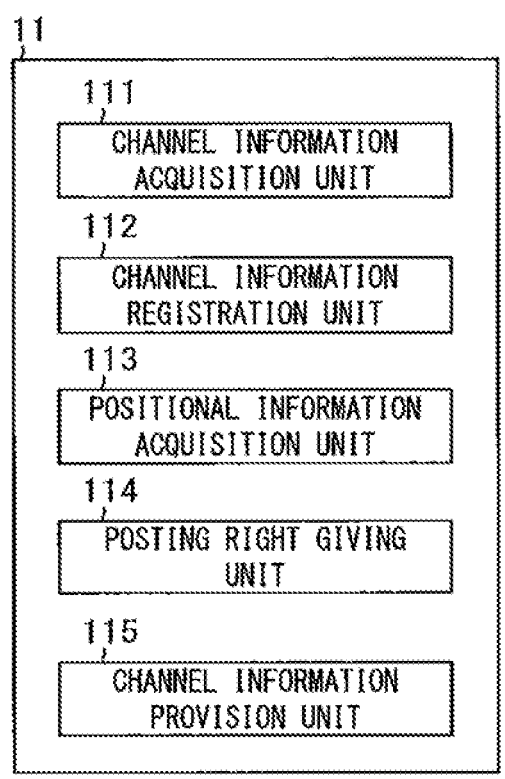
FIG. 4 is a diagram showing one example of functional blocks of a system controller of the center server according to one embodiment.

Next, a functional outline of the system controller 11 of the center server 1 will be described with reference to FIGS. 4 to 8. FIG. 4 is a diagram showing one example of functional blocks of the system controller 11 of the center server 1 according to the present embodiment. The CPU 11*a* reads and executes various program codes included in the server program, whereby the system controller 11 functions as a channel information acquisition unit 111, a channel information registration unit 112, a positional information acquisition unit 113, a posting right giving unit 114, a channel information provision unit 115, and the like as shown in FIG. 4.

The channel information acquisition unit 111 acquires the channel information including the region information indicating the region designated by the establisher who requests creation of the channel. As described above, only a user who enters this region can join the channel.

Figure 5:
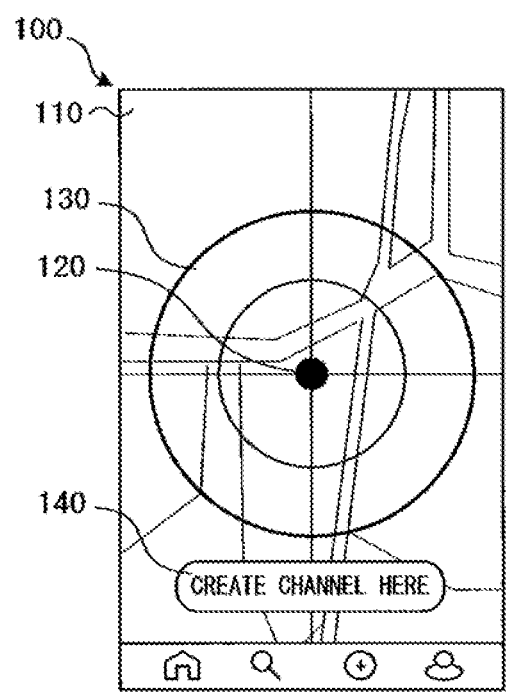
FIG. 5 is a view showing one example of a region designation screen.

FIG. 5 is a view showing one example of a region designation screen 100. For example, when a dedicated application is running on the user terminal 2, the establisher selects creation of the channel. In response to this selection, the user terminal 2 displays the region designation screen 100. The region designation screen 100 includes a map 110, a center point. 120, a boundary line 130, a creation button 140, and the like. As the map 110, a map around the user terminal 2 may be initially displayed. A displayed area of the map 110 can be moved and a scale of the map 110 can be changed by a user operation. The center point 120 and the boundary line 130 are displayed on the map 110. The center point 120 indicates the center of a region to be designated. The boundary line 130 indicates a boundary of the region to be designated. The boundary line 130 may be circular, for example. The size of the circle indicated by the boundary line 130, that is, the radius can be changed by the user operation. The establisher may designate a region to include a position where the establisher is located, or may designate a region that does not include the position where the establisher is located. The creation button 140 is a button for requesting creation of the channel in the region designated by the establisher. After manipulating the map 110 and the boundary line 130 to set the region, the establisher presses the creation button 140. In response to the pressing, the user terminal 2 transmits the region information to the center server 1. The region information includes, for example, the latitude and longitude of the center point 120 and a radius corresponding to the distance between the boundary line 130 and the center point 120. In this way, the channel information acquisition unit 111 acquires the region information.

The shape of the region is not limited to a circle. For example, the shape of the region may be an ellipse, a square, a rectangle, a rhombus, or the like. A method of designating the region is not limited to the method using the screen shown in FIG. 5. For example, the boundary line of the region may be designated by the user drawing the boundary on the map 110 with a finger or a mouse pointer. Alternatively, as the center point of the region, an address, a facility name, a building name, a landmark name, or the like may be designated. A method of designating the region may be selectable by the establisher.

The channel information acquisition unit 111 may further acquire a joinable period indicating a period designated by the establisher. For example, after designating the region in the region designation screen 100, the user terminal 2 displays a screen for inputting, for example, the channel name, channel outline, tag information, region information, joinable period, public type, and the like. The establisher inputs the joinable period if necessary. As the joinable period, for example, the start date and time and the end date and time of the period may be able to be designated. As the joinable period, either of the start date and time or the end date and time may be able to be designated. As the joinable period, for example, a period that appears repeatedly may be able to be designated such as from 11:00 to 21:00 every day, every Saturday and Sunday, from April to September every year, and the like. The user terminal 2 transmits the input information to the center server 1.

The channel information registration unit 112 stores the region information acquired by the channel information acquisition unit 111 and a channel ID for identifying a channel for which creation is requested in association with each other in the storage unit 14. For example, the channel information registration unit 112 determines a new channel ID for the channel to be created. The channel information registration unit 112 stores the channel information including the channel ID and the region information in the channel. DB 14*c*. When the joinable period designated by the establisher is acquired by the channel information acquisition unit 111, the channel information registration unit 112 stores the joinable period, the region information, and the channel ID in association with each other in the storage unit 14.

The positional information acquisition unit 113 acquires the positional information indicating a postilion of a user terminal 2 used by a user different from the establisher of the channel. For example, according to the dedicated application Installed in the user terminal 2, each user terminal 2 acquires the positional information of the respective user terminal 2 periodically in the background (for example, every 5 minutes, every 10 minutes) using GPS or the like. For example, the user terminal 2 may periodically acquire the terminal positional information only when the notification channel list of a user who uses the user terminal 2 includes one or more channel IDs. Every time the terminal positional information is acquired, the user terminal 2 acquires a current date and time as the recording date and time. The user terminal 2 transmits, to the center server 1, the positional information including the terminal positional information, the recording date and time, and a user ID of the user who uses the user terminal 2. When the user terminal 2 transmits the positional information in real time, the positional information acquisition unit 113 may determine the recording date and time, instead of the user terminal 2 determining the recording date and time. For example, the positional information acquisition unit 113 may determine reception date and time of the positional information as the recording date and time. The positional information acquisition unit 133 may store the positional information transmitted from the user terminal 2 in the positional information DB 14*b*. The positional information is required at least to include the terminal positional information.

When the position of the user terminal 2 indicated by the positional information acquired by the positional information acquisition unit 113 is included in the region indicated by the region information stored in the channel DB 14*c*, the posting right giving unit 114 performs processing for giving a right to post information to the channel identified with the channel ID stored in association with the region information to the user who uses the user terminal 2. This right allows the user to post information regardless of whether the user terminal 2 is located within the region.

Figure 6A:
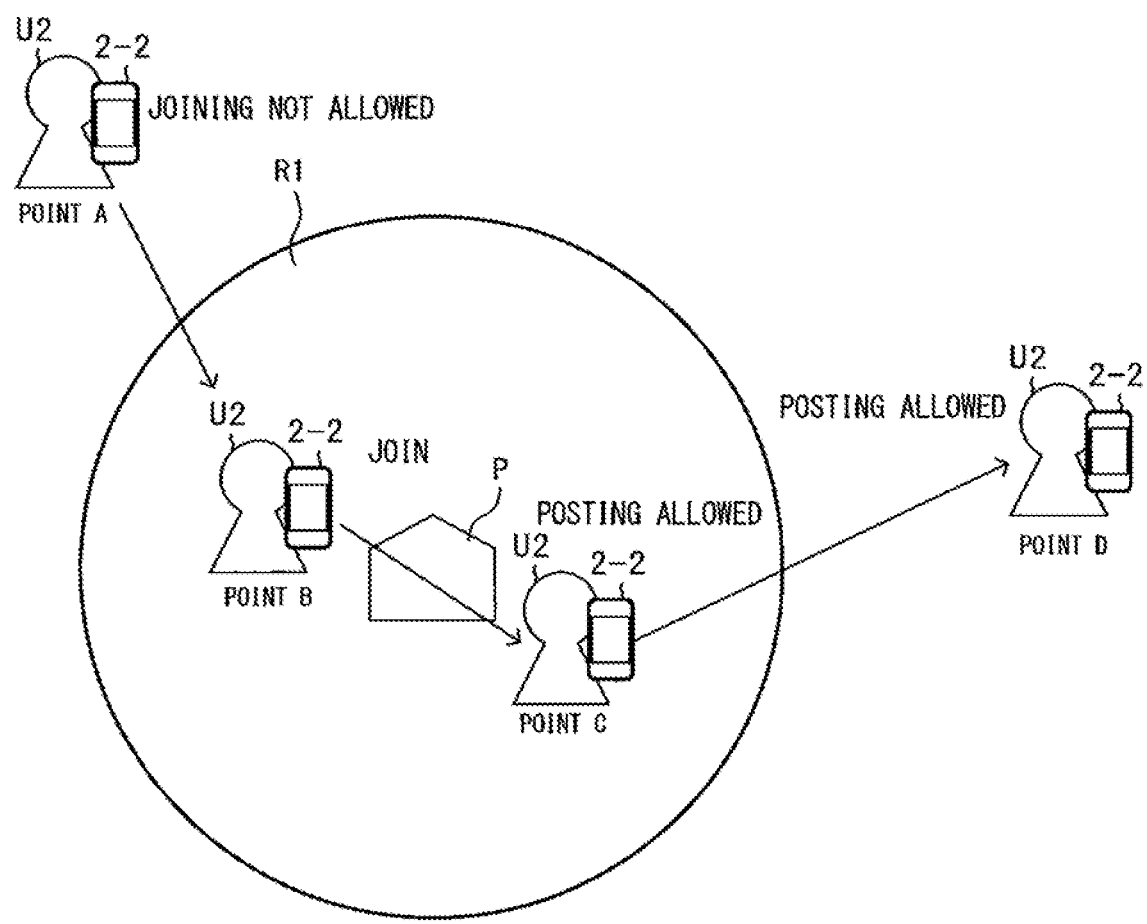
FIG. 6A is a diagram showing one example of how a user joins a channel.

FIG. 6A is a diagram showing one example of how a user joins a channel. For example, by operating a user terminal 2-1, as shown in FIG. 6A, an establisher designates a region R1 including a certain ramen restaurant P as the center point and creates a channel C1 regarding the ramen restaurant. A user U2 who likes the ramen restaurant P carries a user terminal 2-2 and is located at a point A. Since the point A is outside the region R1, the user U2 cannot join the channel C1. Thereafter, the user U2 moves to a point B. Since the point B is within the region R1, the user U2 can join the channel C1. The user U2 actually joins the channel at this point. Thereafter, the user U2 moves to a point C. The point C is within the region R1, and the user U2 can post information to the channel C1. Thereafter, the user U2 moves to a point D. Although the point D is outside the region R1, the user U2 can post information to the channel C1.

As described above, a user who has no less than a certain degree of interest in a place or an object within a designated region, an event held in the region, or the like goes into the region. Therefore, the user who has no less than a certain degree of interest in a specific thing about which information is exchanged in the channel can join the channel, if it becomes clear that a member has no less than a certain degree of interest in the thing, there is no need to limit a region in which the user can post information.

In a case where the joinable period has been designated by the establisher, when the position of the user terminal 2 indicated by the positional information acquired by the positional information acquisition unit 113 is included in the region indicated by the region information stored in the channel DB 14c, and a time at which the user terminal 2 is located at the position indicated by the positional information is included in the joinable period stored in association with the region information, the posting right giving unit 114 may execute processing for giving the user the above-described right to allow the user to post information both within the joinable period and after the joinable period elapses.

Figure 6B:
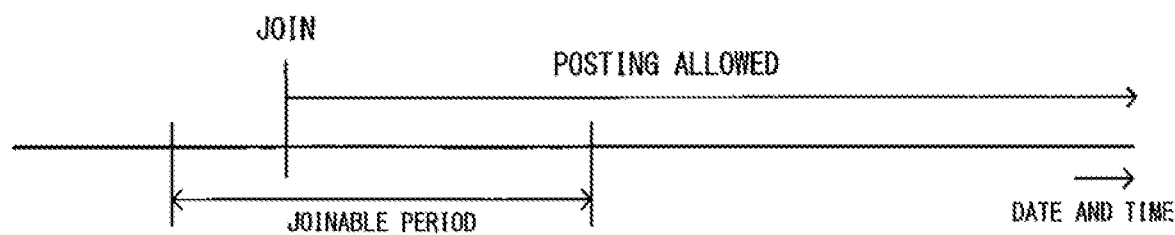
FIG. 6B is a diagram showing one example of a relationship between a joinable period and a posting period.

FIG. 6B is a diagram showing one example of a relationship between the joinable period and a posting period. For example, an establisher designates a region to include a place where an anime event is held and creates an anime channel. Also, the establisher designates the start time and end time of the event as the start time and end time of the joinable period. A user who is interested in anime goes into the designated region during the time when the event is held in order to participate in the event. Since this time is within the joinable period, the user joins the channel as shown in FIG. 6B. From the time when the user joins the channel, the user can post information to the channel. The user can post information even after the joinable period elapses.

As in the above-described event, a time at which an event that may interest someone occurs may have been determined in advance. The fact that the user goes to the place at that time shows that the user has no less than a certain degree of interest. The joinable period can be designated for this reason. If it becomes clear that the member has no less than a certain degree of interest in a specific thing, there is no need to limit the period in which the use can post information. A period in which the channel itself continues may be able to be designated by the establisher.

Processing for giving the right to post information may associate, for example, the user ID of the user to whom the right to post information is given with the channel ID of the channel to which information can be posted. By referring to this association, it is possible to control whether to allow a specific user to post information to a specific channel. This association may be, for example, to add the user ID of the member to the member list associated with the channel ID in the channel DB 14c. Alternatively, the association may be to add the channel ID of the channel which the user has joined to the joined channel list associated with the user ID in the membership DB 14a.

The posting right giving unit 114 may automatically execute the processing for giving the posting right when the user terminal 2 enters the designated region. Alternatively, the posting right giving unit 114 may transmit to the user terminal 2 a notification that the user terminal 2 has entered the designated region. Then, the posting right giving unit 114 may execute the processing for giving the posting right when the user selects joining the channel.

The channel information provision unit 115 causes the user terminal 2 to display information about the channel. Examples of information to be displayed include channel search results, channel information stored in the channel DH 14c, information posted to the channel, and the like.

When displaying the channel search results and the like, the channel information provision unit 115 may prioritize one of the at least two channels the others based on a distance between a region indicated by region information of each of at least two channels among channels whose region information is stored in the channel DB 14c and the position indicated by the positional information of the user terminal 2 acquired by the positional information acquisition unit 113. The channel information provision unit 115 cause the user terminal 2 to display information about the prioritized channel preferentially. For example, for each found channel, the channel information provision unit 115 calculates a distance from the designated region to the user terminal 2. The channel information acquisition unit 111 displays more preferentially the information of the channel as the calculated distance is shorter. Therefore, information about the channel with the designated region that gives easy access to the user is preferentially displayed. For example, the channel information acquisition unit 111 may determine a display order of information to be higher as the channel has a shorter distance. Alternatively, the channel information acquisition unit 111 may display information about a channel having a relatively short distance and may not display information about a channel having a relatively long distance.

Of the above-described at least two channels, in a case where the user selects a channel whose information is displayed on the user terminal 2 by the processing of the channel information provision unit 115, the posting right giving unit. 1.14 may execute the processing for giving the right to post information to the selected channel in response to the position of the user terminal 2 indicated by the positional information acquired by the positional information acquisition unit 113 being included in the region indicated by the region information of the selected channel. Therefore, the rights to post information to all channels are not given when the user enters the designated regions, but the right is given only to the channel selected by the user.

Figure 7:
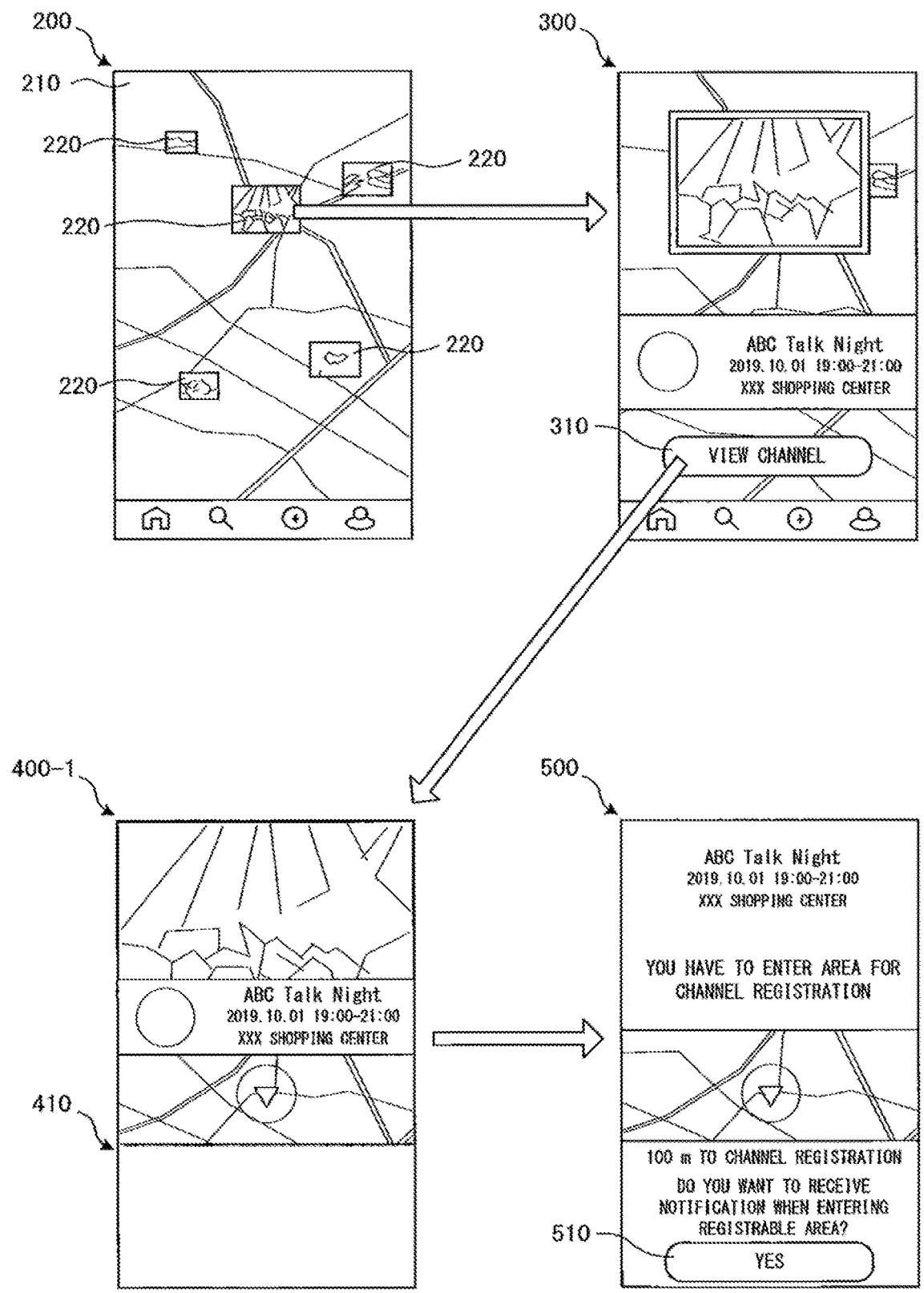
FIG. 7 is a view showing an example of screen transition.
Figure 8:
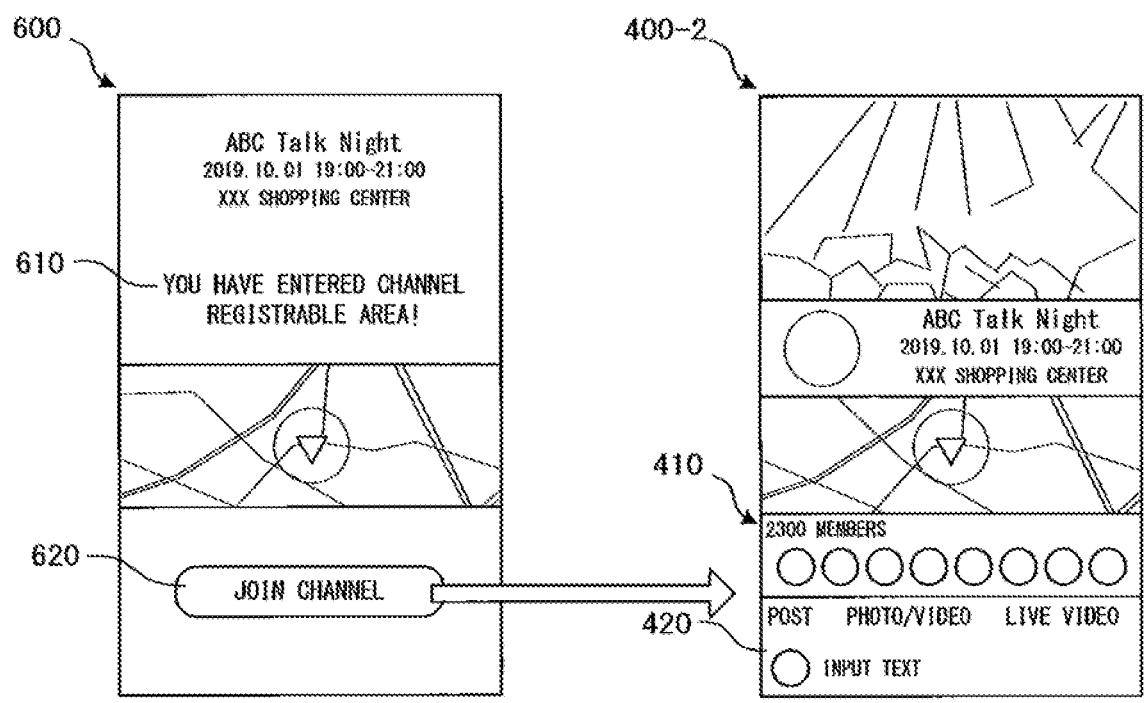
FIG. 8 is a view showing an example of screen transition.

FIGS. 7 and 8 are views each showing an example of screen transition from the start of the dedicated application to the information posting. When the user terminal 2 starts the dedicated application, for example, a channel map screen 200 is displayed as shown in FIG. 7. The channel map screen 200 includes a map 210. As the map 210, a map around the user terminal 2 may be initially displayed. A display area of the map 210 can be moved and a scale of the map 210 can be changed by the user operation. One or more channel icons 220 may be displayed on the map 210. Each channel icon 220 indicates a channel with the center point of a region located at the place where the icon is displayed on the map 210. When the user selects a channel icon 220, the user terminal 2 displays a channel outline screen 300. The channel outline screen 300 is also displayed by the user selecting a channel from the channel search results displayed in response to the user inputting search conditions such as genre, tag, and keyword.

The channel outline screen 300 displays, for example, information such as a channel name, channel outline, channel image, designated region, joinable period, and the like. The channel outline screen 300 also displays a channel browsing button 310. When a user who has not joined the channel presses the channel browsing button 310, an in-channel screen 400-1 is displayed. The in-channel screen 400-1 includes a channel information region 410. The channel information region 410 originally displays various kinds of information regarding the channel. For example, in response to the user scrolling the screen, the information posted to the channel is displayed. However, since the user is not currently a member of the channel, in order to prevent the user from recognizing such information, the channel information region 410 is subjected to blurring processing. The user cannot read posted information or post information. Here, the user terminal 2 displays a channel registration screen 500 by the user operation.

The channel registration screen 500 displays a message that in order to join the channel, it is necessary to go into the designated region. Also, the channel registration screen 500 may display a distance from the current position of the user terminal 2 to the designated region. In addition, the channel registration screen 500 displays a notification registration button 510. The notification registration button 510 is a button for performing registration such that the charnel system S makes notification when the user terminal 2 has entered the designated region. When the user presses the notification registration button 510, the center server 1 adds the channel ID of the channel for which information is displayed to the notification channel list of the user.

The timing when the notification registration button 510 is pressed is the timing when it is determined that the user desires to join the channel. If the user is outside the region of the channel at the timing when the user desires to join the channel and the user terminal 2 has not periodically transmitted the positional information to the center server 1, the user terminal 2 may start periodical transmission of the positional information. If the user terminal 2 has periodically transmitted the positional information, the user terminal 2 may shorten the time interval for acquiring and transmitting the positional information.

Figure 9:
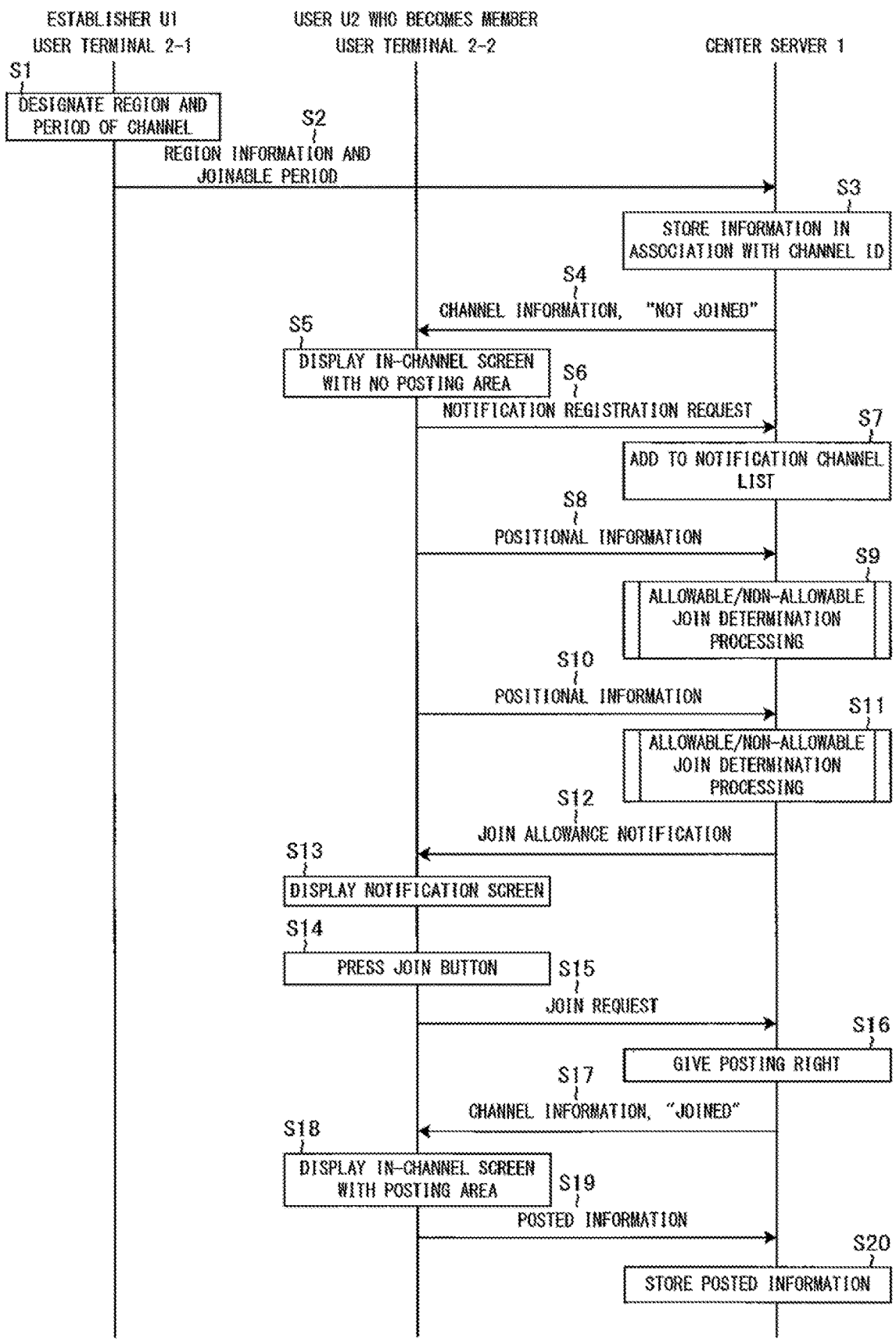
FIG. 9 is a sequence diagram showing one example of an operation of the channel system according to one embodiment.

Thereafter, the user carries the user terminal 2 and goes into the designated region. Then, as shown in FIG. 9, the user terminal 2 displays a notification screen 600. The notification screen 600 displays a message 610 indicating that the user has entered the region of the channel registered by the user. In addition, the notification screen 600 displays a join button 620. When the user presses the join button 620, the posting right giving unit 114 registers the user as the member of the channel and gives the user the right to post information to the channel.

It is determined whether the user terminal 2 is located within the designated region based on the positional information of the user terminal 2 acquired at predetermined time intervals. Therefore, depending on the timing, the user may leave the region without receiving the notification. Therefore, the user terminal 2 may acquire the positional information at the timing when the dedicated application is started. The user can join the channel by starting the dedicated application while the user is within the region.

Then, the user terminal 2 displays an in-channel screen 400-2. The in-channel screen 400-2 includes the channel information region 410. The channel information region 410 in this case clearly displays various pieces of information about the channel. In addition, the channel information region 410 includes a posting area 420. The posting area 420 is a region for inputting text as information to post and selecting a still image or image to post. The user can post information by operating the posting area 420.

The in-channel screen 400-1 shown in FIG. 7 is a screen example when the public type of the channel is "closed". For a user who has not joined the channel, whose public type is "open", the user terminal 2 does not need to display the posting area 420 while clearly displaying the information about the channel in the channel information region 410.

The posting right may be given to the user by using an information code such as a barcode or a two-dimensional code by selection by the establisher of the channel. For example, consider a case where a sales person of a store creates a channel regarding the store. The establisher designates a region to include the store. In addition, the establisher selects issuance of an information code. When creating the channel, the channel information registration unit 112 generates the information code, for example, by encoding the channel ID. The channel information registration unit 112 transmits, for example, the generated information code to the user terminal 2 of the establisher. The establisher displays the information code on a screen of the user terminal 2 or prints the information code. Alternatively, an administrator of the channel system S may send, to the establisher, a sheet on which the information code is printed. By either method, the establisher displays the information code, for example, in the store. A user who is interested in the store goes to the store and causes the user terminal 2 of the user to read the information code. The user terminal 2 transmits the read information code and the positional information indicating the current position to the center server 1. The posting right giving unit 114 decodes the information code received from the user terminal 2 to generate the original channel ID. The posting right giving unit 114 determines whether to give the posting right based on the region information associated with the generated channel. ID and the positional information received from the user terminal 2. The posting right giving unit 114 may give the posting right only to the user whose user terminal 2 has read the information code. The information code may be spread outside the store. If the posting right is given by simply using only the information code, even a user who has not visited the store can join the channel. Therefore, a user who is not so interested in the store can obtain the posting right. In contrast, by using the region information and the positional information of the user terminal 2 in addition to the information code, the posting right can be given only to the user who has visited the store.

[1-4. Operation of Channel System]

Next, the operation of the channel system S will be described with reference to FIGS. 9 and 10. FIG. 9 is a sequence diagram showing one example of the operation of the channel system S according to the present embodiment. As shown in FIG. 9, an establisher U1 selects creation of the channel C1, whereby the user terminal 2-1 displays the region designation screen 100. Here, the establisher U1 designates a region. The establisher U1 also inputs the joinable period and other information regarding the channel C1 (step S1). The user terminal 2-1 transmits the input region information, the joinable period, and other information to the center server 1 (step S2). The center server 1 that has received the information such as the region information and the joinable period stores the information in association with a newly generated channel ID in the channel DB 14c (step S3).

Thereafter, the user U2 who will join the channel C1 selects the channel C1, for example, from channel search results or the channel map screen 200. In response to this selection, the user terminal 2-2 displays the channel outline screen 300. When the user U2 presses the channel browsing button 310, the user terminal 2-2 transmits a request for detailed information on the channel C1 to the center server 1. In response to this request, the center server 1 acquires information associated with the channel ID of the channel. C1 from the channel DB 14c. Also, the center server 1 determines whether the member list associated with the channel ID of the selected channel C1 includes a user ID of the user U2. At this time, since the member list does not include the user ID of the user U2, the center server 1 transmits the acquired information about the channel C1 and a join status indicating "not joined" to the user terminal 2-2 (step S4). The user terminal 2-2 displays the in-channel screen 400-1 based on the information received from the center server 1 (step S5). Here, since the join status is "not joined", the user terminal 2-2 does not display the posting area 420. Then, the user terminal 2-2 displays the channel registration screen 500, and the user U2 presses the notification registration button 510. In response to this operation, the user terminal 2-2 transmits a notification registration request (step S6). Upon receipt of the notification registration request, the center server 1 adds the channel ID of the channel C1 selected by the user U2 to the notification channel list stored in the membership DB 14a in association with the user ID of the user U2 (step S7).

Thereafter, the user terminal 2-2 periodically transmits the positional information to the center server 1 (steps S8 and S10). Every time the center server 1 receives the positional information, the center server 1 executes allowable/non-allowable join determination processing (steps S9 and S11).

Figure 10:
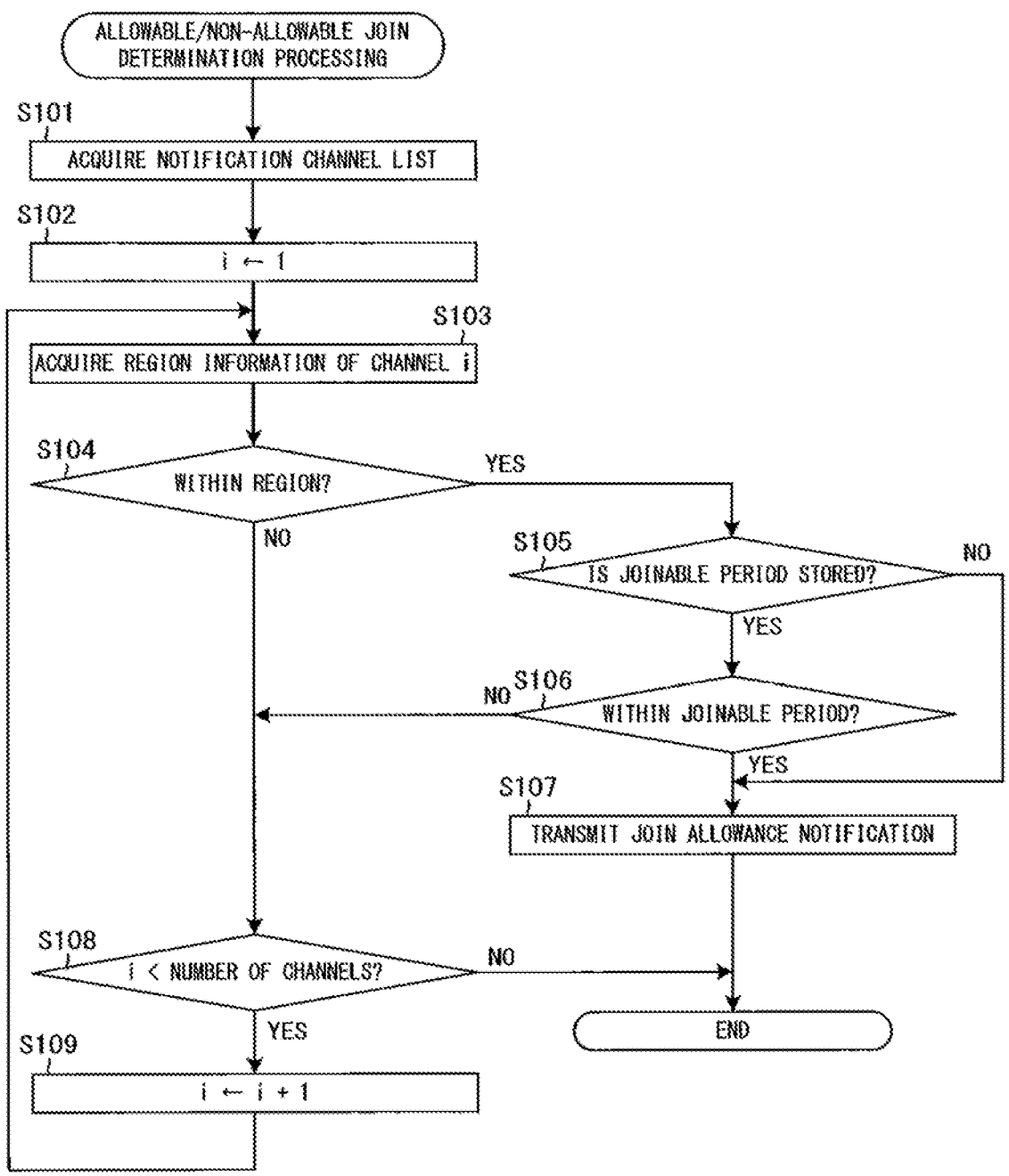
FIG. 10 is a flowchart showing one example of allowable/non-allowable join determination processing by the system controller of the center server according to one embodiment.

FIG. 10 is a flowchart showing one example of the allowable/non-allowable join determination processing by the system controller 11 of the center server 1 according to the present embodiment. As shown in FIG. 1C, the posting right giving unit 114 acquires, from the membership DB 14a, the notification channel list associated with the user ID of the user U2 who uses the user terminal 2-2 that has transmitted the positional information (step S101). Then, the posting right giving unit 114 sets the number i to 1 (step S102).

Then, the posting right giving unit 114 acquires region information of the channel i from the channel DB 14c (step S103). The channel i is a channel identified with the i-th channel ID among the channel IDs included in the notification channel list. Then, the posting right giving unit 114 determines whether the position of the user terminal 2-2 is within the region of the channel i (step S104). For example, the posting right giving unit 114 calculates a distance from the center point included in the region information of the channel i to a position of the user terminal 2-2 indicated by the terminal positional information included in the positional information. When the calculated distance exceeds a radius included in the region information of the channel i, the posting right giving unit 114 determines that the position of the user terminal. 2-2 is not within the region (step S104: NO). In this case, the posting right giving unit 114 determines whether the number i is less than the number of channels whose channel IDs are included in the notification channel list (step S108). When the number i is less than the number of channels (step S108; YES), the posting right giving unit 114 increments the number i by 1 (step S109) and executes step S103. On the other hand, when the number i is not less than the number of channels (step S108: NO), the allowable/non-allowable join determination processing ends.

When the calculated distance is equal to or less than the radius in step S104, the posting right giving unit 114 determines that the position of the user terminal 2-2 is within the region (step S104: YES). In the case, the posting right giving unit 114 determines whether the joinable period is stored in the channel DB 14c in association with the channel ID of the channel i (step S105). When the joinable period is stored (step S105: YES), the posting right giving unit 114 determines whether the recording date and time included in the positional information is within the joinable period (step S106). When the recording date and time is not within the joinable period (step S106: NO), the process proceeds to step S108.

On the other hand, when the recording date and time is within the joinable period (step S106: YES), or, when the joinable period is not stored (step S105: NO), the posting right giving unit 114 transmits a join allowance notification including the channel ID and the channel name of the channel i to the user terminal 2-2 (step S107), and the allowable/non-allowable join determination processing ends.

In FIG. 9, the join allowance notification for the channel C1 is transmitted from the center server 1 to the user terminal 2-2 by the allowable/non-allowable join determination processing in step S11 (step S12). In response to this notification, the user terminal 2-2 displays the notification screen 600 (step S13). Here, when the user U2 presses the join button 620 (step S14), the user terminal 2-2 transmits a join request in which the channel ID included in the join allowance notification is set to the center server 1 (step S15). In response to this request, the center server 1 executes processing for giving the posting right to the user U2 (step S16). For example, the center server 1 adds the user ID of the user U2 to the member list stored in the channel. DB 14c in association with the channel ID included in the join request. Also, the center server 1 may add the channel ID to the joined channel list stored in the membership DB 14a in association with the user ID of the user U2.

Thereafter, in response to the request from the user terminal 2-2, the center server 1 acquires information associated with the channel ID of the channel C1 which the user U2 has joined from the channel DB 14c. Since the member list associated with the channel. ID of the channel C1 includes the user ID of the user U2, the center server 1 transmits the acquirer information about the channel C1 and the join status indicating "joined" to the user terminal 2-2 (step S17). The user terminal 2-2 displays the in-channel screen 400-2 based on the information received from the center server 1 (step S18). Here, since the join status is "joined", the user terminal 2-2 displays the posting area 420. Thereafter, the user U2 inputs information to post by operating the posting area 420. The user terminal 2-2 transmits the input information to the center server 1 as posted information (step S19). The center server 1 stores the received posted information in association with the channel ID of the channel C1 in the posted information UH 14d (step S20).

As described above, according to the present embodiment, the center server 1 acquires the region information indicating the region designated by the establisher who requests creation of the channel. The center server 1 stores the acquired region information and the channel ID for identifying the channel in association with each other in the channel DB 14c. Also, the center server 1 acquires the positional information indicating the position of the user terminal 2 used by a user different from the establisher. When the position indicated by the acquired positional information is included in the region indicated by the stored region information, the center server 1 executes processing for giving the user a right to post information to the channel identified with the channel ID stored in association with the region information. The given right allows the user to post information regardless of whether the user terminal 2 is located within the region. By this processing, the center server 1 causes the establisher to designate the region. For example, it is possible to designate the region so as to include a place where a thing about which information is exchanged in the channel is in to be created. The right to post information to the channel is given to the user who goes to the designated region. The user to which the right has been given can post information to the channel regardless of whether the user is located in the designated region after that. It is considered that the user goes into the designated region because the user has no less than a certain degree of interest in the thing in the region. Therefore, it is possible to form a channel from users who have no leas than a certain degree of interest in the object about which information is exchanged in the channel.

The center server 1 may further acquire the joinable period designated by the establisher. The center server 1 may store the acquired region information, the acquired joinable period, and the channel ID in association with each other in the channel DB 14c. When the position indicated by the acquired positional information is included in the region indicated by the stored region information, and the time at which the user terminal 2 is located at the position indicated by the acquired positional information is included in the joinable period stored in association with the region information, the center server 1 may give the user the right to post information both in the joinable period and after the joinable period elapses. In this case, the establisher can further designate the joinable period. For example, the establisher can designate the joinable period to correspond to certain time when a thing about which information is exchanged in the created channel exists. The right to post information to the channel is given to the user who enters the designated region in the designated joinable period. The user to which the right has been given can post information to the channel even after the designated joinable period elapses. Therefore, it is possible to form a channel from users who have no less than a certain degree of interest in a certain thing in the specific time.

Based on the distance between the position indicated by the acquired positional information and the region indicated by the region information of each of at least two channels among channels whose region information is stored in the channel DB 14c, the center server 1 may cause the user terminal 2 to preferentially display one of those piece of channel information. When the user selects the channel whose information is displayed on the user terminal 2, the center server 1 may execute processing for giving the right to post information to the selected channel in response to the position indicated by the acquired positional information being included in the region indicated by the region information of the selected channel. In this ease, information on one of a first channel and a second channel is prioritized the other based on the distance from the user's position to the region designated for the first channel, and the distance from the user's position to the region designated for the second channel information of the prioritized channel is preferentially presented to the user. When the user goes into the region designated for the channel selected by the user from the channels for which information is presented, the user can obtain the right to post information to the selected channel. Therefore, it is possible to guide the user to the channel with the designated region that gives easy access to the user from a distance viewpoint.

2. Second Embodiment

Next, a second embodiment will be described with reference to FIGS. 11 and 12. In the present embodiment, when a region designated by a user who may become an establisher and a region of an existing channel overlap each other, a center server 1 allows the user to select whether to open a channel as it is or join the existing channel. The second embodiment is the same as the first embodiment in other points.

Specifically, when another user requests creation of a new community after region information and channel ID of the existing channel are stored in a channel DB 14c in association with each other, the channel information acquisition unit 111 acquires region information indicating the region designated by the user.

When the region indicated by the region information acquired by the channel information acquisition unit 111 and the region indicated by the region information stored in the channel DB 14c for the existing channel overlap each other, the channel information registration unit 112 causes a user terminal 2 to display a channel creation selection screen 100 for selecting one of options including creation of a new channel and joining the existing channel.

Figure 11:
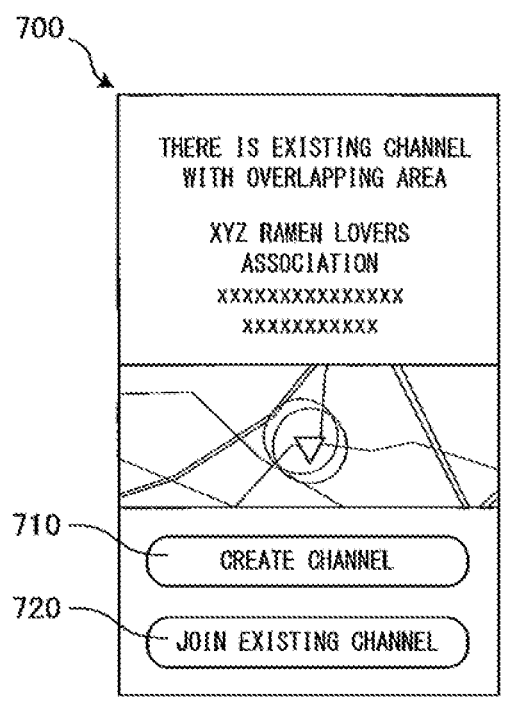
FIG. 11 is a view showing a display example of a channel creation selection screen.

FIG. 11 is a view showing a display example of the channel creation selection screen 700. The channel creation selection screen 700 displays, for example, a message that there is an existing channel with an overlapping region, a name and an outline of the existing channel, and the like. In addition, the channel creation selection screen 700 may display a map, and the region designated by the user and the region of the existing channel on the map. Furthermore, the channel creation selection screen 700 displays a creation button 710 and a join button 720. The creation button 710 is a button for creating a new channel. The join button 720 in a button for joining in the existing channel.

The channel information registration unit 112 acquires, from the user terminal 2, selection information indicating user's selection on the channel creation selection screen 700 displayed on the user terminal 2. When the user presses the creation button 710, the user terminal 2 transmits the selection information indicating "create" to the center server 1. When the user presses the join button 720, the user terminal 2 transmits the selection information indicating "join" to the center server 1.

In a case where the selection information acquired by the channel information registration unit 112 indicates "create", the channel information registration unit 112 stores the region information acquired from the user terminal 2 by the channel information acquisition unit 111 and a channel ID for identifying the new channel in association with each other in the channel DB 14c.

On the other hand, in a case where the selection information indicates "join", in response to the position of the user terminal 2 indicated by positional information acquired by the positional information acquisition unit 113 being included in the region indicated by the region information of the existing channel stored in the channel DB 14c, a posting right giving unit 114 executes processing for giving a right t: post information to the existing channel.

There is a possibility that things about which information is exchanged are the same or similar between the channels with overlapping regions (for example, both channels are related to music events). In that case, the user who intends to newly create a channel may join the existing channel without creating the new channel. Even in this case, the user can also create a new channel. On the other hand, if the things about which information is exchanged are different even if the regions overlap each other, (for example, one channel for music events, the other channel for anime events), the user can just create a new channel. Not only in a case where regions overlap with each other but also in a case where a distance between the regions is less than a predetermined distance, it may be possible to select between creating a new channel and joining the existing channel.

FIG. 1.2 is a flowchart showing one example of channel creation control processing by a system controller 11 of the center server 1 according to the present embodiment. For example, when the center server 1 receives the region information from the user terminal 2 by the user designating the region on a region designation screen 100, the channel creation control processing may be executed.

Figure 12:
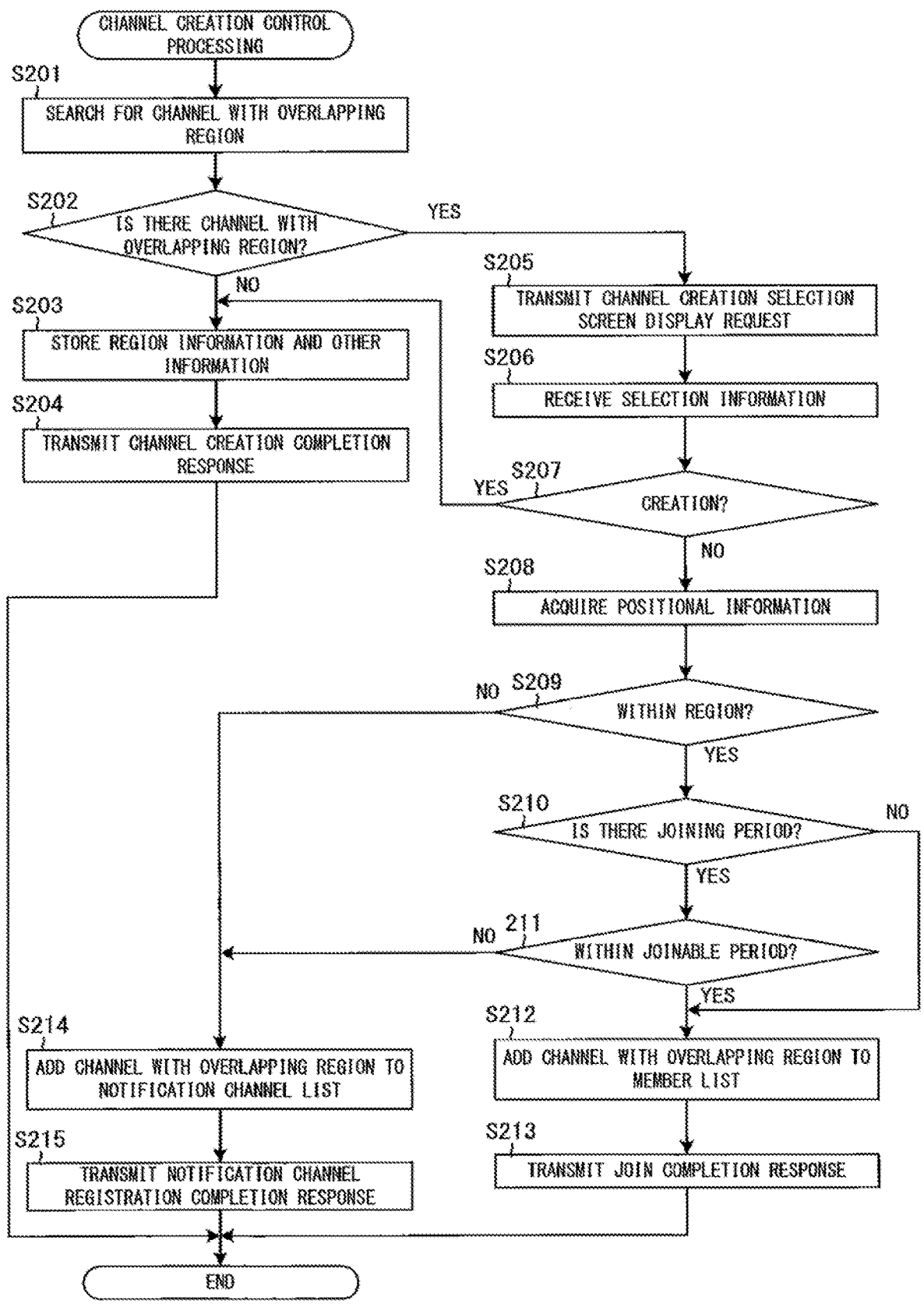
FIG. 12 is a flowchart showing one example of channel creation control processing by the system controller of the center server according to one embodiment.

As shown in FIG. 12, from among already created channels, the channel information registration unit 112 searches for a channel with a designated region overlapping with the region indicated by the received region information (step S201). For example, the channel information registration unit 112 calculates a distance from the center point included in the region information received from the user terminal 2 to the center point included in the region information stored in the channel DB 14c. In addition, the channel information registration unit 112 calculates the sum of a radius included in the region information received from the user terminal 2 and a radius included in the region information stored in the channel DB 14c. The channel information registration unit 112 identifies an existing channel in which the distance between the center points is shorter than the sum of the radii as the existing channel having the overlapping region.

Then, based on a search result of step S201, the channel information registration unit 112 determines whether there is an existing channel with an overlapping region (step S202). When there is no existing channel with an overlapping region (step S202: NO), the channel information registration unit 112 stores the region information received from the user terminal 2 in association with the newly generated channel ID in the channel DB 14c. Also, the channel information registration unit 112 receives information input by the user regarding the new channel from the user terminal 2, and stores the received information in association with the generated channel ID in the channel DB 14c (step S203). Then, the channel information registration unit 112 transmits a channel creation completion response to the user terminal 2 (step S204), and the channel creation control processing ends. The user terminal 2 that has received the channel creation completion response displays a message that the channel creation has been completed.

On the other hand, when there is an existing channel with an overlapping region (step S202; YES), the channel information registration unit 112 transmits a channel creation selection screen display request to the user terminal 2 (step S205). The user terminal 2 that has received the channel creation selection screen display request displays the channel creation selection screen 700. The user terminal. 2 transmits the selection information according to the button pressed by the user among the creation button 710 and the join button 720 to the center server 1. The channel information registration unit 112 acquires this selection information (step S206). Then, the channel information registration unit 112 determines whether the selection information indicates "create" (step S207). When the selection information indicates "create" (step S207: YES), the process proceeds to step S203.

On the other hand, when the selection information indicates "join" (step S207: NO), the positional information acquisition unit 113 acquires the latest positional information of the user terminal 2 from a positional information DB 14b (step S208). Then, the posting right giving unit 114 determines whether the position of the user terminal 2 indicated in terminal positional information included in the acquired positional information is within the region of the existing channel with an overlapping region (step S209). When the position of the user terminal 2 is within the region (step S209: YES), the posting right giving unit 114 determines whether a joinable period is stored in the channel DB 14c in association with the channel ID of the existing channel with an overlapping region (step S210). When the joinable period is stored (step S210: YES), the posting right giving unit 114 determines whether recording date and time included in the positional information is within the joinable period (step S211). When the recording date and time is within the joinable period (step S211: YES), or when the joinable period is not stored (step S210: NO), the posting right giving unit 114 adds the user ID of the user who uses the user terminal 2 to a member list stored in the channel DB 14c in association with the channel ID of the existing channel with an overlapping region. Also, the posting right giving unit 114 adds the channel ID of the existing channel with an overlapping region to a joined channel list stored in the membership DB 14a in association with the user ID of the user who uses the user terminal 2 (step S212). Then, the posting right giving unit 114 transmits a join completion response to the user terminal 2 (step S213), and the channel creation control processing ends. The user terminal 2 that has received the join completion response displays a message that the joining the existing channel has been completed.

On the other hand, when the position of the user terminal 2 is not within the region (step S209: NO), or when the recording date and time is not within the joinable period (step S211: NO), the posting right giving unit 114 adds the channel ID of the existing channel with an overlapping region to a notification channel list stored in the membership B 14a in association with the user ID of the user who uses the user terminal. 2 (step S214). Then, the posting right giving unit 114 transmits a notification channel registration completion response to the user terminal 2 (step S215), and the channel creation control processing ends. The user terminal 2 that has received the notification channel registration completion response displays a message that the registration to receive notification when the user terminal 2 goes into the region of the existing channel is completed. After that, when the user terminal 2 goes into the region of the existing channel, the right to post information to the channel is given to the user.

An described above, according to the present embodiment, when the region designated by the user for a channel the user intends to newly create and the region designated for the already created channel overlap with each other, it is possible to select between creating the new channel and joining the already created channel. There is a possibility that objects about which information is exchanged may be the same or similar between channels with overlapping regions. For example, when the objects are not similar, the user may create a channel. On the other hand, when the objects are the same or similar, the user may join the existing channel without creating the channel. Therefore, it is possible to inhibit a situation in which a channel similar to the existing channel is unnecessarily created resulting from the overlapping of the region with the existing channel's region.

3. Third Embodiment

Next, a third embodiment will be described with reference to FIG. 13. In the present embodiment, when the position of a user terminal 2 is included in regions of respective two or more channels, the center server 1 gives the user one of rights to post information to the respective channels preferentially over the others based on a user's attribute. The third embodiment is the same as the first embodiment or the second embodiment in other points.

Specifically, when the position of the user terminal 2 indicated by positional information acquired by the positional information acquisition unit 113 is included in each region indicated by region information of at least two communities among channels whose region information is stored in a channel DB 14c, the posting right giving unit 114 prioritizes one of the at least two communities over the others based on suitability of each of the communities to the attribute of the user who uses the user terminal 2. The posting right giving unit 114 executes processing for giving the user a rights to post information to the prioritized community preferentially. The posting right giving unit 114 prioritizes the channel has higher suitability and gives the user the right to post information to the prioritized channel. By this, when it is possible to join a plurality of channels, the user can obtain the right to post information to the channel that is more suitable for the user among the channels.

An example of the user attribute is preference information and the like. An example of the channel attribute is tag information and the like. The posting right giving unit 114 may calculate, as suitability, a degree of similarity between genres the user likes indicated by the preference information and genres of the channel indicated by the tag information. The attribute of the user may include gender, age, generation, place of residence, or the like. The attribute of the channel in this case may be gender, age, generation, place of residence, or the like of members of the channel. The posting right giving unit 114 may calculate, as suitability, for example, the proportion of users who have the same attribute as the user among members of the channel.

Figure 13:
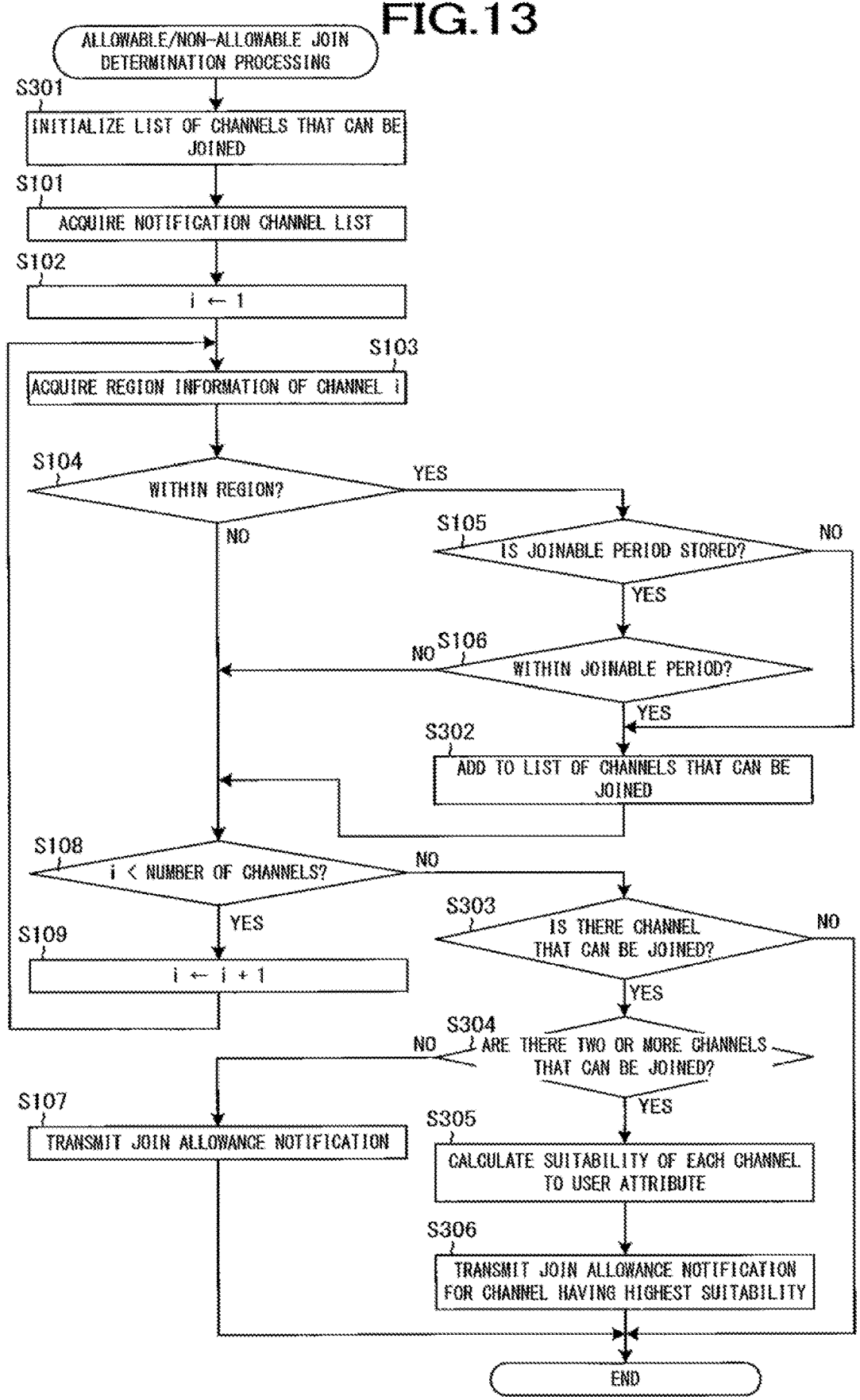
FIG. 13 is a flowchart showing one example of the allowable/non-allowable join determination processing by the system controller of the center server according to one embodiment.

FIG. 13 is a flowchart showing one example of the allowable/non-allowable join determination processing by a system controller 11 of the center server 1 according to the present embodiment. In FIG. 13, steps the same as steps in FIG. 10 are denoted with the same reference signs.

As shown in FIG. 13, the posting right giving unit 114 initializes a list of channels that can be joined (step S301). Then, the posting right giving unit 114 acquires a notification channel list, sets the number i, acquires region information of the channel i, and determines whether the position of the user terminal 2 is within the region of the channel i (steps S101 to S104). When the position of the user terminal 2 is within the region (step S104: YES), the posting right giving unit 114 determines whether a joinable period of the channel i is stored (step S105). When the joinable period is stored (step S105: YES), the posting right giving unit 114 determines whether recording date and time is within the joinable period (step S106). When the recording date and time is within the joinable period (step S106: YES), or when the joinable period is not stored (step S105: NO), the posting right giving unit 114 adds the channel ID of channel i to the list of channels that can be joined (step S302).

When the position of the user terminal 2 is not within the region (step S104: NO), when the recording date and time is not within the joinable period (step S106: NO), or after step S302 ends, the posting right giving unit 114 determines whether the number i is less than the number of channels (step S108). When the number i is less than the number of channels (step S108: YKS), the posting right giving unit 114 increments the number i by 1 (step S109) and executes step S103.

On the other hand, when the number i is not less than the number of channels (step S108: NO), the posting right giving unit 114 determines whether the list of channels that can be joined includes a channel ID (step S303). When the list of channels that can be joined does not include the channel ID (step S303: NO), the allowable/non-allowable join determination processing ends.

On the other hand, when the list of channels that can be joined includes the channel ID (step S303: YES), the posting right giving unit 114 determines whether the list of channels that can be joined includes two or more channel IDs (step S304). When the list of channels that can be joined does not include two or more channel IDs (step S304: NO), the posting right giving unit 114 transmits a join allowance notification including the channel ID included in the list of channels that can be joined to the user terminal 2 (step S107), and the allowable/non-allowable join determination processing ends.

On the other hand, when the list of channels that can be joined includes two or more channel IDs (step S304: YES), the posting right giving unit 114 calculates suitability of a channel to the user attribute for each channel whose channel ID is included in the list of channels that can be joined (step S305). Then, the posting right giving unit 114 transmits the join allowance notification including the channel ID of a channel having the highest calculated suitability among the channels whose channel IDs are included in the list of channels that can be joined to the user terminal. 2 (step S306). Then, the allowable/non-allowable join determination processing ends. The user terminal 2 that has received the join allowance notification displays a notification screen 600. Here, when the user presses a join button 620, the channel having the highest suitability to the attribute of the user is prioritized the others and the right to post information to the prioritized channel is given to the user preferentially.

As described above, according to the present embodiment, when the user goes into the regions designated for a first channel and a second channel, one of the first channel and the second channel is prioritized over the other based on suitability of each channel to the user's attribute and the right to post information to the prioritized channel is given to the user. The user can join the channel that is relatively suitable for the user among the channels having overlapping regions.

4. Fourth Embodiment

Next, a fourth embodiment will be described with reference to FIGS. 14 and 15. In the present embodiment, the center server 1 determines, based on a history of positional information of the user terminal 2, whether a right to post information to a channel can be given to a user. The fourth embodiment is the same as the first embodiment to the third embodiment in other points.

Specifically, the positional information acquisition unit 113 acquires the history of the positional information of the user terminal 2. For example, every time the positional information acquisition unit 113 acquires the positional information from the user terminal 2, the positional information acquisition unit 113 may add this positional information to the positional information DB 14b. Then, the positional information acquisition unit 113 may acquire the history of the positional information from the positional information DB 14b as necessary. Alternatively, the user terminal 2 may store the history of the positional information. Then, the positional information acquisition unit 113 may acquire the history of the positional information from the user terminal 2.

When a position indicated by at least one piece of positional information among the positional information included in the history acquired by the positional information acquisition unit 113 is included in a region indicated by region information stored in the channel. DB 14c, the posting right giving unit 114 executes processing for giving the user the right to post information to the channel corresponding to the region information. This allows the user to obtain the right to post information to a channel of which the user has entered the region in the past but the user has now left the region. This is useful, for example, when the user notices the existence of a channel after leaving the region of the channel.

Figure 14:
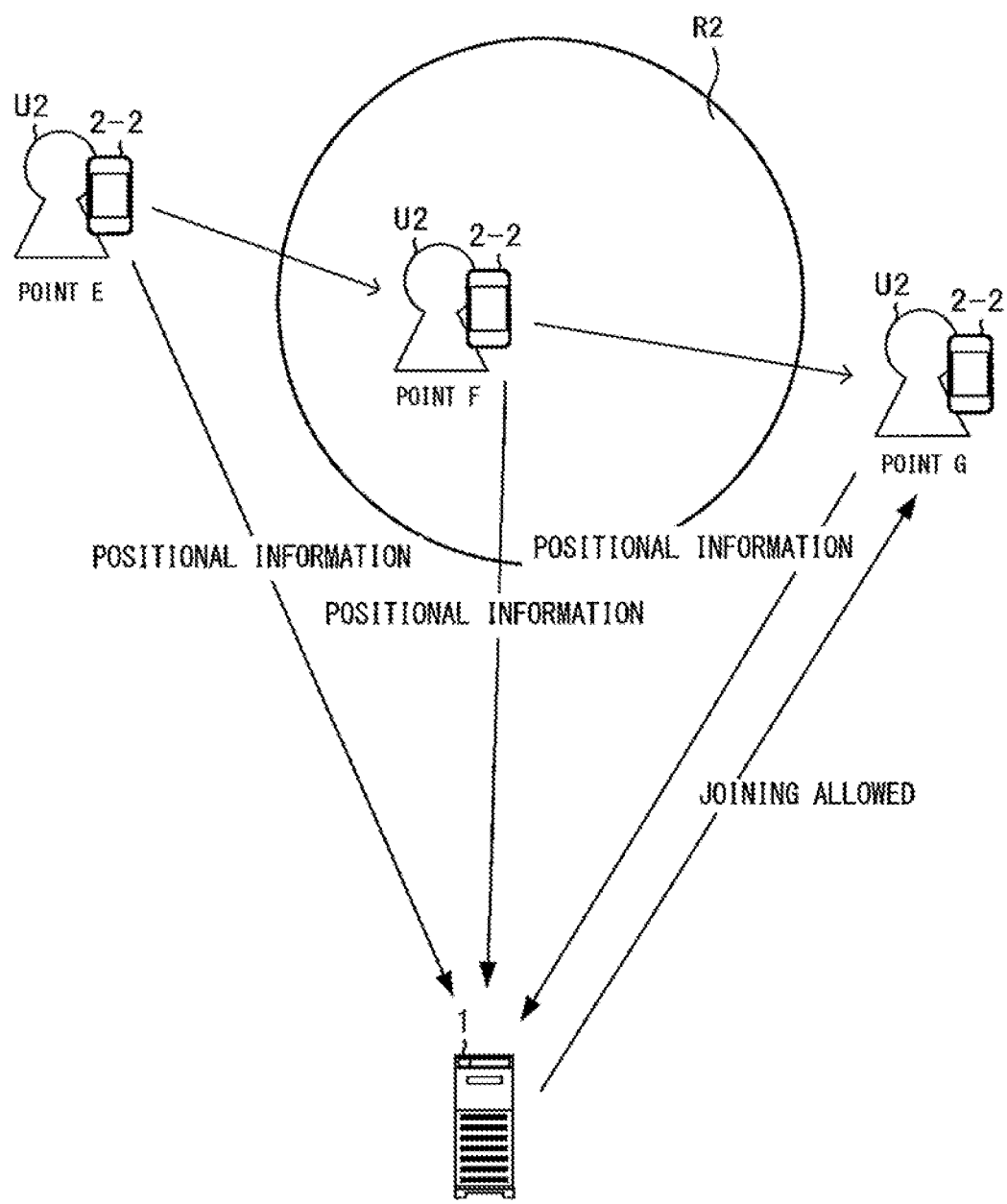
FIG. 14 is a diagram showing one example of how the user behaves until the user joins a channel.

FIG. 14 is a diagram showing one example of how a user behaves until the user joins a channel. For example, it is assumed that the user U2 has not joined the channel C2 and has not registered the channel C2 as a notification target. As shown in FIG. 14, the the user U2 carrying a user terminal 2-2 is first located at a point E. Here, the user terminal 2-2 acquires and transmits positional information to the center server 1. The point E is outside a region R2 designated for the channel C2. Thereafter, the user U2 moves to a point F, where the user terminal 2-2 acquires and transmits positional information to the center server 1. The point F is within the region R2. Thereafter, the user U2 moves to a point G, where the user terminal 2-2 acquires and transmits positional information to the center server 1. The point G is outside the region R2. The user U2 searches for the channel C2 with the dedicated application and performs an operation for inquiring whether it is possible to join the channel C2. Although the user terminal 2-2 is currently located outside the region R2, the positional information DB 14b of the center server 1 stores the positional information when the user terminal 2-2 is located at the point F. Therefore, the center server 1 determines that the user U2 can join the channel C2, and based on a result of the determination, the user U2 performs an operation for join.

For a channel for which a joinable period has been set, the posting right giving unit 114 also takes the joinable period into consideration. Specifically, when the position indicated by at least one piece of the positional information included in the history is included in the region indicated by the region information, and the time at which the user terminal 2 is located at the position indicated by the at least one piece of positional information (for example, recording date and time) is included in the joinable period, the posting right giving unit 114 executes processing for giving the user the right to post information.

It may be determined in advance how many hours (or how many days, weeks, or the like) after the user terminal 2 leaves the designated region it is possible to join the channel, or this may be able to be set by the establisher.

Figure 15:
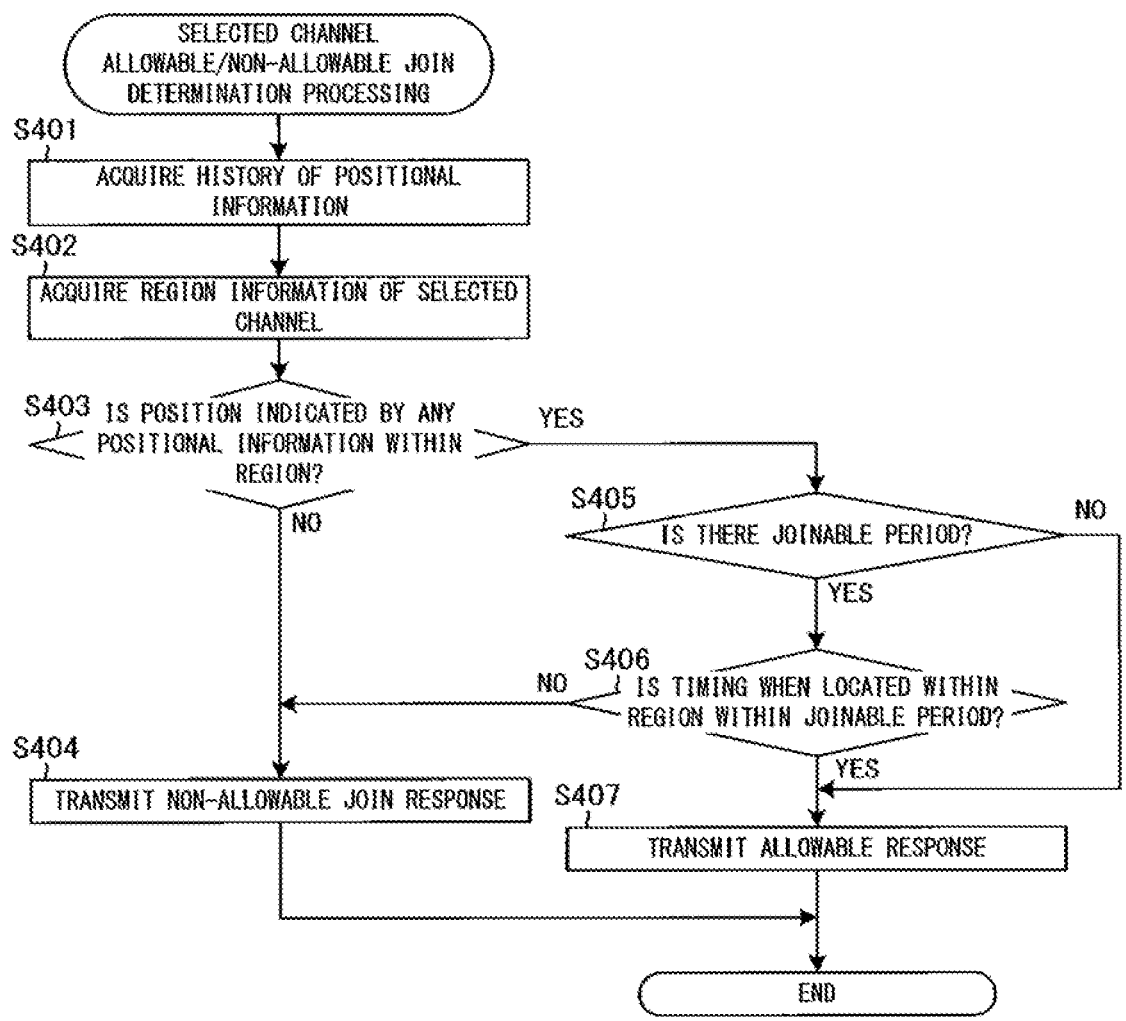
FIG. 15 is a flowchart showing one example of selected channel allowable/non-allowable join determination processing by the system controller of the center server according to one embodiment.

FIG. 15 is a flowchart showing one example of selected channel allowable/non-allowable join determination processing by a system controller 11 of the center server 1 according to the present embodiment. For example, when the user performs an operation for inquiring whether the user can join a selected channel, the user terminal 2 transmits, to the center server 1, a join inquiry including a user ID of the user who uses the user terminal 2 and a channel ID of the selected channel. For example, when the center server 1 receives the join inquiry, the selected channel allowable/non-allowable join determination processing is executed.

As shown in FIG. 15, the positional information acquisition unit 113 acquires the history of the positional information associated with the user ID of the user who uses the user terminal 2 from the positional information DB 14b (step S401). Then, the posting right giving unit 114 acquires the region information associated with the channel ID f the channel selected by the user (step S402). Then, the posting right giving unit 114 determines whether the position of the user terminal 2 indicated by at least one piece of the positional information included in the acquired history is within the region indicated by the acquired region information (step S403). When the position of the user terminal 2 indicated by any one piece of the positional information is not within the region (step S403; NO), the posting right giving unit 114 transmits a join non-allowance response to the user terminal 2 (step S404), and the selected channel allowable/non-allowable join determination processing ends. The user terminal 2 that has received the join non-allowance response displays, for example, a message that it is necessary to go into the designated region in order to join the selected channel.

On the other hand, when the position of the user terminal 2 indicated by at least one piece of positional information is within the region (step S403: YES), the posting right giving unit 114 determines whether the joinable period is stored in the channel DB 14c in association with the channel ID of the selected channel (step S405). When the joinable period is stored (step S405: YES), the posting right giving unit 114 determines whether the recording date and time included in the at least one piece of positional information, in the history of the positional information, indicating that the user terminal 2 is located within the region is within the joinable period (step S406). When the recording date and time is not within the joinable period (step S406: NO), the process proceeds to step S404.

On the other hand, when the recording date and time is within the joinable period (step S406: YES), or, when the joinable period is not stored (step S405: NO), the posting right giving unit 114 transmits the join allowance response to the user terminal 2 (step S407), and the selected channel allowable/non-allowable join determination processing ends. The user terminal 2 that has received the join allowance response displays a message that it is possible to join the selected channel. Here, when the user performs an operation for requesting join, the posting right giving unit 114 adds the user ID of the user who has requested join to a member list of the selected channel. By this operation, the right to post information is given to the user.

As described above, according to the present embodiment, the right to post information is given in consideration of the past position of the user terminal 2. Therefore, even after leaving the designated region, the user can obtain the right to post information to the channel.

5. Fifth Embodiment

Next, a fifth embodiment will be described with reference to FIGS. 16 and 17. In the present embodiment, when a user terminal 2 goes into a coverage area of a wireless communication from out of the coverage area, the center server 1 acquires from the user terminal 2 the history of positional information while the user terminal 2 is located out of the coverage area, and determines whether a right to post information to a channel can be given to a user. The fifth embodiment is the same as the fourth embodiment in other points.

The user terminal 2, which is a portable terminal, normally transmits the positional information by wireless communication. Therefore, when a designated region is located out of the overage area of the wireless communication, the user terminal 2 cannot transmit the positional information indicating that the user terminal 2 is located within the region. If the region designated for the channel is located out of the overage area of the wireless communication, the user cannot join the channel. Therefore, even while the user terminal 2 is located out of the coverage area, the user terminal 2 periodically acquires the positional information. Furthermore, the user terminal 2 accumulates the acquired positional information. When the user terminal 2 goes into the coverage area of the wireless communication, the user terminal 2 transmits the history of the accumulated positional information to the center server 1. In this way, the positional information acquisition unit 113 acquires the history of the positional information from the user terminal 2.

Figure 16:
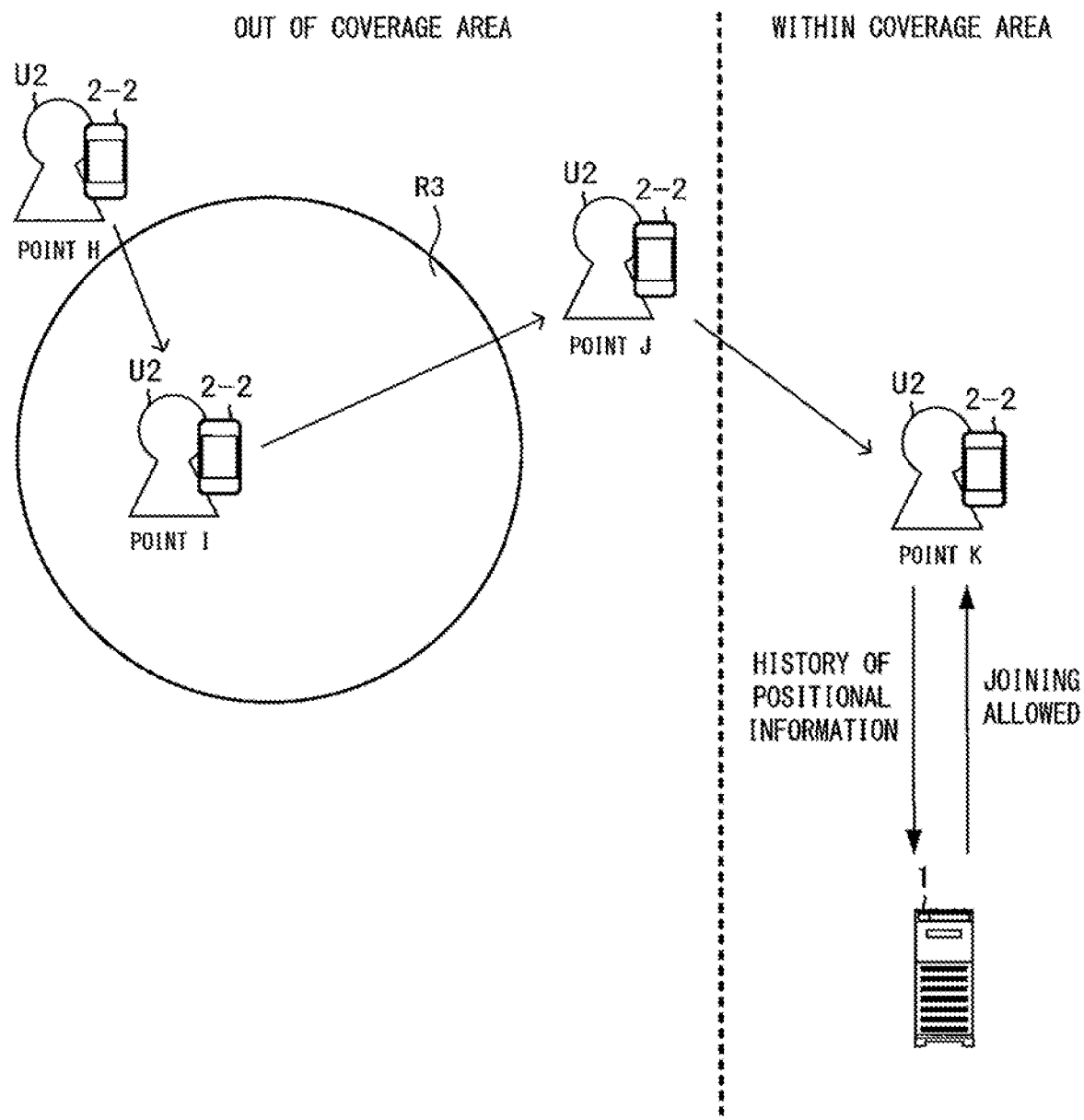
FIG. 16 is a diagram showing one example of how the user behaves until the user joins the channel.

FIG. 16 is a diagram showing one example of how the user behaves until the user joins a channel. For example, it is assumed that the user U2 has registered a channel C3 as a target for which the user receives a notification when going into the region. As shown in FIG. 16, a region R3 designated for the channel C3 is out of the overage area of the wireless communication. The user U2 carrying user terminal 2-2 first moves from a point I via a point I to a point J. Among the points H to J, the point I is within the region R3. At each of the point H to J, the user terminal. 2 acquires positional information. However, since all of the points H to J are out of the overage area of the wireless communication, the user terminal 2 stores the positional information acquired at each point. Thereafter, the user U2 moves to a point K. The point K is within the coverage area of the wireless communication. Therefore, the user terminal 2-2 transmits the history of the positional information stored so far to the center server 1. Although the user terminal 2-2 is currently located outside the region R3, the history of the positional information includes the positional information while the user terminal 2-2 is located at the point I. Therefore, the center server 1 determines that the user U2 can join the channel C2, and causes, for example, the user terminal 2-2 to display the notification screen 600 indicating that the user has entered the region R3. On this screen, the user U2 performs an operation for join.

Figure 17:
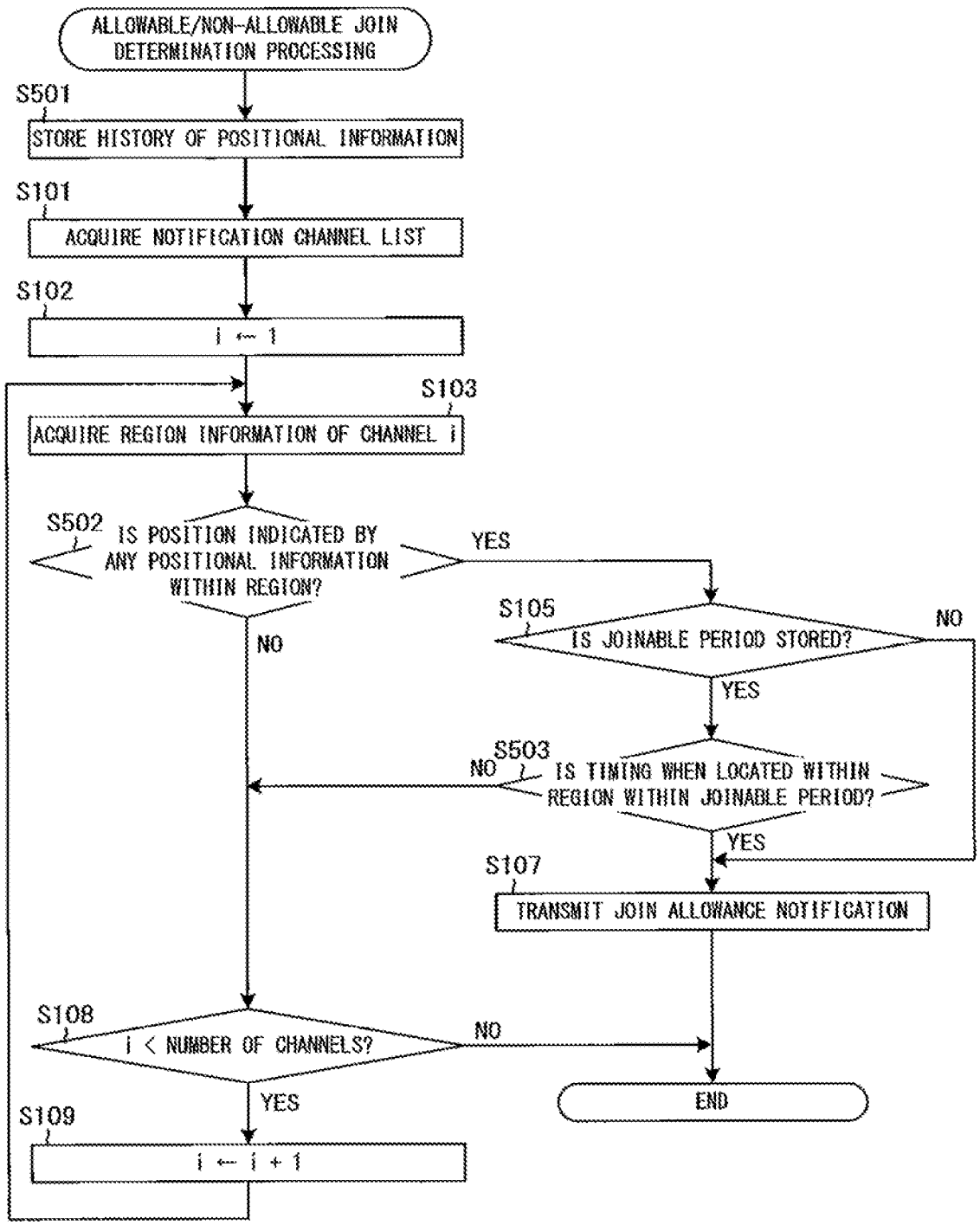
FIG. 17 is a flowchart showing one example of the allowable/non-allowable join determination processing by the system controller of the center server according to one embodiment.

FIG. 17 is a flowchart showing one example of allowable/non-allowable join determination processing by a system controller 11 of the center server 1 according to the present embodiment. In FIG. 17, steps the same as steps in FIG. 10 are denoted with the same reference signs. The following particularly describes a case where the center server 1 acquires the history of the positional information from the user terminal 2.

As shown in FIG. 17, the positional information acquisition unit 113 stores the history of the positional information received from the user terminal 2 in a positional information DB 14b (step S501). Then, a posting right giving unit 114 acquires a notification channel list, sets the number i, and acquires region information of the channel i (steps S101 to S1.03). Then, the posting right giving unit 114 determines whether the position of the user terminal 2 indicated by at least one piece of the positional information included in the received history is within the region indicated by the acquired region information (step S502). When the position of the user terminal indicated by any one piece of the positional information is not within the region (step S502: NO), the posting right giving unit 114 determines whether the number i is less than the number of channels (step S108). When the number i is less than the number of channels (step S108: YES), the posting right giving unit 114 increments the number i by 1 (step S109) and executes step S103. On the other hand, when the number i is not less than the number of channels (step S108: NO), the allowable/non-allowable join determination processing ends.

In step S502, when the position of the user terminal 2 indicated by at least one piece of positional information is within the region (step S502: YES), the posting right giving unit 114 determines whether the joinable period is stored (step S105), when the joinable period is stored (step S105: YES), the posting right giving unit 114 determines whether the recording date and time included in the at least one piece of positional information, in the history of the positional information, indicating that the user terminal 2 is located within the region is within the joinable period (step S503). When the recording date and time is not within the joinable period (step S503: NO), the process proceeds to step S108.

On the other hand, when the recording date and time is within the joinable period (step S503: YES), or, when the joinable period is not stored (step S105: NO), the posting right giving unit 114 transmits the join allowance notification to the user terminal 2 (step S107), and the allowable/non-allowable join determination processing ends.

As described above, according to the present embodiment, the right to post information is given in consideration of the position of the user terminal 2 when the user terminal 2 is located in a place where the positional information cannot be transmitted. Therefore, even when the region is designated in such a place, the user can obtain the right to post information to the channel.

6. Sixth Embodiment

Next, a sixth embodiment will be described with reference to FIGS. 18 to 20. In the present embodiment, it is possible to create a channel with a region where joining the channel is allowed also moving as a user terminal 2 carried by an establisher moves. The sixth embodiment is the same as the first embodiment to the fifth embodiment in other points.

Figure 18:
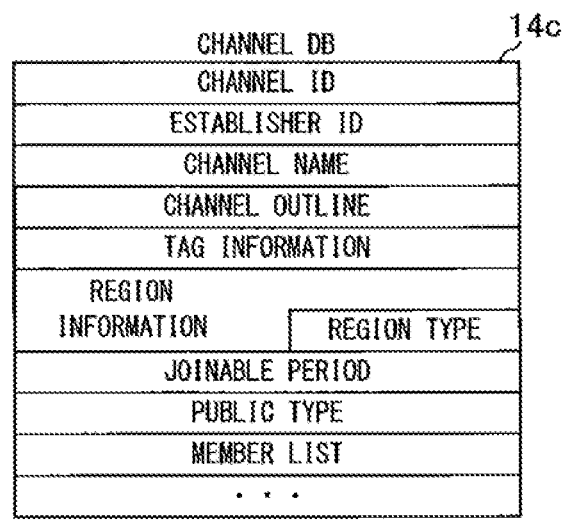
FIG. 18 is a diagram showing an example of information stored in a channel DB in one embodiment.

FIG. 18 is a diagram showing an example of information stored in a channel DB 14c in the present embodiment. The channel DB 14c shown in FIG. 18 is different from the channel DB 14c shown in FIG. 3 in that in FIG. 18, the region information includes a region type. The region type indicates whether a designated region is a fixed region or a dynamic region. The fixed region is a region that does not move as described in the above embodiments. The dynamic region is a region that moves as the user terminal 2 carried by the establisher moves. When a channel is created, the establisher can select either the fixed region or the dynamic region. When the dynamic region is selected, the establisher may be able to designate a size of the region such as a radius of the region.

A channel information registration unit 112 acquires region information including the region type indicating that the designated region is based on the position of the user terminal 2 used by the establisher of the channel. The region based on the position of the user terminal 2 used by the establisher usually includes the position of the user terminal 2. For example, the position of the user terminal 2 used by the establisher may be the center point of the region. Examples of a region shape include a circle, ellipse, square, rectangle, and diamond.

The positional information acquisition unit 113 further acquires positional information of the user terminal 2 used by the establisher. Then, the positional information acquisition unit 113 stores the acquired positional information in the positional information DB 14b. In order to designate the dynamic region, the user terminal 2 used by the establisher needs to have a function of acquiring the positional information.

In a case where the user terminal 2 of a user different from the establisher is located in a region determined based on the position indicated by the positional information when the user terminal 2 of the establisher is located at the position indicated by the positional information acquired by the positional information acquisition unit 113, the posting right giving unit 114 executes processing for giving to the user a right to post information to the channel.

Figure 19:
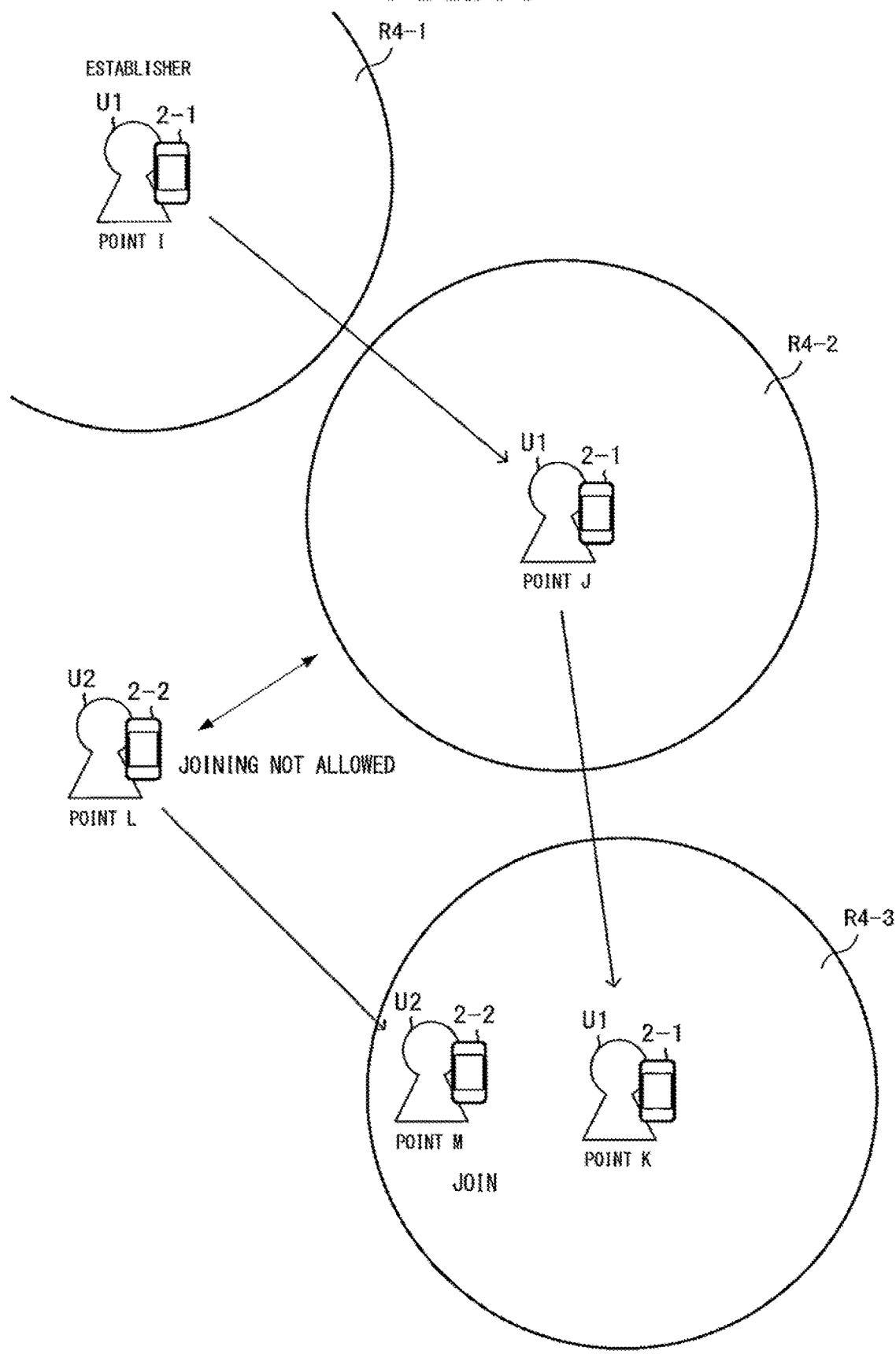
FIG. 19 is a diagram showing one example of how the user behaves until the user joins the channel.

FIG. 19 is a diagram showing one example of how the user behaves until the user joins the channel. For example, an establisher U1 designates the dynamic region in order to create a channel C4 related to a parade held in a certain district. As shown in FIG. 19, the establisher U1 carrying a user terminal 2-1 is initially located at a point I. Thereafter, the establisher U1 moves from the point I via a point J to a point K as the parade moves. According to this movement, the dynamic region moves to regions R4-1, R4-2, and R4-3. Meanwhile, a user U2 carrying a user terminal 2-2 intends to approach the parade in order to look at the parade. When the establisher U1 is at the point J, the user U2 is at a point L. Since the point L is not included in the region R4-2, the user U2 cannot join the channel C4. Thereafter, when the establisher U1 is at the point K, the user U2 moves to a point: M. Since the point M is included in the region R4-3, the user U2 can join the channel. The user U2 actually joins the channel at this time. Thereafter, for example, even if the user U2 moves out of the dynamic region as the establisher U1 moves, the user U2 can post information to the channel C4.

Figure 20:
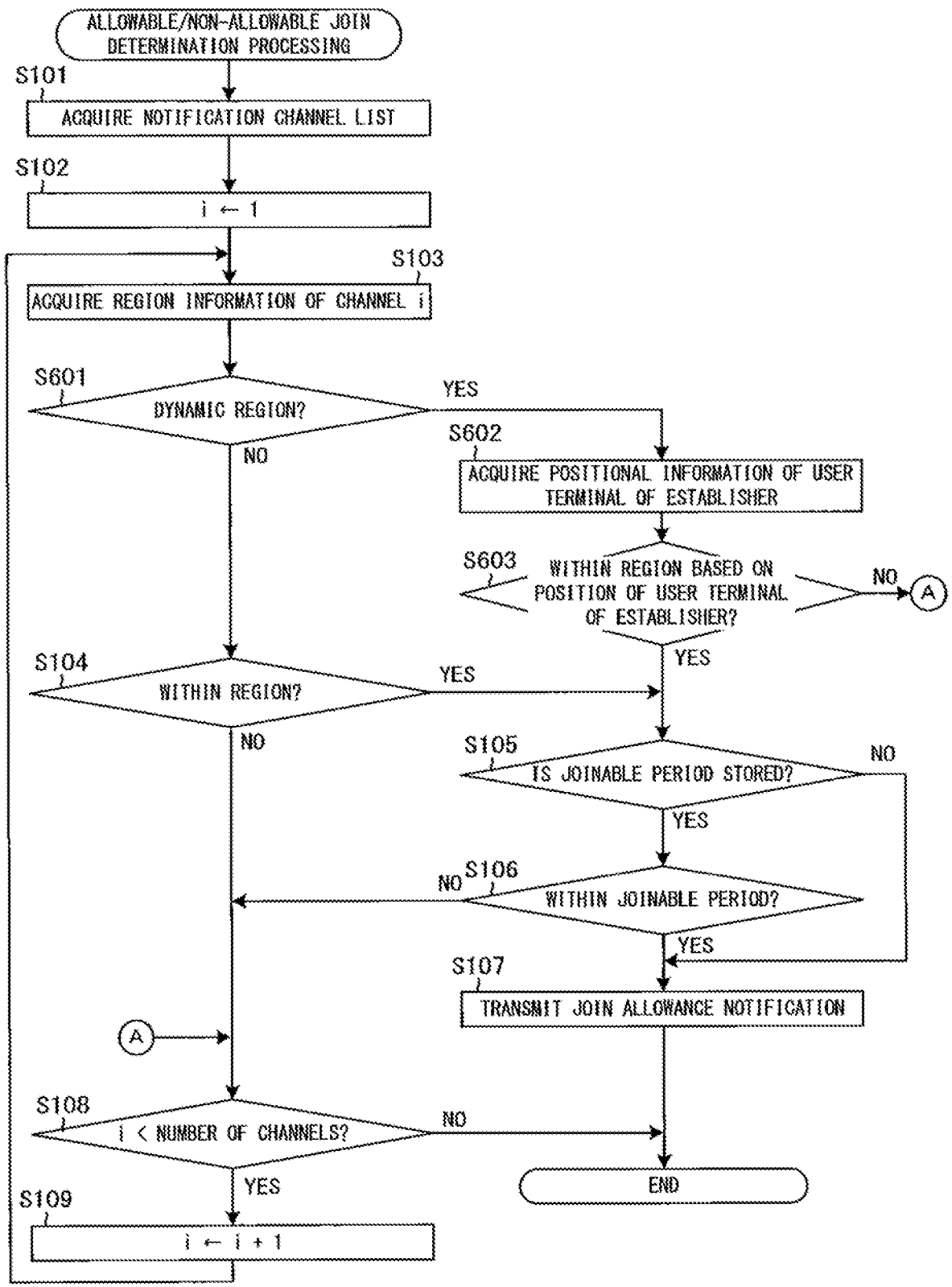
FIG. 20 is a flowchart showing one example of the allowable/non-allowable join determination processing by the system controller of the center server according to one embodiment.

FIG. 20 is a flowchart showing one example of allowable/non-allowable join determination processing by a system controller 11 of the center server 1 according to the present embodiment. In FIG. 20, steps the same as steps in FIG. 10 are denoted with the same reference signs.

As shown in FIG. 20, the posting right giving unit 114 acquires the notification channel list, sets the number i, and acquires region information of the channel i (steps S101 to S103). Then, the posting right giving unit 114 determines whether the region type stored in the channel DB 14c in association with the channel ID of the channel i is "dynamic region" (step S601). When the region type is not "dynamic region" (step S601: NO), the posting right giving unit 114 determines whether the position of the user terminal 2-2 is within the region of the channel i (step S104). When the position of the user terminal 2 is not within the region (step S104: NO), the posting right giving unit 114 determines whether the number i is less than the number of channels (step S108). When the number i is less than the number of channels (step S108: YES), the posting right giving unit 114 increments the number i by 1 (step S109) and executes step S103. On the other hand, when the number i is not less than the number of channels (step S108. NO), the allowable/non-allowable join determination processing ends.

In step S601, when the region type is "dynamic region" (step S601: YES), the posting right giving unit 114 acquires the establisher ID and the region information stored in the channel. DB 14c in association with the channel ID of the channel i. The posting right giving unit 114 acquires the latest positional information associated with the establisher ID from the positional information DB 14b (step S602). Then, the posting right giving unit 114 determines whether the position of the user terminal 2-2 is within the region determined based on the position of the user terminal 2-1 of the establisher shown in the acquired positional information (step S603). For example, the posting right giving unit 114 calculates a distance between the position of the user terminal 2-2 and the position of the user terminal 2-1. The posting right giving unit 114 determines whether the calculated distance is equal to or less than the radius included in the region information. When the distance is not equal to or less than the radius, the posting right giving unit 114 determines that the position of the user terminal 2-2 is not within the region (step S603: NO). In this case, the process proceeds to step S108.

On the other hand, when the distance is equal to or less than the radius, the posting right giving unit 114 determines that the position of the user terminal 2-2 is within the region (step S603: YES). In this case, the posting right giving unit 114 determines whether the joinable period of the channel i has been stored (step S105). When the joinable period is stored (step S105: YES), the posting right giving unit 114 determines whether recording date and time is within the joinable period (step S106). When the recording date and time is not within the joinable period (step S106: NO), the process proceeds to step S108. When the recording date and time is within the joinable period (step S106: YES), or when the joinable period is not stored (step S105: NO), the posting right giving unit 114 transmits a join allowance notification (step S107), and the allowable/non-allowable join determination processing ends.

As described above, according to the present embodiment, the designated region moves as the establisher moves. The user who goes into the region is given the right to post information to the channel. Therefore, it is possible to form a channel where information about a movable thing exchanged.

7. Seventh Embodiment

Next, a seventh embodiment will be described with reference to FIGS. 21 to 24. In the present embodiment, for a user who has a right to post information to an existing channel, it is possible to create a subcommunity different from the channel. The seventh embodiment is the same as the first embodiment to the sixth embodiment in other points.

FIG. 21 is a diagram showing an example of information stored in a channel DB 14c and a subcommunity DB 14e in the present embodiment. The channel DB 14c shown in FIG. 21 is different from the channel DB 14c shown in FIG. 3 in that the channel DB 14*c* shown in FIG. 21 includes a subcommunity list. The subcommunity list is a list of community IDs of subcommunities based on the channel. The community ID is identification information for identifying a subcommunity.

The subcommunity DB 4*e* is further stored in a storage unit 14 of a center server 1. In the subcommunity DB 14*e*, subcommunity information regarding a created subcommunity is stored for each subcommunity. As the subcommunity information, specifically, a community ID, channel ID, establisher ID, community name, community outline, region information, joinable period, public type, member list, and the like are stored in association with each other in the subcommunity DB14*e*. The channel ID indicates an underlying channel. The establisher ID is a user ID of an establisher of the subcommunity. The region information indicates a region designated by the establisher of the subcommunity. The joinable period may or may not be stored in the subcommunity DB 14*e* depending on selection by the establisher. The public type indicates whether to open information posted to the subcommunity to users who has not joined the subcommunity among members of the underlying channel. The member list is a list of user IDs of users that have joined the subcommunity. The member list may also include the user ID of the establisher of the subcommunity.

In the present embodiment, the channel information registration unit 112 acquires region information indicating the region designated by the establisher who requests creation of the subcommunity for those having a right to post information to the underlying specific channel. Usually, a user who has the right to post information to the underlying channel can be the establisher of the subcommunity for the channel. A method of designating the region and details of the region information are the same as for the channel.

The channel information registration unit 112 stores the region information acquired by the channel information registration unit 112 and the community ID for identifying the subcommunity in association with each other in the subcommunity DB 14*e*.

When the position indicated by positional information of a user terminal 2 acquired by the positional information acquisition unit 113 is included in the region indicated by the region information stored in the subcommunity DB14*e*, and the user of the user terminal 2 has the right to post information to the underlying channel, the posting right giving unit 114 executes processing for giving the user a right to post information to the subcommunity identified with the community ID stored in association with the region information. The given right allows the user to post information regardless of whether the user terminal 2 is located within the region. For example, the posting right giving unit 114 associates the community 10 of the subcommunity with the user ID of the user who is given the right to post information.

When the channel and the subcommunity are compared, the establisher and the members can basically do the same thing. For example, the establisher designates a region. The region for the channel and the region for the subcommunity may or may not overlap each other. The establisher may or may not designate the joinable period. The user can obtain the right to post information to the subcommunity when entering the designated region. However, when creating the subcommunity, the establisher needs to select an underlying existing channel from the channels to which the establisher has the right to post information. Only users who have the right to post information to the underlying existing channel (that is, members of the channel) are given the right to post information to the subcommunity. Therefore, the subcommunity is formed by at least some of the members in the specific channel.

Except for the above, the processing of a channel information acquisition unit 111 to the channel information provision unit 115 regarding the subcommunity may be the same as the processing regarding the channel.

Figure 22:
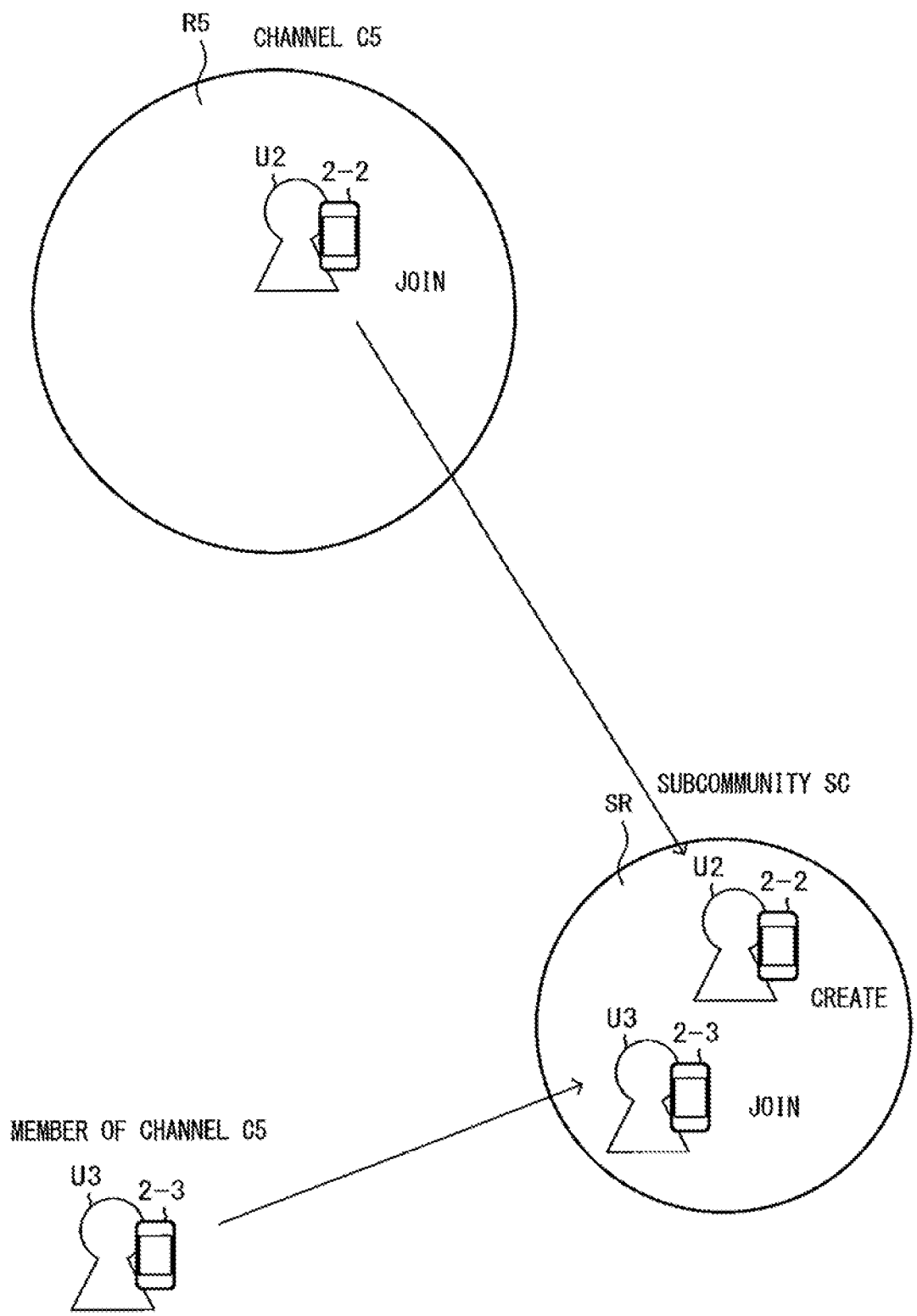
FIG. 22 is a diagram showing one example of how a subcommunity is formed.

FIG. 22 is a diagram showing one example of how a subcommunity is formed. As shown in FIG. 22, the user U2 carrying the user terminal 2-2 joins a channel C5 by entering a region R5 designated for the channel C5. The user U2 who has left the region R5 designates a region SR and creates a subcommunity SC after, for example, several days have passed. A user U3 is a member of the channel C5. The user U3 carrying a user terminal. 2-3 moves into the region SR and joins the subcommunity SC. In this way, the subcommunity is formed.

As described above, by going into a region designated for a channel, users having no less than a certain degree of interest in a thing within the region form the channel. However, among channel members, when some time elapses after leaving the designated region, some members may become less interested in the thing. For example, if the member's place of residence is far from the region, or if the frequency of events in the region is low, the members may not have much opportunity to go into the region. The channel may be less frequently used by such members. Therefore, by designating a new region separately from the region designated for the channel and creating a subcommunity, users such as users who can easily go into the newly designated region and/or users who are interested in a thing in the newly designated region form the subcommunity. As the subcommunity warms up, it is expected that information exchange in the underlying channel will become active.

For example, it can be considered to create a subcommunity in order to gather members of a channel near the user and have a gathering such as a dining party. For example, it can be considered to designate a region in a place where an event that attracts interest of the channel members is held and to create a subcommunity. For example, as a branch of a channel, it can be considered to create a subcommunity for each residential district.

Figure 23:
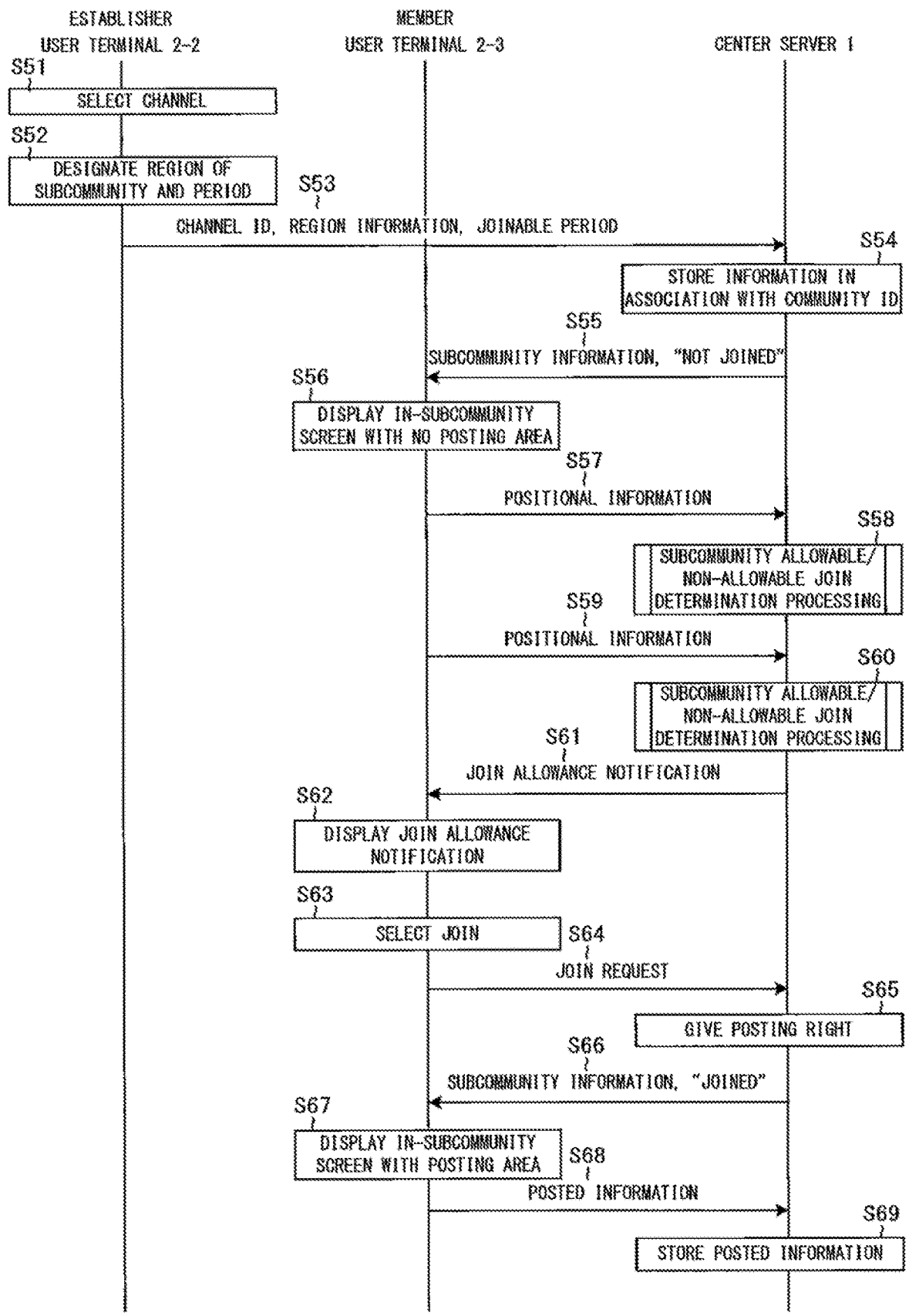
FIG. 23 is a sequence diagram showing one example of the operation of the channel system according to one embodiment.

FIG. 23 is a sequence diagram showing one example of an operation of a channel system S according to the present embodiment. As shown in FIG. 23, when the subcommunity establisher U2 selects creation of the subcommunity SC, the user terminal 2-2 displays, for example, a list of channels which the establisher U2 has joined. The establisher U2 selects the underlying channel C5 from the list of channels (step S51). Alternatively, creation of the subcommunity may be possible in an in-channel screen 400-2. In this case, a channel corresponding to the in-channel screen 400-2 is selected as a base of the subcommunity. Then, the establisher U2 designates a region. Also, the establisher U2 inputs the joinable period and other information regarding the subcommunity SC (step S52). The user terminal 2-2 transmits the input region information, the joinable period, the channel ID of the selected channel, and other information to the center server 1 (step S53). The center server 1 stores the information in association with a newly generated community ID in the subcommunity DB 14*e* (step S54). Also, the center server 1 adds the generated community ID to the subcommunity list stored in the channel DB 14*c* in association with the channel ID of the channel C5.

Thereafter, the establisher U2 announces in the channel C5 that the subcommunity SC has been created. Alternatively, the center server 1 may automatically transmit a notification indicating that the subcommunity SC has been created to the user terminals 2 of the members of the channel C5. By the operation of the user U3 who has received the notification, the user terminal 2-3 transmits a request for detailed information of the subcommunity SC to the center server 1. In response to this, the center server 1 acquires information associated with the community ID of the subcommunity SC from the subcommunity DH 14e. Also, the center server 1 determines whether the member list associated with the community ID of the subcommunity SC includes the user 10 of the user U3. At this time, since the member list does not include the user ID of the user U3, the center server 1 transmits the acquired information about the subcommunity SC and a join status indicating "not joined" to the user terminal 2-3 (step S55). The user terminal 2-3 displays an in-subcommunity screen based on the information received from the center server 1 (step S56). The in-subcommunity screen is the same as the in-channel screen 400, except that the information about the subcommunity is displayed. Here, since the join status is "not joined", the user terminal 2-3 does not display the posting area.

Thereafter, the user terminal 2-3 periodically transmits the positional information to the center server 1 (steps S57 and S59). Every time the center server 1 receives the positional information, the center server 1 executes subcommunity allowable/non-allowable join determination processing (step S58 and S60).

Figure 24:
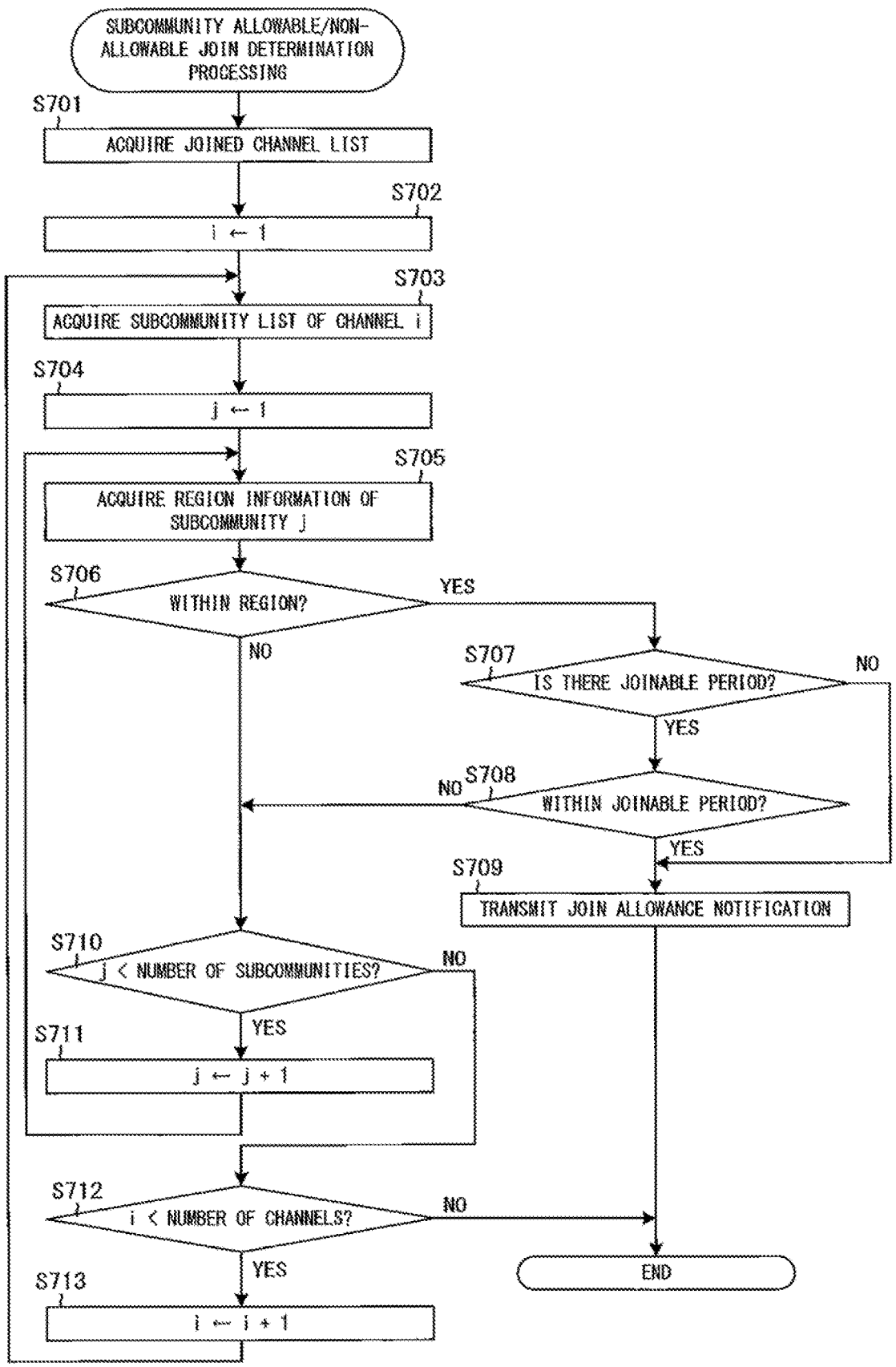
FIG. 24 is a flowchart showing one example of subcommunity allowable/non-allowable join determination processing by the system controller of the center server according to one embodiment.

FIG. 24 is a flowchart showing one example of subcommunity allowable/non-allowable join determination processing by a system controller 11 of the center server 1 according to the present embodiment. As shown in FIG. 24, the posting right giving unit 114 acquires, from a membership DB 14a, a joined channel list associated with the user ID of the user U3 who uses the user terminal 2-3 that has transmitted positional information (step S701). Then, the posting right giving unit 114 sets the number i at 1 (step S702).

Then, the posting right giving unit 114 acquires the subcommunity list associated with the channel ID of the channel i from the channel DH 14c (step S703). The channel i is a channel identified with the i-th channel ID out of the channel IDs included in the joined channel list.

Then, the posting right giving unit 114 sets the number j at 1 (step S704). Then, the posting right giving unit 114 acquires the region information associated with the community ID of the subcommunity j from the subcommunity DB 14e (step S705). The subcommunity j is a subcommunity identified with the j-th community ID among the community IDs included in the subcommunity list. Then, the posting right giving unit 114 determines whether the position of the user terminal 2-3 is within the region indicated by the acquired region information (step S706). When the position of the user terminal 2-3 is not within the region (step S706: NO), the posting right giving unit 114 determines whether the number j is less than the number of subcommunities whose community IDs are included in the subcommunity list (step S710). When the number j is less than the number of subcommunities (step S710: YES), the posting right giving unit 114 increments the number j by 1. (step S711) and executes step S705.

On the other hand, when the number j is not less than the number of subcommunities (step S710: NO), the posting right giving unit 114 determines whether the number i is less than the number of channels whose channel IDs are included in the joined channel list (step S712). When the number i is less than the number of channels (step S712: YES), the posting right giving unit 114 increments the number i by 1 (step S713) and executes step S703. On the other hand, when the number i is not less than the number of channels (step S712: NO), the subcommunity allowable/non-allowable join determination processing ends.

In step S706, when the position of the user terminal 2-3 is within the region (step S706: YES), the posting right giving unit 114 determines whether the joinable period is stored in the subcommunity DB 14e in association with the community ID of the subcommunity j (step S707). When the joinable period is stored (step S707: YES), the posting right giving unit 114 determines whether the recording date and time included in the received positional information is within the joinable period (step S708). When the recording date and time is not within the joinable period (step S708: NO), the process proceeds to step S710.

On the other hand, when the recording date and time is within the joinable period (step S708: YES), or when the joinable period is not stored (step S707: NO), the posting right giving unit 114 transmits the join allowance notification including the community ID of the subcommunity j, the subcommunity name, and the like to the user terminal 2-3 (step S709), and the subcommunity allowable/non-allowable join determination processing ends.

In FIG. 23, the join allowance notification for the subcommunity SC iv transmitted from the center server 1 to the user terminal 2-3 by the subcommunity allowable/non-allowable join determination processing in step S60 (step S61). In response to this operation, the user terminal 2-3 displays the notification screen 600 (step S62). Here, when the user U3 presses a join button 620 (step S63), the user terminal 2-3 transmits the join request in which the community ID included in the join allowance notification is set to the center server 1 (step S64). In response to this operation, the center server 1 executes processing for giving the right for the user U3 to post information (step S65). For example, the center server 1 adds the user ID of the user U3 to the member list stored in the subcommunity DB 14e in association with the community ID included in the join request.

Thereafter, in response to the request from the user terminal 2-3, the center server 1 acquires information associated with the community in of the subcommunity SC which the user U3 has joined from the subcommunity DB 14e. Since the member list associated with the community ID of the subcommunity SC includes the user ID of the user U3, the center server 1 transmits the acquired information about the subcommunity SC and a join status indicating "joined" to the user terminal 2-3 (step S66). The user terminal 2-3 displays the in-subcommunity screen based on the information received from the center server 1 (step S67). Here, since the join status is "joined", the user terminal 2-3 displays the posting area. Thereafter, the user U3 inputs information to post by operating the posting area. The user terminal 2-3 transmits the input information to the center server 1 as posted information (step S68). The center server 1 stores the received posted information in association with the community ID of the subcommunity SC in the posted information DB 14d (step S69).

As described above, according to the present embodiment, by designating a new region separately from the region designated for the already created channel, a new subcommunity is created that gives the right to post information to the user who has the right to post information to the already created channel. Therefore, among users who form the already created channel, users who can go to the newly designated region and users who are within the region can form a new subcommunity. Since users who already have common interests form a subcommunity, it is expected that the subcommunity will warm up. This inhibits interest in a thing about which information is exchanged in the channel from diminishing as time elapses since the user leaves the region designated for the already created channel.

8. Eighth Embodiment

Next, an eighth embodiment will be described. The eighth embodiment may be similar to either one of the first embodiment to the seventh embodiment except for points described below.

[8-1. Configuration of Channel System]

In the present embodiment, each user terminal 2 has a function of optically reading an information code. The information code is a code generated by encoding some information and is an optically readable code. In the present embodiment, information with which a channel can be identified is encoded. The optically readable information code is a code that can be detected by using a device such as a charge-coupled device (CCD) sensor, a complementary metal oxide semiconductor (CMOS) sensor, other optical sensor or a laser sensor. For example, each user terminal 2 includes a digital camera. The user terminal 2 reads an information code by photographing the information code with the digital camera. The information code includes, for example, a plurality of geometric figures. Examples of the geometric figures include a rectangle, triangle, circle, and line (thin rectangle). A figure formed by combining a plurality of such basic geometric figures is also recognized as a geometric figure. The information code may be, for example, a two-dimensional code (two-dimensional bar code) or a one-dimensional bar code. Standards on the information code are not particularly limited. Examples of the two-dimensional code include a QR code (registered trademark), data matrix code, and Maxicode. Examples of barcode standards include Japanese article number (JAN), European article number (EAN), and universal product code (UPC).

A user terminal 2 used by a user who is an establisher of a channel may not have any of a function of acquiring positional information and a function of reading the information code. The user terminal 2 used by the establisher may be a stationary terminal device such as a personal computer.

When a channel is created, a center server 1 issues an information code to the establisher. The created channel and the information code to be issued have, for example, a one-to-one correspondence. Reading the information code with the user terminal 2 is one of conditions for the user to join the channel. The establisher displays, provides, or spreads the issued information code by some method. For example, the establisher may distribute a printed matter such as a card or a ticket on which the information code has been printed. The establisher may place the printed matter in a designated region or other place, or may paste the printed matter. The establisher may install a monitor in the designated region or other place and display the information code on the monitor. The establisher may display the information code on the user terminal 2 in response to a request from the user who desires to join the channel. The establisher may send the information code by e-mail such as a mail magazine or instant message. The establisher may post the information code on a website run by the establisher or another website.

Among users who use the channel system S, only users who go into the designated region and cause their user terminals 2 to read the information code can join the channel. The user who has joined the channel acquires a right to post information to the channel. This right is continuously given to the member even after the member leaves the designated region. A user may be able to join the channel only if the user reads the information code while the user is located within the designated region. Alternatively, after entering the designated region, the user may be able to join the channel even if the user reads the information code after leaving the region.

Since the information code is displayed, provided, or spread by the method described above, it is relatively easy for any user to obtain or read the information code. Therefore, if joining the channel is conditional only on reading the information code, a considerable umber of users who are not very interested in a thing about which information should be exchanged in the channel are likely to join the channel. Meanwhile, a user who has even slight interest in the thing within the designated region may or may not go into the region. However, an action of going to a certain place consumes the user's time and labor. Therefore, there is a high probability that the user who has gone into the designated region has no less than a certain degree of interest in a thing within the region. Therefore, by making the join conditional on both reading the information code and going into the designated region, it is possible to form a community with users having no less than a certain degree of interest in a specific thing can form. The use of the information code allows the user to save time to select or search for the channel which the user desires to join and allows the user to join the channel.

From the beginning, the establisher may have the right to post information to the channel created by the establisher regardless of whether the establisher has entered the designated region and whether the establisher has read the information code.

There may be a channel that can be joined without using the information code. For example, by operating the user terminal 2 while the user is located in a designated region, the user may be able to join the channel corresponding to the region. In the present embodiment, a detailed description of a method of joining a channel without using the information code will be omitted.

When creating the channel, the establisher may be able to designate a joinable period in addition to the region. The joinable period may correspond to, for example, time when a thing about which information is exchanged exists in the channel. In this case, only a user who reads the information code within the designated region in the joinable period can join the channel. For example, when designating a region for a place where an event with a fixed period or date and time occurs or for a place with fixed business hours, it is preferable to designate the joinable period according to the period or date and time.

[8-2. Configuration of Center Server]

Figure 25:
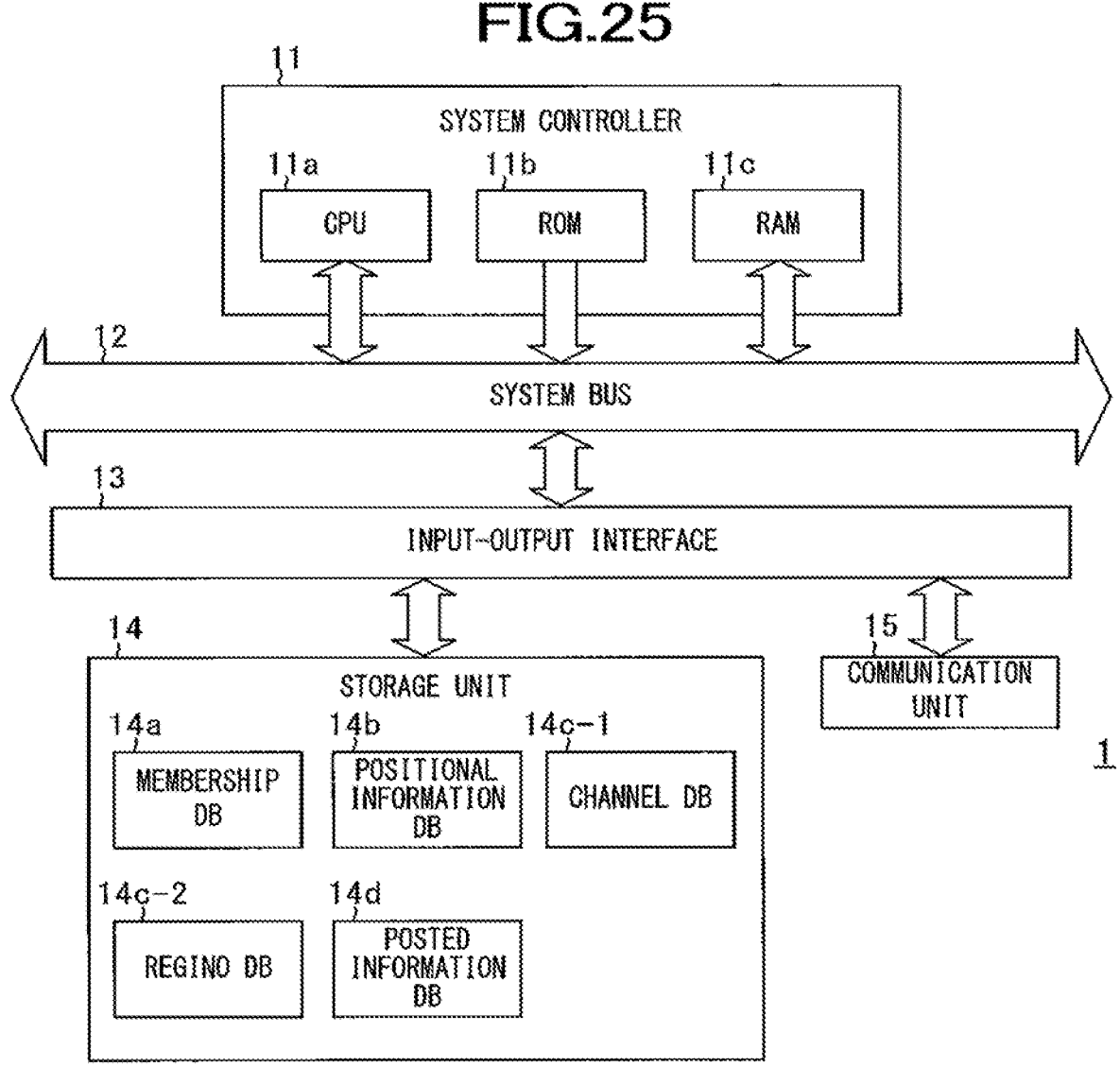
FIG. 25 is a block diagram showing one example of the schematic configuration of the center server according to one embodiment.

Next, the configuration of the center server 1 will be described with reference to FIGS. 25 and 26. FIG. 25 is a block diagram showing one example of the schematic configuration of the center server 1 according the present embodiment.

As shown in FIG. 25, the storage unit 14 stores databases such as the membership DB 14a, the positional information DB 14b, a channel DH 14c-1, a region DB 14c-2, the posted information DB 14d, and other databases.

Figure 26:
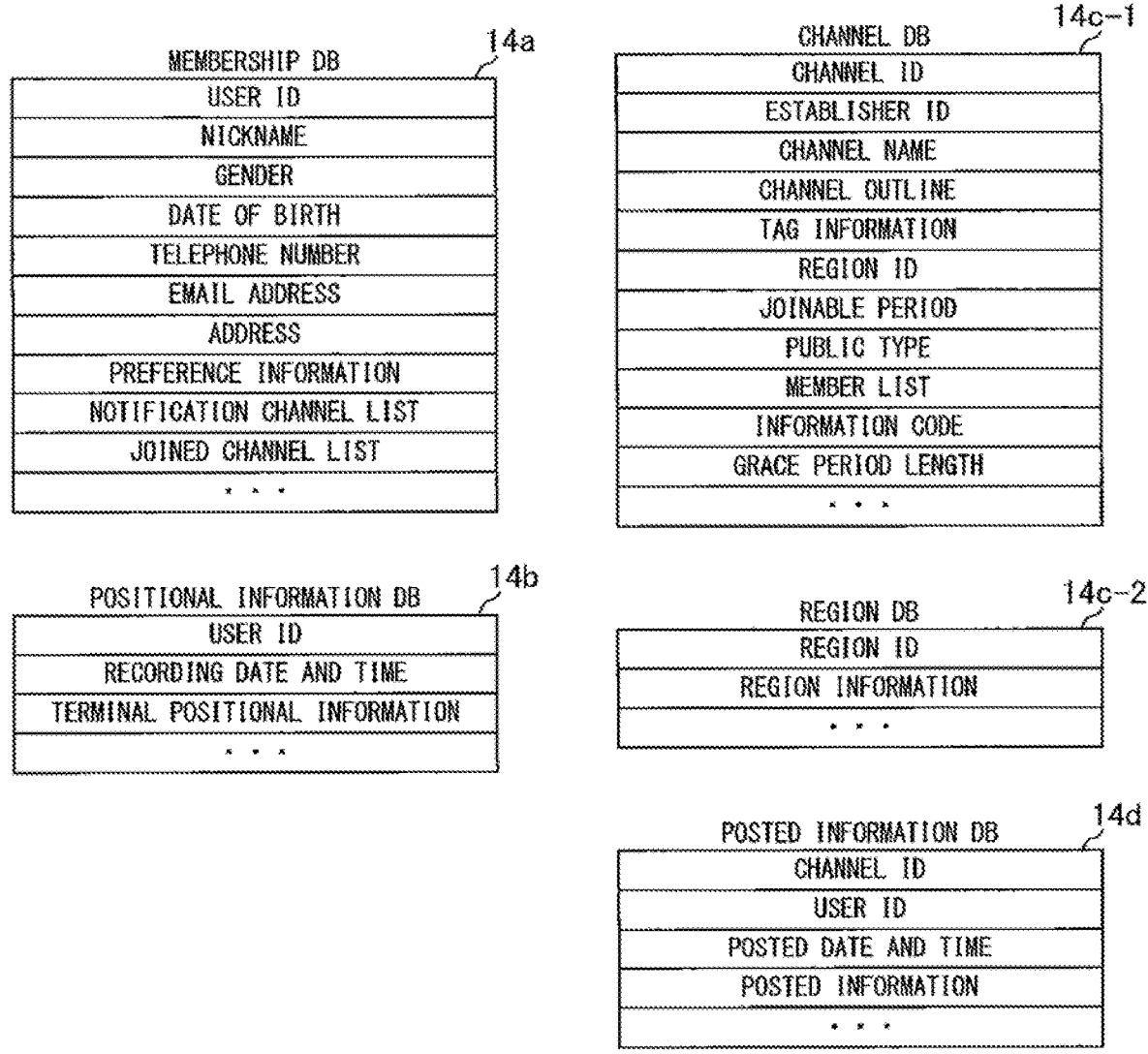
FIG. 26 is a diagram showing one example of details stored in databases.

FIG. 26 is a diagram showing one example of details stored in the databases. Channel information regarding the created channel is stored for each channel in the channel DB 14c-1. As the channel information, specifically, channel ID, establisher ID, channel name, channel outline, tag information, region ID, joinable period, public type, member list, information code, grace period length, and the like are stored in association with each other in the channel DB 14*c*-1. Among these pieces of information, the channel name, channel outline, tag information, joinable period, public type, and grace period length can be set by the establisher of the channel. The establisher 10 is a user ID of the establisher. The region ID is identification information for identifying the region information indicating the region designated by the establisher. In the channel DB 14*c*-1, for example, image data of the information code generated by decoding the channel ID is stored. The grace period length indicates how long the user can join the channel (grace period) since the last time the user is located within the designated region. The grace period length may be, for example, several hours, one day, or several days.

The region information indicating the region designated by the establisher of the channel is stored in the region DB 14*c*-2. Specifically, the region ID, the region information, and the like are stored in association with each other for each designated region in the region DB 14*c*-2. The region corresponding to the channel may include a place of a thing about which information is exchanged in the channel.

[8-3. Functional Outline of System Controller of Center Server]

Figure 27:
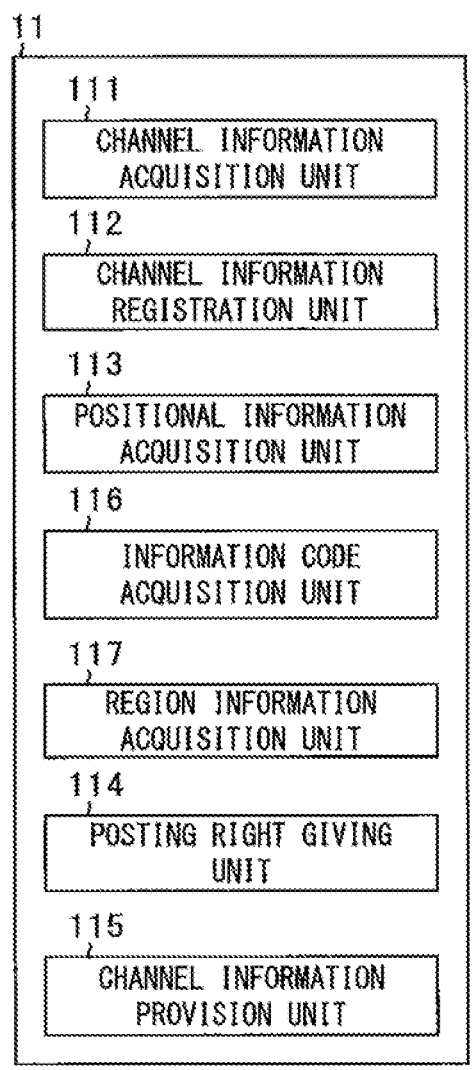
FIG. 27 is a diagram showing one example of functional blocks of the system controller of the center server according to one embodiment.

Next, a functional outline of a system controller 11 of the center server 1 will be described with reference to FIGS. 27 to 35. FIG. 27 is a diagram showing one example of functional blocks of the system controller 11 of the center server 1 according to the present embodiment. By the CPU 11*a* reading and executing various program codes included in the server program, as shown in FIG. 27, the system controller 11 functions as the channel information acquisition unit 111, the channel information registration unit 112, the positional information acquisition unit 113, an information code acquisition unit 116, a region information acquisition unit 117, the posting right giving unit 114, the channel information provision unit 115, and the like.

The channel information registration unit 112 stores the region information acquired by the channel information acquisition unit 111 and the channel ID for identifying the channel of which creation is requested in association with each other in the storage unit 14. For example, the channel information registration unit 112 determines a new channel ID for the channel to be created, and determines a new region ID for the designated region. The channel information registration unit 112 stores the channel information including the determined channel ID and region ID in the channel DB 14*c*-1. When the joinable period designated by the establisher is acquired by the channel information acquisition unit 111, the channel information registration unit 112 stores the joinable period, the channel ID, and the region ID in association with each other in the storage unit 14. Also, the channel information registration unit 112 stores the region ID and the region information in association with each other in the region DB 14*c*-2.

The channel information acquisition unit 111 and the channel information registration unit 112 may be configured to allow creation of a plurality of channels for one region. Also, the channel information acquisition unit 111 and the channel information registration unit 112 may be configured to allow addition or removal of channels for one region. Conversely, the channel information acquisition unit 111 and the channel information registration unit 112 may be configured to allow the establisher to designate a plurality of regions for one channel. Also, the channel information acquisition unit 111 and the channel information registration unit 112 may be configured to allow addition or removal of regions for one channel after the channel is created.

The positional in format ion acquisition unit 113 acquires the positional information indicating the position of the user terminal 2 used by a user different from the establisher of the channel. For example, according to the dedicated application installed in the user terminal 2, each user terminal 2 acquires the positional information of the user terminal. 2 periodically in the background (for example, every 5 minutes, every 10 minutes) using GPS or the like. For example, the user terminal 2 may periodically acquire the terminal positional information only when the notification channel list of the user who uses the user terminal 2 includes one or more channel IDs. Alternatively, the user terminal 2 may periodically acquire the terminal positional information regardless of whether the channel list includes the channel ID. Also, the user terminal 2 may acquire the positional information at the timing when the dedicated application is started. Even if it is not possible to acquire positional information while located within the region at periodical acquisition intervals of positional information, the user can join the channel by starting the dedicated application and reading the information code. Every time the terminal positional information is acquired, the user terminal 2 acquires the current date and time as the recording date and time. The user terminal 2 transmits, to the center server 1, the positional information including the terminal positional information, the recording date and time, and the user ID of the user who uses the user terminal 2. When the user terminal 2 transmits the positional information in real time, the positional information acquisition unit 113 may determine the recording date and time, instead of the user terminal 2 determining the recording date and time. For example, the positional information acquisition unit 113 may determine reception date and time of the positional information as the recording date and time. The positional information acquisition unit 113 may store the positional information transmitted from the user terminal 2 in the positional information DB 14*b*. The positional information is required at least to include the terminal positional information. The positional information acquisition unit 113 may store only latest positional information in the positional information DB 14*b* for each user terminal 2, or may store a history of positional information. For example, every time the positional information acquisition unit 113 acquires the positional information from the user terminal 2, the positional information acquisition unit 113 may add this positional information to a positional information DB 14*b*. Then, the positional information acquisition unit 113 may acquire the history of the positional information from the positional information DB 14*b* as necessary. Alternatively, the user terminal 2 may store the history of the positional information. Then, the positional information acquisition unit 113 may acquire the history of the positional information from the user terminal 2.

When information code corresponding to a channel is read by the user terminal 2 used by a user different from the establisher of the channel, the information code acquisition unit 116 acquires, from the user terminal 2, the read information code or the channel. ID obtained by decoding the information code. For example, by the user's selection from a menu of the dedicated application, the user terminal 2 displays a screen tor photographing the information code. Then, by the user's operation, the user terminal 2 photographs an image of the information code and generates image data of the information code. The user terminal 2 may transmit the image data of the information code to the center server 1. Alternatively, the user terminal 2 may decode the information code to generate the channel ID and transmit this channel ID to the center server 1. Also, the user terminal 2 may record date and time when the information code is read, and transmit the read date and time together with the image data of the information code or the channel ID to the center server 1.

In response to the information code corresponding to the channel being read by the user terminal 2, the region information acquisition unit 117 acquires region information indicating the region corresponding to the channel from the storage unit 14. The region information acquisition unit 117 identifies the channel corresponding to the information code based on the information code or the channel ID acquired by the information code acquisition unit 116. For example, the region information acquisition unit 117 acquires the region ID associated with the information code acquired by the information code acquisition unit 116 from the channel DD 14*c*-1. Alternatively, the region information acquisition unit 117 may decode the information code to generate the channel ID. Then, the region information acquisition unit 117 may acquire the region ID associated with the generated channel. ID from the channel DB 14*c*-1. In a case where the channel ID is acquired by the information code acquisition unit 116, the region information acquisition unit 117 acquires the region ID associated with the acquired channel ID from the channel DB 14*c*-1. When the region ID is acquired, the region information acquisition unit 117 acquires the region information associated with the region ID from the region DB 14*c*-2.

When the position of the user terminal 2 indicated by the positional information acquired by the positional information acquisition unit 113 is included in the region indicated by the region information acquired by the region information acquisition unit 117, the posting right giving unit 114 performs processing for giving a right to post information to the channel identified with the channel ID associated with the region information to the user who uses the user terminal 2. This right allows the user to post information regardless of whether the user terminal 2 is located within the region.

The posting right giving unit 114 may give a posting right only when the position of the user terminal 2 indicated by the latest positional information is included in the region indicated by the region information. That is, the posting right giving unit 114 may give the posting right only when the user causes the user terminal 2 to read the information code while the user is within the designated region. Alternatively, the posting right giving unit 114 may give the posting right, when the position of the user terminal 2 indicated by at least one piece of positional information, in the history of the positional information acquired by the positional information acquisition unit 113, is included in the region indicated by the region information. That is, the posting right giving unit 114 may give the posting right even if the user leaves the designated region and thereafter the user causes the user terminal 2 to read the information code.

Figure 28:
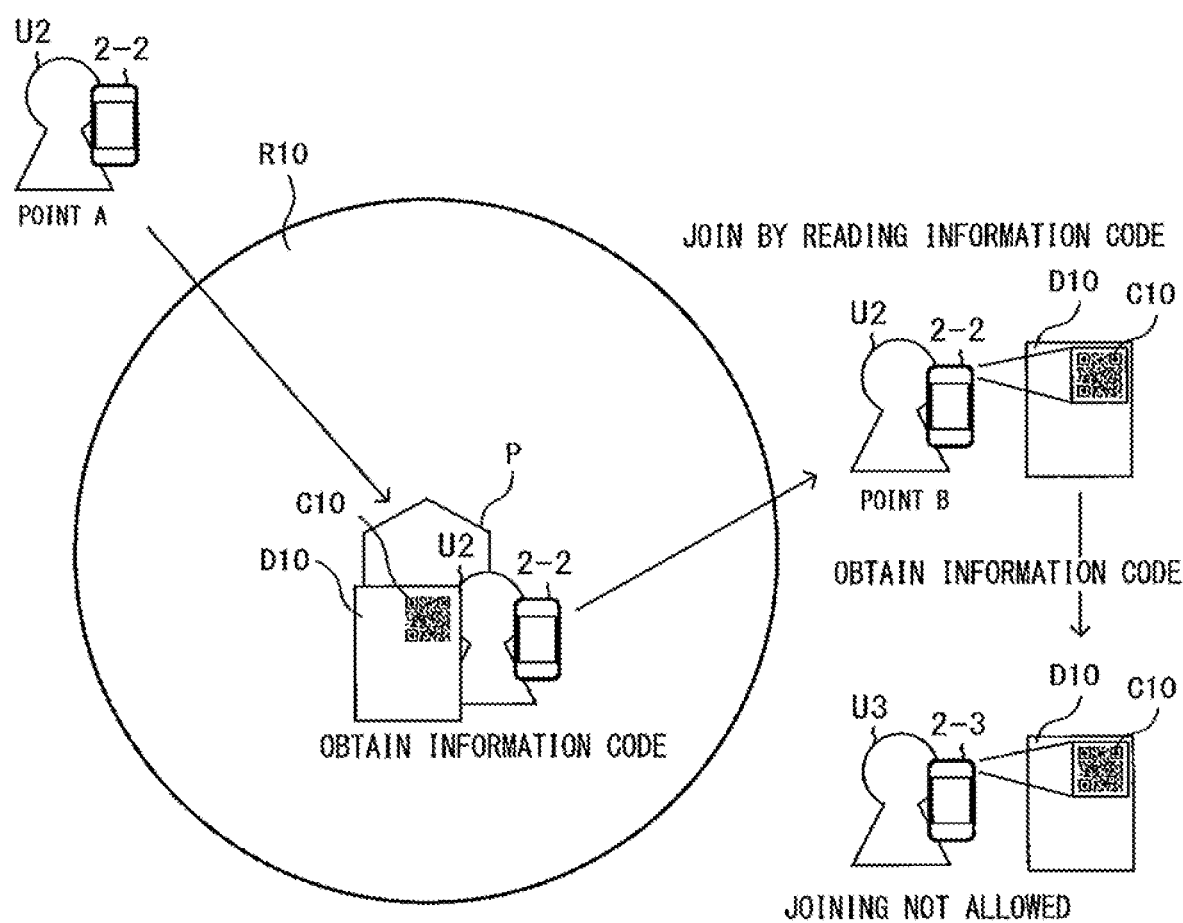
FIG. 28 is a diagram showing one example of how the user joins a channel.

FIG. 28 is a diagram showing one example of how a user joins a channel. For example, by operating a user terminal 2-1, as shown in WIG. 28, an establisher U1 designates a region R1 having a certain ramen restaurant P as the center point and creates a channel C1 regarding the ramen restaurant. The establisher U1 places, in the ramen restaurant P, a card D10 on which an information code C10 corresponding to the channel C1 has been printed. A user 72 who likes the ramen restaurant P carries a user terminal 2-2 and is located at a point A. Since the point A is outside the region R10, the user U2 cannot join the channel C1. Thereafter, the user U2 visits the ramen restaurant P and obtains the card D10. At this time, the user U2 can join the channel C1 by reading the information code C10 with the user terminal 2-2. However, the user U2 does not cause the user terminal 2-2 to read the information code C10. Thereafter, the user U2 moves to a point R. The point B is outside the region R1. Here, the user U2 joins the channel C1 by causing the user terminal 2-2 to read the information code C10 printed on the card D10. Although the point B is outside the region R10, the user U2 can post information to the channel C1. As described above, a user who has no less than a certain degree of interest in a place or an object within a designated region, an event held in the region, or the like goes into the region. Therefore, the user who has no less than a certain degree of interest in a specific thing about which information is exchanged in the channel can join the channel if it becomes clear that a member has no less than a certain degree of interest in the thing, there is no need to limit the place in which the user can post information.

Thereafter, the user U2 hands the card D10 to a user U3. Here, the user U3 causes a user terminal 2-3 to read the information code C10 printed on the card D10. However, the point B where the user U3 is in is outside the region R10. The user U3 has not entered the region R10. Therefore, the user U3 cannot join the channel C1.

The posting right giving unit 14 may give a posting right when the position of the user terminal 2 indicated by the terminal positional information is included in the region indicated by the region information, and when as elapsed time from the recording date and time indicating a time when the user terminal 2 is located at the position indicated by the terminal positional information until a time corresponding to reading of the information code by the user terminal 2 is within the predetermined grace period length. That is, the posting right giving unit 114 may give the posting right from the date and time when it can be confirmed that the user has been lastly located within the designated region until the grace period length elapses. The time corresponding to the reading of the information code may be, for example, a time when the user terminal 2 reads the information code, or a time when the center server 1 receives the read information code or the channel ID obtained by decoding the information code from the user terminal 2.

As described above, a user who has shown a high probability of having no less than a certain degree of interest in the thing about which information is exchanged in the channel by the user's going to the designated region may be given the right to post information to the channel even if the user causes the user terminal 2 to read the information code after leaving the region. However, as time elapses after the user leaves the region, the user's interest in the thing within the region nay decline. By providing the grace period, it is possible to allow a user who has maintained no less than a certain degree of interest in the object about which information is exchanged to join the channel. For example, depending on a reception status of radio waves from satellites, the user terminal 2 cannot acquire positional information in some cases even though the user is within the designated region. If the user terminal 2 has been able to receive radio waves from satellites in the past, the user can join the channel by causing the user terminal. 2 to read the information code within the grace period from that time.

Figure 29A:
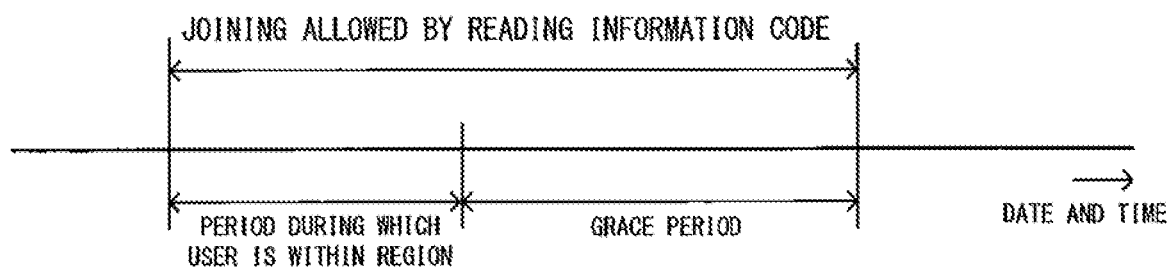
FIG. 29A is a diagram showing one example of a period in which the user can join the channel.

FIG. 29A is a diagram showing one example of a period in which a user can join a channel. As shown in FIG. 29A, while the user is in the designated region, the user can join the channel by causing the user terminal 2 to read the information code. The grace period begins immediately after the user is lastly located within the region. Even during this grace period, the user can join the channel by causing the user terminal 2 to read the information code.

Figure 29B:
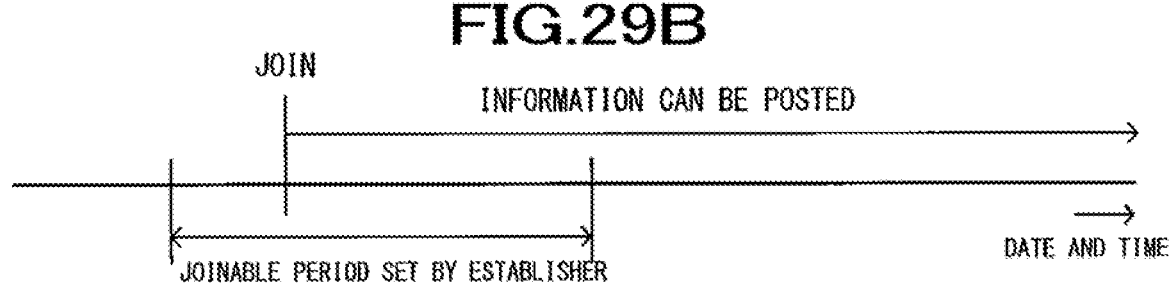
FIG. 29B is a diagram showing one example of a relationship between the joinable period and the posting period set by an establisher.

When the grace period is set, the posting right: giving unit 114 uses not only the latest positional information but also the history of the positional information. The grace period length may be set, for example, by a respective establisher for each channel. Alternatively, the grace period length common to all channels may be set in advance, FIG. 29B is a diagram showing one example of a relationship between the joinable period and a posting period set by the establisher. For example, the establisher designates a region to include a place where an anime event is held and creates an anime channel. Also, the establisher designates the start time and end time of the event as the start time and end time of the joinable period. A user who is interested in anime goes into the designated region during the time when the event is held in order to participate in the event. Since this time is within the joinable period, the user joins the channel by causing the user terminal 2 to read the information code of the channel as shown in FIG. 29B. In a case where the grace period is set, if within the joinable period and the user is located within the designated region, or within the grace period, the user can join the channel. From the time when the user joins the channel, the user can post information to the channel. The user can post information even after the joinable period elapses.

By causing the user terminal 2 to read the information code, the user can join the channel corresponding to the information code. Therefore, the user does not need to perform an operation for selecting or finding the channel in which the user desires to join. Regions may overlap each other between channels. For example, it is assumed that a plurality of booths are set up in an anime event venue. It is assumed that separate anime channels are created for at least two respective booths among these booths. In each channel, a region is designated for the booth. If the distance between the booths is short, the regions overlap each other. For example, it is assumed that stores are operating on different floors in the same building. For each store, a channel is created and a region is designated at the plate of the store. If the latitudes and longitudes of the stores approximately the same as each other, the regions overlap each other even if their altitudes are different. It can be considered to avoid overlapping of regions by expressing the regions in three dimensions such as including information about the altitude in the region information. However, at present, it, is difficult to accurately detect the altitude with a positioning system such as GPS. In a case where the regions overlap each other between channels, even if it is found from the positional information of the user terminal 2 that the user has gone to the place where the regions overlap each other, it is difficult to determine which channel the user desires to join from only the information. Therefore, the user needs to perform an operation for selecting which channel to join. However, in the present embodiment, if the information code is determined, the channel which the user desires to join can be identified. Therefore, even if the regions overlap each other between channels, the user's operation of channel selection is unnecessary.

As described above, each user terminal 2 periodically acquires the positional information of the user terminal 2. Therefore, when the user causes the user terminal 2 to read the information code immediately after the user goes into the set region, a situation may occur in which positional information indicating that the user terminal 2 is located within the region has not been acquired. In this case, the use: cannot join the channel associated with the region. Therefore, although the user terminal 2 is not within the set region, after positional information indicating that the user terminal 2 is located near the region (within a predetermined distance from the region) is acquired, if the user terminal 2 reads the information code of the channel associated with the region within a preset time, the posting right giving unit 114 may give the user the posting right for the channel. The preset time may be, for example, the same as the time interval in which the user terminal 2 acquires the positional information, or may be shorter than the time interval. The user who causes the user terminal 2 to read the information code in a relatively short time after coming near the region has a high probability of having entered the region. Therefore, such a user can be relieved.

Figure 30:
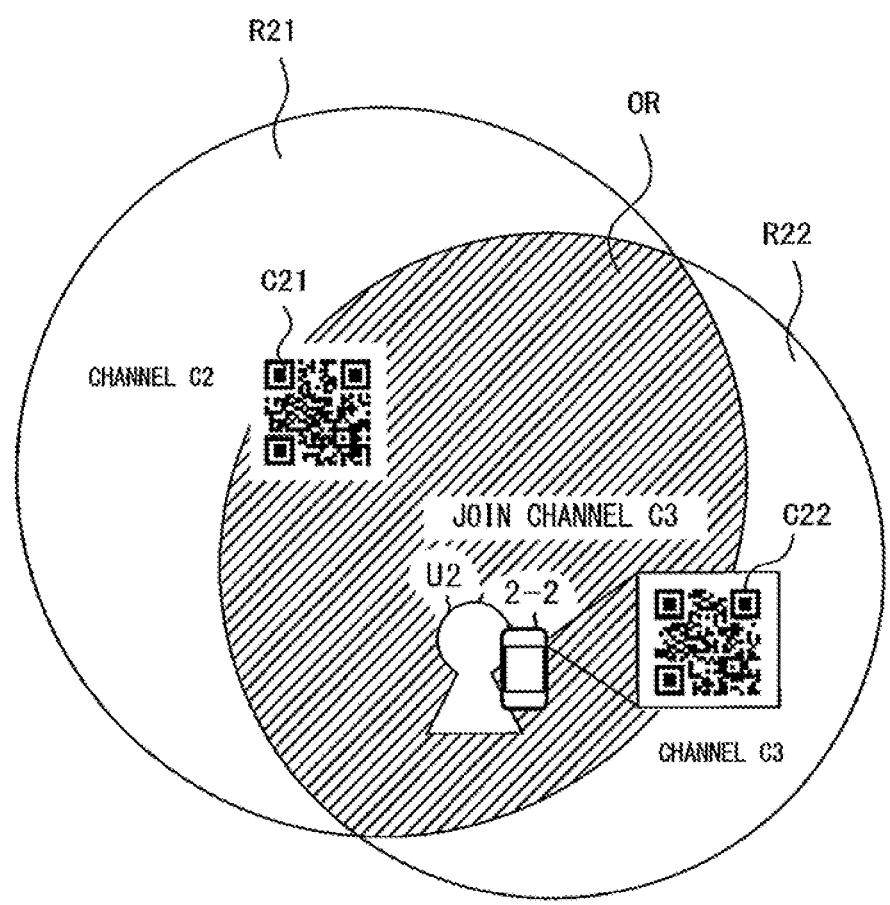
FIG. 30 is a diagram showing one example of how the user joins either of channels whose regions overlap each other.

FIG. 30 is a diagram showing one example of how a user joins one of channels whose regions overlap each other. For example, in the event venue described above, a region R21 is designated for an anime channel C2, and a region R22 is designated for another an imp channel C3. The region R21 and the region R22 overlap each other in a region OR. An information code C21 of the channel is pasted on a booth of the channel C2. Also, an information code C22 of the channel is pasted on a booth of the channel C3. The user U2 carrying the user terminal 2-2 enters the region OR. Here, the user U2 causes the user terminal. 2-2 to read the information code C22. This allows the user U2 to join the channel C3 instead of the channel C2.

Figure 31:
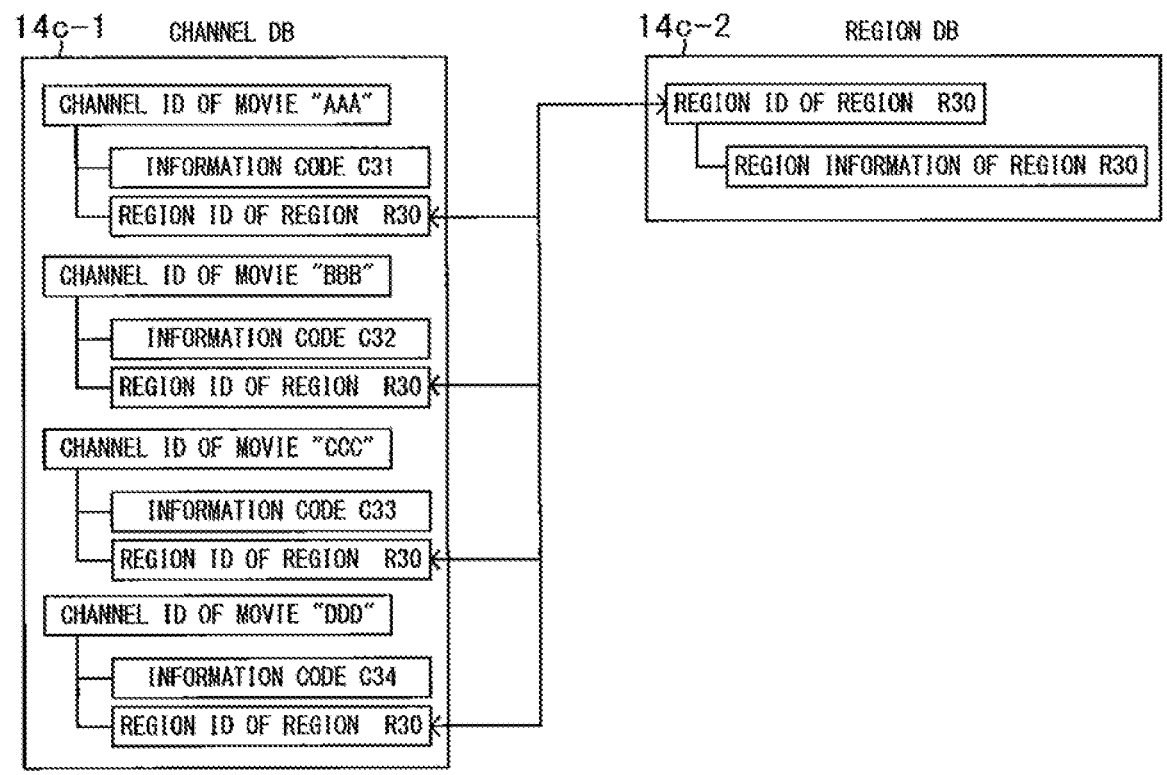
FIG. 31 is a diagram showing one example of information stored in the channel DB and a region DB.

A method for join using the information code is effective not only when regions overlap each other between channels but also when one region is shared between channels. As described above, a plurality of channels may be created for one region. For example, the region may include a place where there is a thing about which information is exchanged in each of the plurality of channels. In this case, for example, one piece of region information may be stored in association with a plurality of channel IDs in the storage unit 14. FIG. 31 is a diagram showing one example of information stored in the channel DH 14c-1 and the region DB14c-2. For example, in a movie theater 1300 having a plurality of screens, it is assumed that channels related to movies shown on respective screens are created. For example, channels of movies "AAA", "BBB", "CCC", and "DDD" are created. The establisher designates, for example, a region R30 for the place where the movie theater 1300 is located, and associates the four channels with the region R30. In this case, as shown in 1G. 31, for example, different channel IDs are stored in the channel DB 14c-1 for the movies "AAA", "BBB", "CCC", and "DDD". In addition, information codes C31, C32, C33, and C34 are stored in association with the channel IDs of the movies "AAA", "BBB", "CCC", and "DDD", respectively, in the channel DB 14c-1. These information codes are different from each other. Furthermore, the region ID of the movie theater 1300 may be stored in association with these channel IDs in the channel DB 14c-1. The region information of the region R30 is stored in association with the region ID of the region R30 in the region DB 14c-2.

Figure 32:
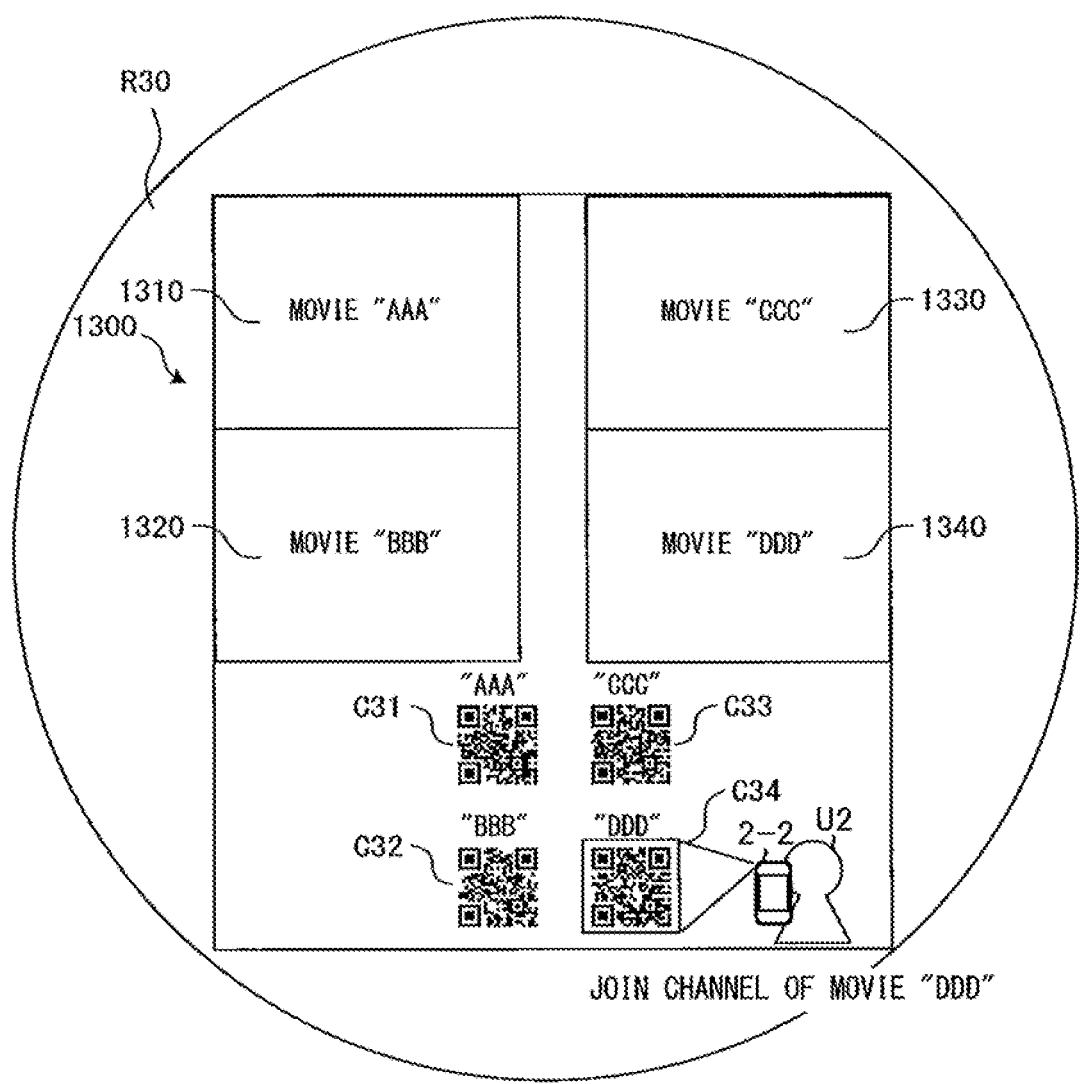
FIG. 32 is a diagram showing one example of how the user joins either of a plurality of channels associated with one region.

When a plurality of channels is associated with one region, based on the information code or the channel. ID acquired by the information code acquisition unit 116, the region information acquisition unit 117 identifies the channel corresponding to the information code from among the plurality of channels. Then, the posting right giving unit 114 gives a right to post information to the identified channel among the plurality of channels. FIG. 32 is a diagram showing one example of how a user joins either of a plurality of channels associated with one region. As shown in FIG. 32, the movie theater 1300 includes screens 1310, 1320, 1330, and 1340. On the screens 1310, 1320, 1330, and 1340, the movies "AAA", "BBB", "CCC", and "DDI." are shown, respectively. For example, the region R30 is designated to include the movie theater 1300. Each movie ticket issued at the movie theater 1300 has, for example, an information code corresponding to the channel of the movie printed thereon. The user U2 carrying the user terminal U2-2 goes to the movie theater 1300 to watch the movie "DDD", and obtains a ticket for the movie "DDD" there. An information code C34 has been printed on this ticket. The user U2 causes the user terminal 2-2 to read the information code C34. This allows the user U2 to join the channel of the movie "DDD".

Figure 33:
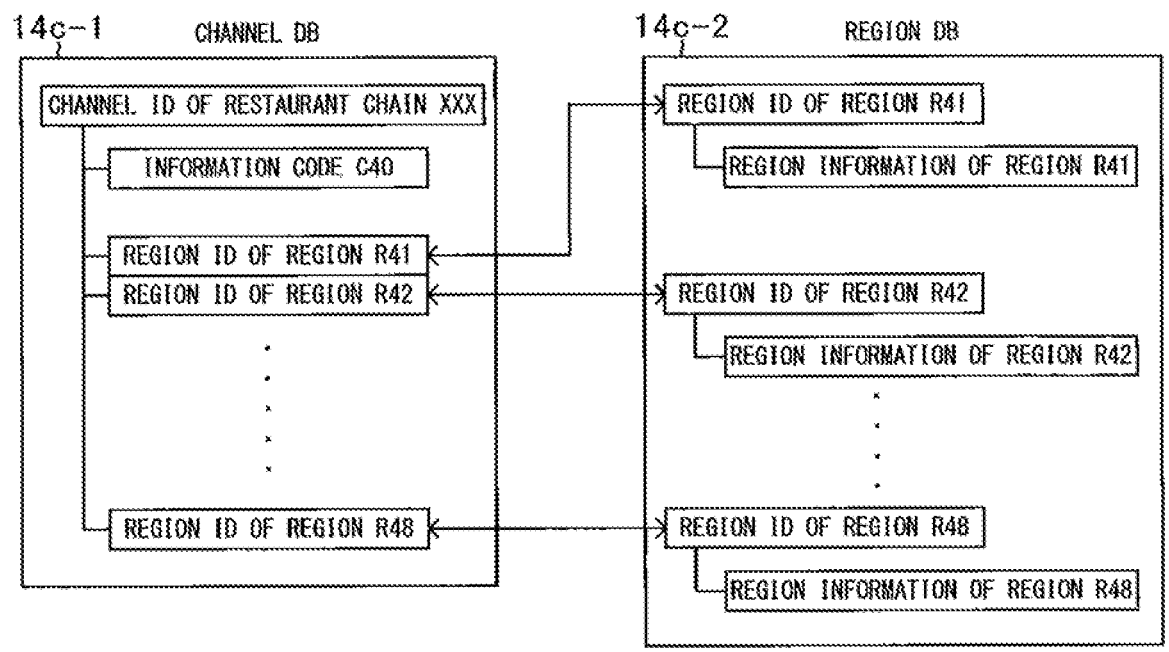
FIG. 33 is a diagram showing one example of information stored in the channel DB and the region DB.

As described above, it may be possible to designate a plurality of regions for one channel. For example, each of the plurality of regions may include a place where there is a thing about which information is exchanged in the channel. In this case, a plurality of pieces of region information is stored in association with the channel ID in the storage unit 14. FIG. 33 is a diagram showing one example of information stored in the channel. DB 14c-1 and the region DB 14c-2. For example, it is assumed that a channel for a restaurant chain XXX will be created. The restaurant chain XXX has stores 1410, 1420, 1430, 1440, 1450, 1460, 1470, and 1480. For example, the establisher designates regions R41, R42, R43, R44, R45, R46, R47, and R48 for places where the stores 1410, 1420, 1430, 1440, 1450, 1460, 1470, and 1430 are located, respectively. The establisher associates one channel with those regions. In this case, for example, an information code C40 and region IDs of the regions R41 to R48 are stored in association with the channel ID of the restaurant chain XXX in the channel DR 14c-1. The region information of the regions R41 to R48 has been stored in association with the region IDs of the regions R41 to R48 in the region DB 14c-2.

Figure 34:
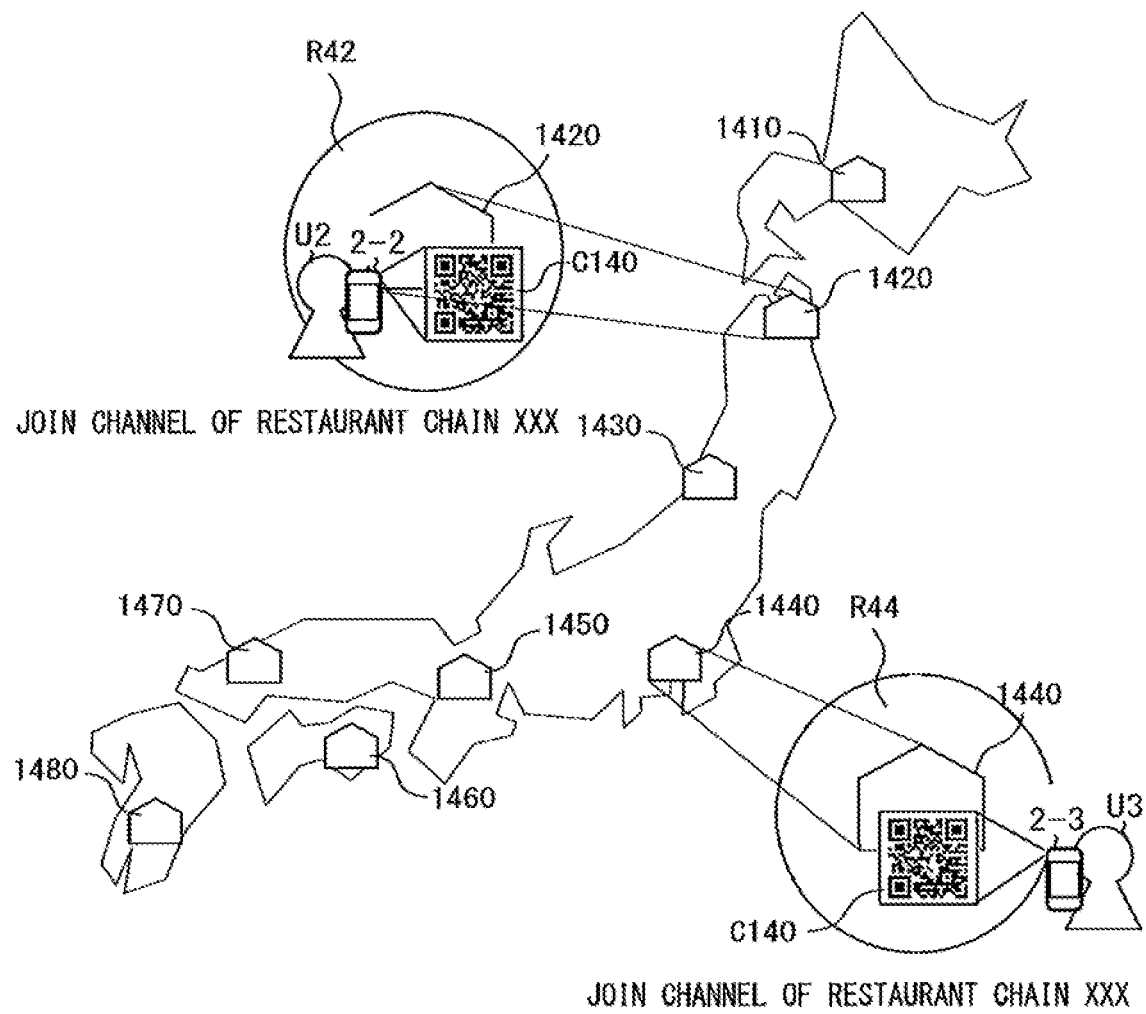
FIG. 34 is a diagram showing one example of how the user joins a channel associated with a plurality of regions.

When a plurality of regions is associated with one channel, the region information acquisition unit 117 acquires the plurality of pieces of region information based on the information code or the channel ID acquired by the information code acquisition unit 116. Then, the posting right giving unit 114 gives a posting right when the posit ion of the user terminal 2 indicated by the positional information is included in the region indicated by any of the plurality of pieces of region information. FIG. 34 is a diagram showing one example of how a user joins a channel associated with a plurality of regions. As shown in FIG. 34, for example, the stores 1410 to 1480 is dispersed in various places. A user U2 carrying a user terminal 2-2 goes to the store 1420. For example, the region 42 is designated to include the store 1420. In each store, for example, a card on which an information code C40 has been printed is placed. The user U2 obtains this card in the store 1420 and causes the user terminal 2-2 to road the information code C40. This allows the user U2 to join the channel of the restaurant chain XXX. Meanwhile, a user U3 carrying a user terminal 2-3 goes to the store 1440. For example, the region R44 is designated to include the store 1440. The user U3 causes the user terminal 2-3 to read the information code C40 printed on the card obtained in the store 1440. This also allows the user U3 to join the channel of the restaurant chain XXX A plurality of channels ay be associated with one region, and at least one of the plurality of channels may be associated with a plurality of regions. For example, for a predetermined group of movie theaters, it is assumed to create channels on moves to be shown in those movie theaters. The number of screens varies from movie theater to movie theater. The movies shown on those screens vary from movie theater to movie theater. In this case, the establisher designates a region for each movie theater and also creates a channel for each movie. The establisher associates each movie's channel with (the region of) the movie theater in which the movie is shown.

The channel information provision unit 115 causes the user terminal 2 to display information about the channel. Examples of information to be displayed include a channel search result, channel information stored in the channel DB 14c-1, and information posted to the channel. FIG. 35 is a view showing screen examples in the dedicated application. For example, it may be possible to search for a channel by using the dedicated application. For example, it may be possible to input a genre, tag, keyword, address, district, and the like as a search condition. The channel information provision unit 115 searches for a channel that matches the search condition and transmits the search results to the user terminal 2. The user terminal. 2 displays a list of found channels or displays an icon or the like indicating the fund channel in superimposition on a map. The user terminal 2 displays an in-channel screen 1500-1 based on the user selecting either channel from the found channels. The in-channel screen 1500-1 includes a channel information region 1510. The channel information region 1510 originally displays various kinds of information regarding the channel. For example, in response to the user scrolling the screen, the information posted to the channel is displayed. However, when the user has not joined the channel, in order to prevent the user from recognizing such information, the channel information region 1510 may be subjected to blurring processing. The user cannot read the posted information or post information.

Here, the user terminal 2 may display a channel registration screen 1600 by a user operation. Also when the user causes the user terminal. 2 to read the information code of the channel of which the user has not entered the designated region, the user terminal 2 may display the channel registration screen 1600. The channel registration screen 1600 displays a message that in order to join the channel, it is necessary to read the information code after entering the designated region. Also, the channel registration screen 1600 may display the distance from the current position of the user terminal 2 to the designated region. In addition, the channel registration screen 1600 displays a notification registration button 1610. The notification registration button 1610 is a button for performing registration such that the channel system S makes notification when the user terminal 2 enters the designated region. When the user presses the notification registration button 1610, the center server 1 adds the channel ID of the channel for which information is displayed to the notification channel list of the user.

When the user causes the user terminal 2 to read the information code after entering the designated region, the user terminal 2 may display a join confirmation screen 1700. A join button 1710 is displayed on the join confirmation screen 1700. When the user presses the join button 1710, the posting right giving unit 114 registers the user as the member of the channel and gives the user the right to post information to the channel.

Then, the user terminal 2 displays an in-channel screen 1500-2. The in-channel screen 1500-2 includes the channel information region 1510. The channel information region 1510 in this case clearly displays various pieces of information about the channel. In addition, the channel information region 1510 includes a posting area 1520. The posting area 1520 is a region for inputting text as information to post and selecting a still image or image to post. The user can post information by operating the posting area 1520.

The in-channel screen 1500-1 shown in FIG. 35 is a screen example when the public type of the channel is "closed". For a user who has not joined the channel whose public type is "open", the user terminal 2 may clearly display the information about the channel in the channel information region 1510 while not displaying the posting area 1520.

[8-4. Operation of Channel System]

Figure 36:
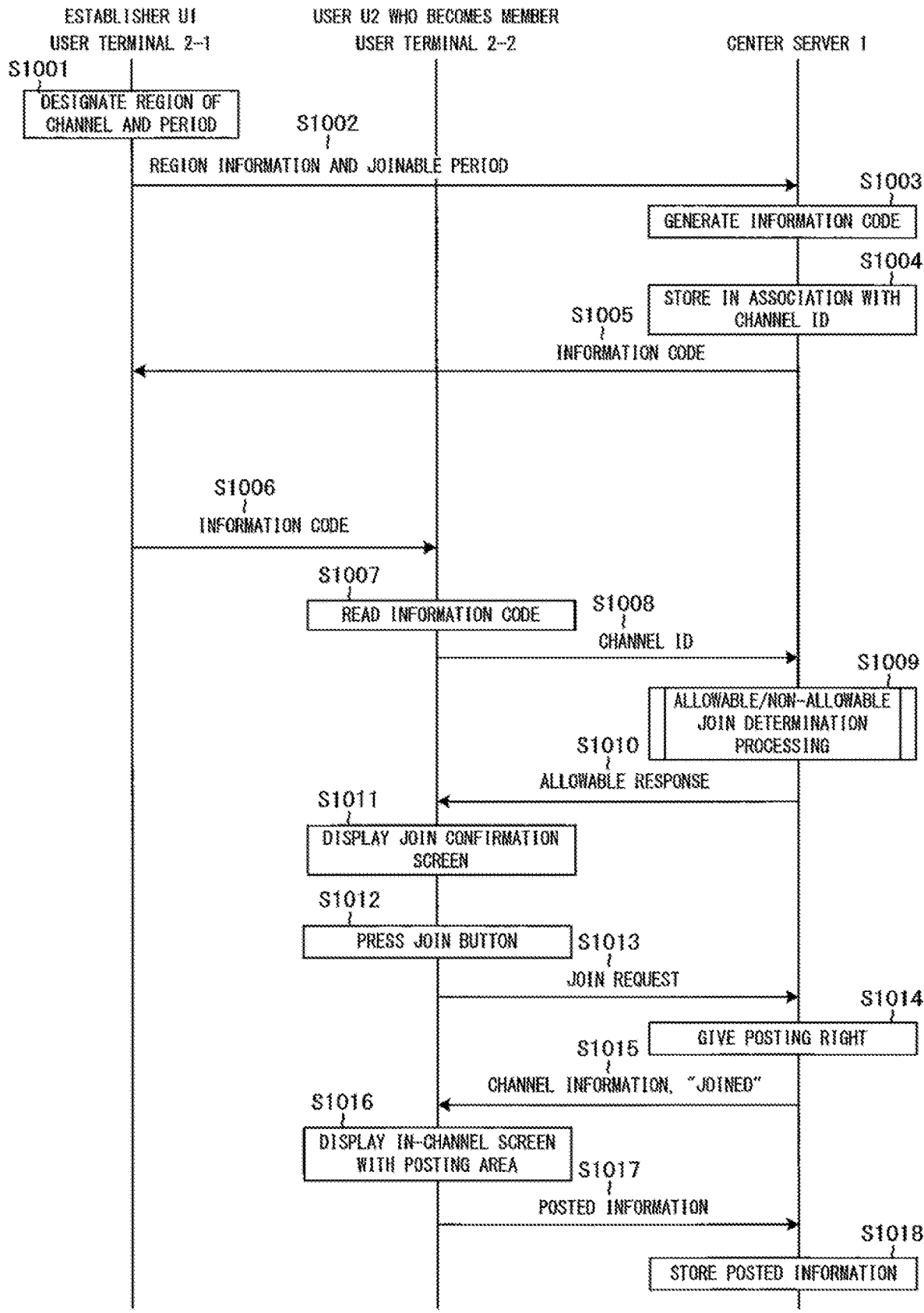
FIG. 36 is a sequence diagram showing one example of the operation of the channel system according to one embodiment.

Next, the operation of the channel system S will be described with reference to FIGS. 36 and 37. The system controller 11 executes the processing of the center server 1 shown in FIG. 36 and the processing shown in FIG. 37 according to the program code included in the server program. FIG. 36 is a sequence diagram showing one example of the operation of the channel system S according to the present embodiment.

As shown in FIG. 36, the establisher U1 selects creation of the channel C1, whereby the user terminal 2-1 displays the region designation screen 100. Here, the establisher U1 designates the region. The establisher U1 also inputs the joinable period and other information regarding the channel C1 (step S1001). The user terminal 2-1 transmits the input region information, the joinable period, and other information to the center server 1 (step S1002). The center server 1 that has received information such as the region information and the joinable period generates the channel ID of the channel C1. Also, the center server 1 generates the information code of the channel C1 (step S1003). The center server 1 stores the information received from the user terminal. 2-1 and an image of the information code in association with the channel ID in the channel DB 14c-1 (step S1004).

In response to the creation of the channel C1 or a request from the user terminal 2-1, the center server 1 transmits the image data of the information code C10 to the user terminal 2-1 (step S1005). The establisher U1 makes the information code C10 available to other users by some method (step S1006).

Thereafter, the user U2 causes the user terminal 2-2 to read the available information code (10 (step S1007). The user terminal 2 photographs an image of the information code with its digital camera. The user terminal 2 generates the channel ID of the channel C1 by decoding the information code based on the image of the information code. The user terminal 2 acquires the date and time when the information code is read. The user terminal 2 transmits a join inquiry including the generated channel ID, a reading date and time, and the user ID of the user U2 to the center server 1 (step S1008). The center server 1 that has received the join inquiry executes allowable/non-allowable join determination processing (step S1009).

Figure 37:
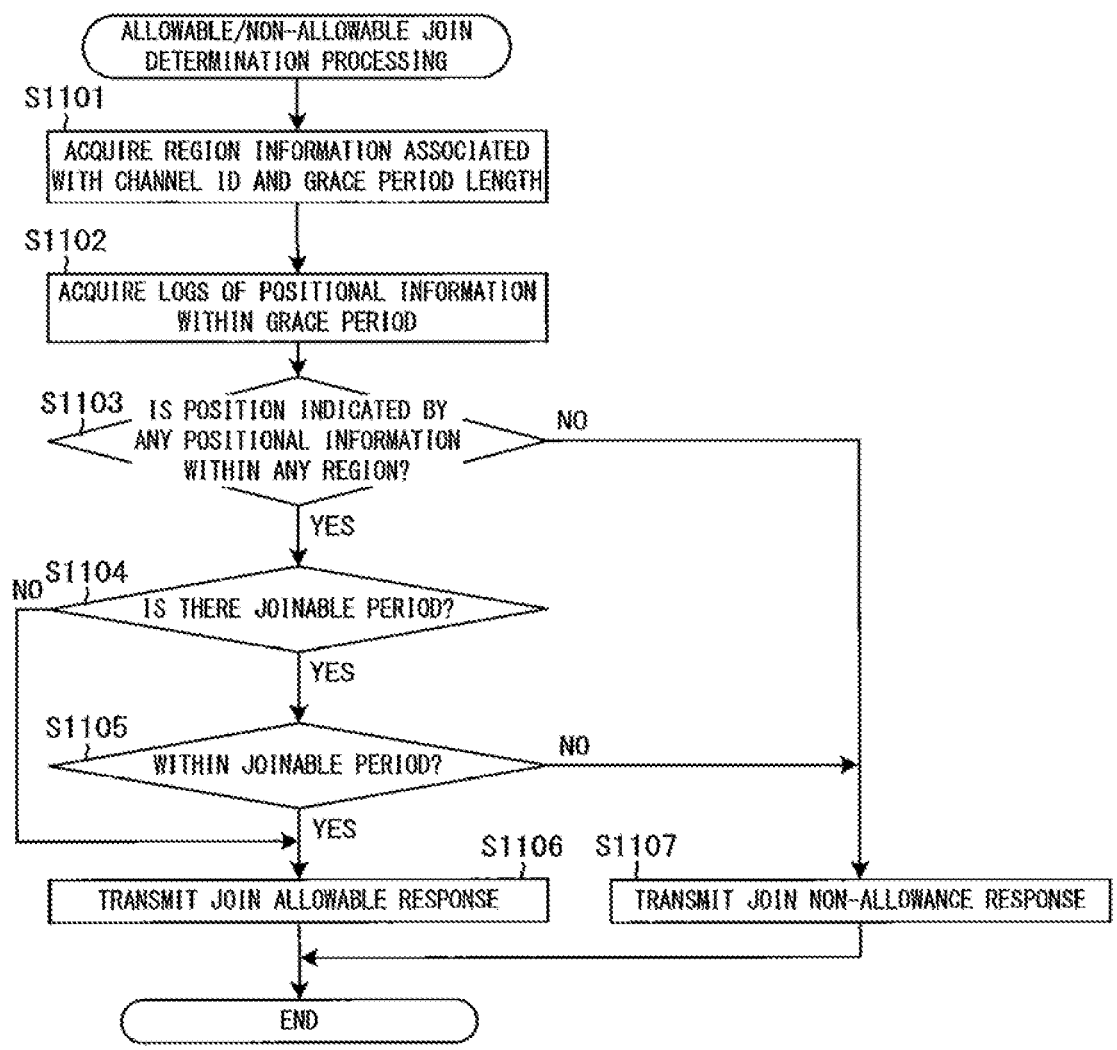
FIG. 37 is a flowchart showing one example of the allowable/non-allowable join determination processing by the system controller of the center server according to one embodiment.

FIG. 37 is a flowchart showing one example of an allowable/non-allowable join determination processing by the system controller 11 of the center server 1 according to the present embodiment. As shown in FIG. 37, the posting right giving unit 114 acquires, from the channel DB 14c-1, one or more region IDs associated with the channel ID included in the join inquiry and the grace period length. For each acquired region 10, the posting right giving unit 114 acquires the region information associated with the region ID from the region DB 14c-2 (step S1101).

Then, the positional information acquisition unit 113 sets the grace period by setting the start date and time of the period to the date and time obtained by subtracting the grace period length from the reading date and time of the information code as, and setting the end date and time of the period to the reading date and time. Then, the positional information acquisition unit 113 acquires logs of the positional information, in the history of the positional information stored in the positional information DB 14b in association with the user ID included in the join inquiry, whose recording date and time is within the grace period (step S1102).

Then, the posting right giving unit 114 determines whether the position of the user terminal 2 indicated by at least one piece of positional information included in the logs of the positional information acquired in step S1102 is within the region indicated by at least one piece of region information acquired in step S1101 (step S1103). For example, the posting right giving unit 114 calculates a distance from the center point included in the region information to the position of the user terminal 2 indicated by the terminal positional information included in the positional information. When the calculated distance exceeds the radius included in the region information, the posting right giving unit. 114 determines that the position of the user terminal 2-2 is not within the region for a combination of the region information and the positional information. When the calculated distance is equal to or less than the radius included in the region information, the posting right giving unit 114 determines that the position of the user terminal 2-2 is within the region for a combination of the region information and the positional information. When it is determined that the position of the user terminal 2-2 is outside the region for all combinations of region information and positional information (step S1103: NO), the posting right giving unit 114 transmits the join non-allowance response to the user terminal 2-2 (step S1107), and the allowable/non-allowable join determination processing ends.

On the other hand, when it is determined that the position of the user terminal 2-2 is within the region for at least one of all combinations of the region information and the positional information (step S1103: YES), the posting right giving unit 114 determines whether the joinable period is stored in the channel DB 14c-1 in association with the channel ID included in the join inquiry (step S1104). When the joinable period is stored (step S1104: YES), the posting right giving unit 114 determines whether the reading date and time included in the join inquiry is within the joinable period (step S1.105). When the reading date and time is not within the joinable period (step S1105: NO), the process proceeds to step S1107.

On the other hand, when the reading date and time is within the joinable period (step S1105: YES), or, when the joinable period is not stored (step S1104: NO), the posting right giving unit 114 transmits the join allowance response including the channel ID and the channel name to the user terminal 2-2 (step S1106), and the allowable/non-allowable join determination processing ends.

In FIG. 36, it is assumed that the join allowance response for the channel C1 is transmitted from the center server 1 to the user terminal 2-2 by the allowable/non-allowable join determination processing in step S1009 (step S1010). In response to this, the user terminal 2-2 displays the join confirmation screen 1700 (step S1011). Here, when the user U2 presses the join button 1710 (step S1012), the user terminal 2-2 transmits a join request in which the channel ID included in the join allowance response is set to the center server 3 (step S1013). In response to this, the center server 1 executes processing for giving the posting right to the user U2 (step S1014). For example, the center server 1 adds the user ID of the user U2 to the member list stored in the channel DB 14*c*-1 in association with the channel ID included in the join request. Also, the center server 1 may add the channel ID to the joined channel list stored in the membership DB 14*a* in association with the user ID of the use U2.

Thereafter, in response to the request from the user terminal 2-2, the center server 1 acquires information associated with the channel ID of the channel C1 which the user U2 has joined from the channel DB 14*c*-1 or the posted information DB 14*d*. Also, the center server 1 determines whether the member list associated with the channel ID of the selected channel C1 includes the user ID of the user U2. Since the member list associated with the channel ID of the channel C1 includes the user ID of the user U2, the center server 1 transmits the acquired information about the channel C1 and the join status indicating "joined" to the user terminal 2-2 (step S1015). The user terminal 2-2 displays the in-channel screen 1500-2 based on the information received from the center server 1 (step S1016). Here, since the join status is "joined", the user terminal 2-2 displays the posting area 1520. Thereafter, the user 2 inputs information to post by operating the posting area 1520. The user terminal. 2-2 transmits the input information to the center server 1 as posted information (step S1017). The center server 1 stores the received posted information in association with the channel ID of the channel C1 in the posted information DB 14*d* (step S1018).

It is assumed that the join non-allowance response for the channel C1 is transmitted from the center server 1 to the user terminal 2-2 by the allowable/non-allowable join determination processing in step S1009. In this case, the user terminal 2-2 displays the channel registration screen 1600. In response to the request from the user terminal 2-2, the center server 1 acquires information associated with the channel ID of the channel C1 from the channel DB 14*c*-1 or the posted information DB 14*d*. Also, the center server 1 determines whether the member list associated with the channel ID of the selected channel C1 includes the user. ID of the user U2. Since the member list does not include the user ID of the user U2, the center server 1 transmits the acquired information about the channel C1 and the join status indicating "not joined" to the user terminal 2-2. The user terminal 2-2 displays the in-channel screen 1500-1 based on the information received from the center server 1. Here, since the join status is "not joined", the user terminal 2-2 does not display the posting area 1520. Therefore, the user U2 cannot post information to the channel C1.

As described above, according to the present embodiment, the center server 1 acquires the positional information indicating the position of the user terminal 2. In response to the information code corresponding to the channel being read by the user terminal 2, the center server 1 acquires the region information indicating the region corresponding to the channel from the storage unit 14. When the position of the user terminal. 2 indicated by the acquired positional information is included in the region indicated by the acquired region information, the center server 1 executes processing for giving, to the user of the user terminal 2, a right to post information to the channel. The right allows the user to post information regardless of whether the user terminal 2 is located within the region. In this case, in response to the information code being read by the user terminal. 2 of the user who desires to join the channel, the region information indicating the region corresponding to the channel is acquired. The region corresponding to the channel includes, for example, a place where there is a thing about which information is exchanged in the channel. The user causes the user terminal 2 to read the information code after the user goes into the region, whereby the user is given the right to post information to the channel. The user to which the right is given can post information to the channel regardless of whether the user is located within the region. It is considered that the user goes into the designated region because the user has no less than a certain degree of interest in the thing in the region. Therefore, it is possible to form a channel from users who have no less than a certain degree of interest in the object about which information is exchanged in the channel.

The center server 1 may further acquire the recording date and time indicating the time at which the user terminal 2 has been located at the position indicated by the positional information. When the position of the user terminal 2 is included in the region and the elapsed time from the time indicated by the acquired recording date and time to the time corresponding to the reading of the information code by the user terminal 2 is within the grace period length, the center server 1 may give the posting right to the user. In this case, even after the user leaves the region corresponding to the channel, the user causes the user terminal 2 to read the information code within a predetermined time, whereby the user is given the right to post information to the channel. The user who has shown a high probability of having no less than a certain degree of interest in the thing within the region by going into the region may be given the right to post information to the channel even if the user causes the user terminal 2 to read the information code after leaving the region. However, as time elapses after the user leaves the region, the user's interest in the thing within the region may decline. By limiting the elapsed time from the last indication that the user has been located in the region until the information code is read by the user terminal 2, it is possible to form a channel from users who have no less than a certain degree of interest in the object about which information is exchanged in the channel.

The center server 1 may further acquire the joinable period corresponding to the channel. Also, the center server 1 may give the posting right to the user when the position of the user terminal 2 is included in the region and the time indicated by the acquired recording date and time is included in the acquired joinable period. In this case, the joinable period corresponding to the channel is further acquired. The joinable period corresponds to, for example, time when there is a thing about which information is exchanged in the channel. The user who has entered the region corresponding to the channel, within the period is given the right to post information to the channel. It is possible to form a channel from user who has no less than a certain degree of interest in a certain thing in the specific time.

The center server 1 may identify the channel corresponding to the information code from among a plurality of channels based on one of the plurality of information codes corresponding to the plurality of channels or the channel ID obtained by decoding the information code. The center server 1 may give the user the right to post information to an identified channel among the plurality of channels. In this case, the plurality of channels corresponds to one region, and the information code corresponds to each channel. For example, the region includes a place where there is a thing about which information is exchanged in each channel. After the user goes into the region, the user causes the user terminal 2 to read one of the plurality of information codes corresponding to the plurality of channels, whereby the user is given the right to post information to the channel corresponding to the read information code among the plurality of channels. Therefore, even if one region corresponds to the plurality of channels, the user can obtain the right to post information to the channel desired by the user among those channels.

The center server 1 may acquire the region information indicating the plurality of regions corresponding to the channel. When the position of the user terminal 2 is included in any of the plurality of regions, the center server 1 may give the posting right to the user. In this case, the plurality of regions corresponds to one channel. For example, each region includes a place where there is a thing about which information is exchanged in each channel. After entering one of the plurality of regions corresponding to one channel, the user causes the user terminal 2 to read the information code, thereby giving the user the right to post information to the channel. Therefore, even if the plurality of regions corresponds to one channel, the user can obtain the right to post information to the channel.

The center server 1 may acquire the history of the positional information. The center server 1 may give the posting right to the user when the position indicated by at least on of positional information included in the acquired history is included in the region indicated by the region information. In this case, the posting right is given in consideration of the past position of the user terminal 2 as well. Therefore, even after leaving the designated region, the user can obtain the right to post information to the channel.

9. Ninth Embodiment

Next, a ninth embodiment will be described with reference to FIG. 38. In the present embodiment, when the user terminal 2 goes into the coverage area of the wireless communication from out of the coverage area, the center server 1 acquires from the user terminal 2 the history of positional information while the user terminal 2 is located out of the coverage area, and determines whether the right to post information to a channel can be given to a user. The ninth embodiment is the same as the eighth embodiment in other points.

Even while the user terminal 2 is located out of the coverage area, the user terminal 2 periodically acquires the positional information. Furthermore, the user terminal 2 accumulates the acquired positional information. When the user terminal 2 goes into the coverage area of the wireless communication, the user terminal 2 transmits the history of the accumulated positional information to the center server 1. In this way, the positional information acquisition unit 113 acquires the history of the positional information from the user terminal 2.

Figure 38:
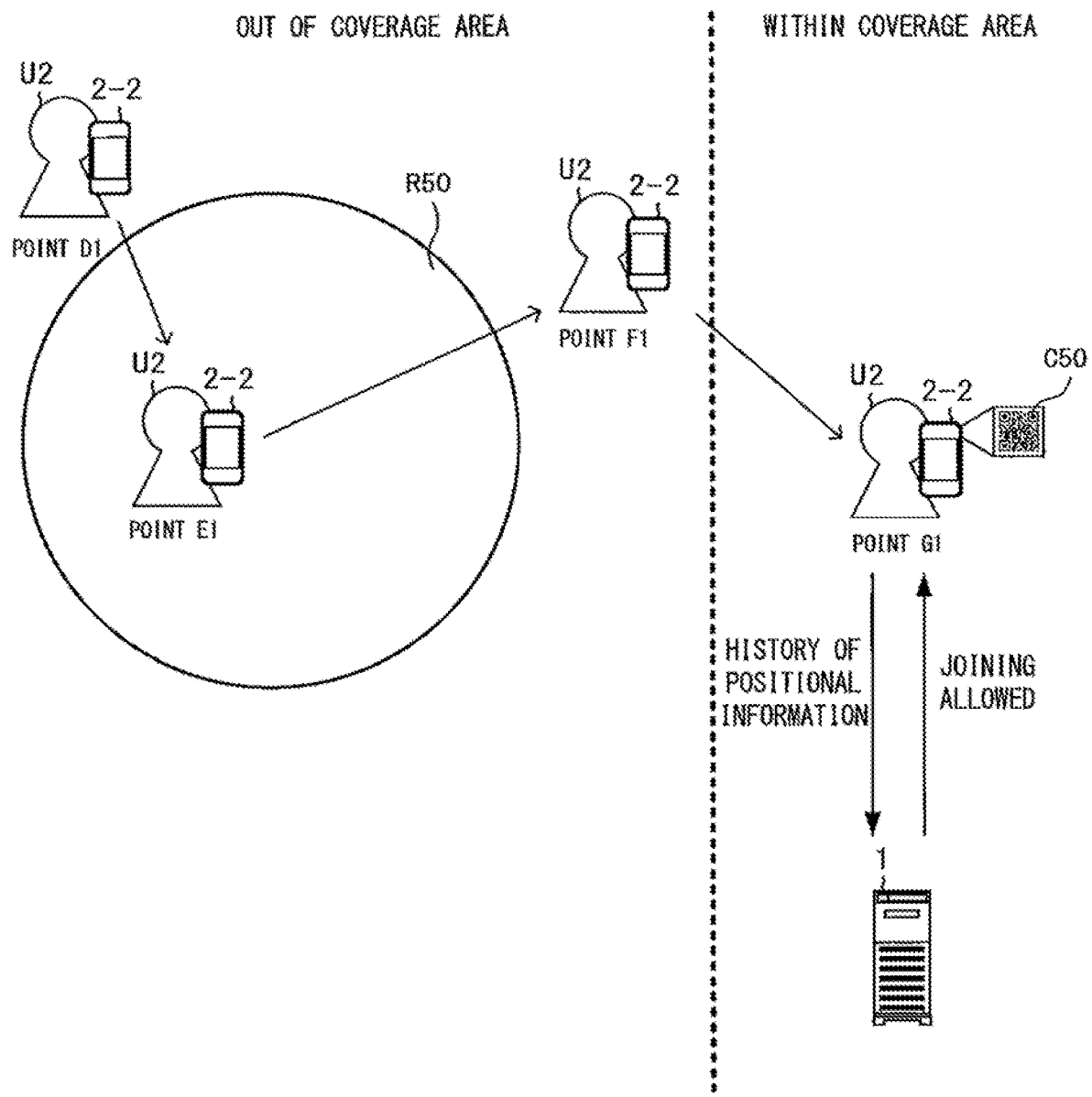
FIG. 38 is a diagram showing one example of how the user behaves until the user joins the channel.

FIG. 38 is a diagram showing one example of how the user behaves until the user joins the channel. As shown in FIG. 38, a region R50 designated for a channel C5 is out of the overage area of the wireless communication. A use. 02 carrying a user terminal 2-2 first moves from a point D1 via a point E1 to a point F1. Among the points D1 to F1, the point D1 is within the region R50. At each of the points D1 to F1, the user terminal 2 acquires positional information. However, since all of the points D1 to F1 are out of the overage area of the wireless communication, the user terminal 2 stores the positional information acquired at each point. Thereafter, the user U2 moves to a point G1. The point G1 is within the coverage area of the wireless communication. Therefore, the user terminal 2-2 transmits the history of the positional information acquired so far to the center server 1. Although the user terminal 2-2 is currently located outside the region R50, the history of the positional information includes the positional information when the user terminal. 2-2 is located at the point E1. Here, when the user terminal 2 causes the user terminal 2-2 to read an information code C50 corresponding to the channel C5, the center server 1 determines that the user U2 can join the channel C5.

As described above, according to the present embodiment, the center server 1 gives the right to post information in consideration of the position when the user terminal 2 is located in a place where the positional information cannot be transmitted. Therefore, even when the region is designated in such a place, the user can obtain the right to post information to the channel.

10. Tenth Embodiment

Next, a tenth embodiment will be described with reference to FIGS. 39 to 41. In the present embodiment, it is possible to create a channel with a region where joining the channel is allowed also moving as a user terminal 2 carried by an establisher moves. The tenth embodiment is the same as the eighth embodiment or the ninth embodiment in other points.

FIG. 39 is a diagram showing an example of information stored in a region DB 14c-2 in the present embodiment. The region DB 14c-2 shown in FIG. 39 is different from the region DB 14c-2 shown in FIG. 3 in that in FIG. 39, region information includes a region type. The region type indicates whether a designated region is a fixed region or a dynamic region. The fixed region is a region that does not move as described in the above embodiments. For the fixed region, the region information includes information indicating the position of the region (for example, latitude and longitude, address, and the like). The dynamic region is a region that moves as the user terminal 2 carried by the establisher moves. When a channel is created, the establisher can select either the fixed region or the dynamic region. When the dynamic region is selected, the establisher may be able to designate the 912 of the region such as the radius of the region. For either the fixed region or the dynamic region, the region information may include information indicating the size of the region (for example, radius).

A channel information registration unit 112 acquires region information including the region type indicating that the designated region is determined based on the position of the user terminal 2 used by the establisher of the channel. The region based on the position of the user terminal 2 used by the establisher usually includes the position of the user terminal 2. For example, the position of the user terminal 2 used by the establisher may be the center point of the region. Examples of a region shape include a circle, ellipse, square, rectangle, and diamond.

A positional information acquisition unit 113 further acquires positional information of the user terminal 2 used by the establisher. Then, the positional information acquisition unit 113 stores the acquired positional information in the positional information DR 14b. In order to designate a dynamic region, the user terminal 2 used by the establisher needs to have a function of acquiring the positional information.

In a case where a user terminal 2 that has read an information code is located in a region determined based on the position indicated by positional information of a user terminal 2 of an establisher acquired by the positional information acquisition unit 113 when the user terminal 2 of the establisher is located at a position indicated by this positional information of the user terminal 2 of the establisher, a posting right giving unit 114 executes processing for giving the user a right to pout information to the channel.

Figure 40:
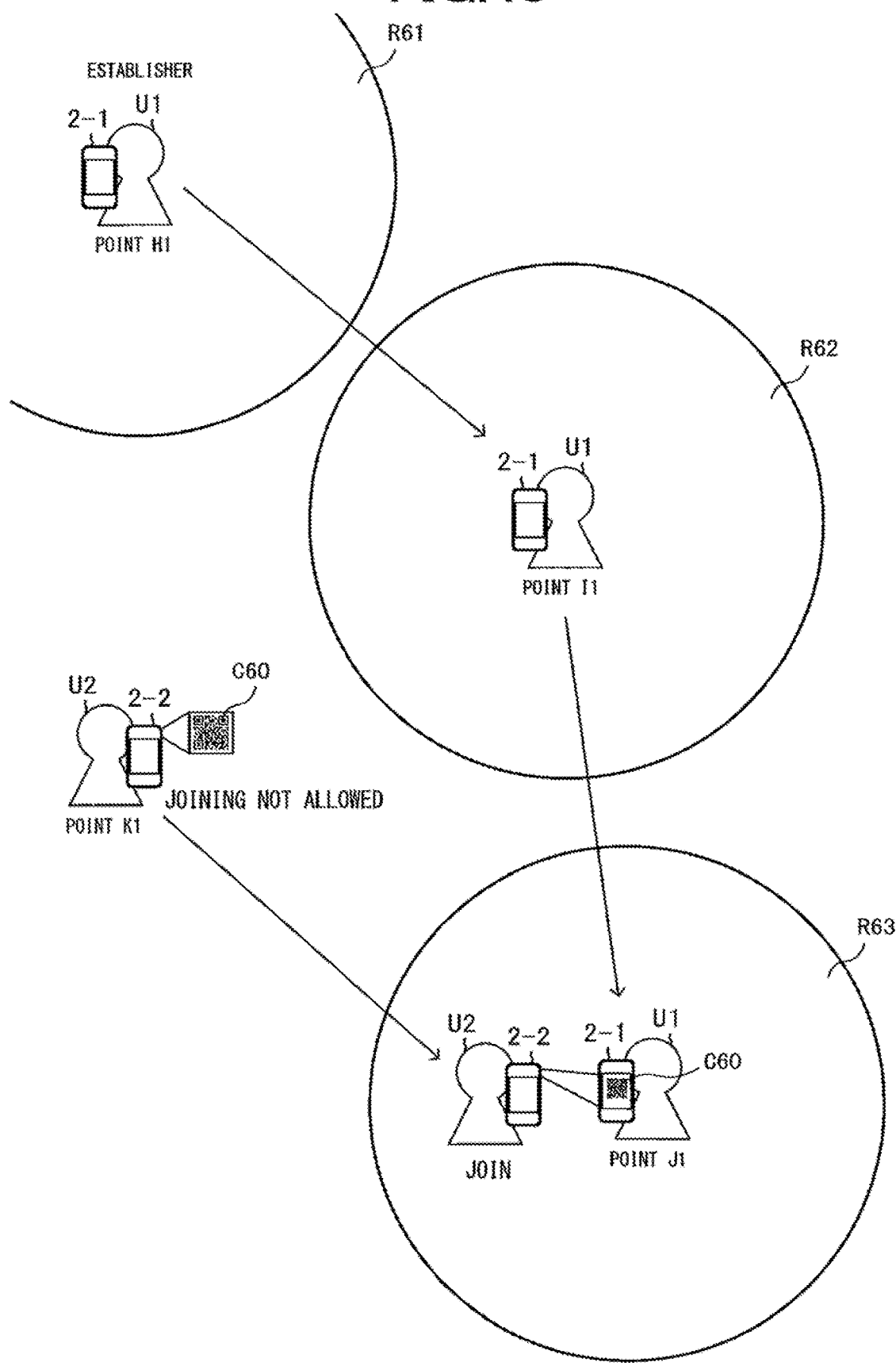
FIG. 40 is a diagram showing one example of how the user behaves until the user joins the channel.

FIG. 40 is a diagram showing one example of how the user behaves until the user joins a channel. For example, an establisher U1 designates a dynamic region in order to create a channel. C related to a parade held in a certain district. As shown in FIG. 40, the establisher U1 carrying a user terminal 2-1 is initially located at a point H1. Thereafter, the establisher U1 moves from the point H1 via a point I1 to a point J1 as the parade moves. In response to this movement, the dynamic region moves to regions R61, R62, and R63. Meanwhile, a user U2 carrying a user terminal 2-2 intends to approach the parade in order to look at the parade. When the establisher U1 is at the point I1, the user U2 is at a point K. Since the point K1 is not included in the region R62, the user U2 cannot join the channel C6. Thereafter, when the establisher U1 is at the point J1, the user U2 moves into the region R63. For example, the establisher U1 causes the user terminal 2-1 to display an information code C60 of the channel C6 in response to a request from the user U2. The user U2 can join the channel C6 by causing the user terminal 2-2 to read the displayed information code C60. The user U2 actually joins a channel at this time. Thereafter, for example, even if the user U2 moves out of the dynamic region as the establisher U1 moves, the user U2 can post information to the channel C6.

FIG. 41 is a flowchart showing one example of allowable/non-allowable join determination processing by the system controller 11 of the center server 1 according to the present embodiment. In FIG. 41, steps the same as steps in FIG. 37 are denoted with the same reference signs.

As shown in FIG. 41, to being with, the region information, the grace period length, and the history of positional information of the user terminal 2-2 are acquired (steps S1101 and S1102). Then, the posting right giving unit 114 determines whether the region type stored in the channel DB 14c-1 in association with the channel ID included in the join inquiry is "dynamic region" (step S1201). When the region type is not. "dynamic region" (step S1201: NO), the posting right giving unit 114 determines whether the position of h the user terminal 2-2 is within the region (step S1103).

On the other hand, when the region type is "dynamic region" (step S1201: YKS), the positional information acquisition unit 113 acquires, from the channel DB 14c-1, an establisher ID associated with the channel ID included in the join inquiry. Then, the positional information acquisition unit 113 acquires logs of the positional information, in the history of the positional information of the user terminal 2-1 stored in the positional information DD 14b in association with the establisher ID, whose recording date and time is within the grace period (step S1202). Then, based on the logs of the positional information acquired in steps S1102 and S1202, the posting right giving unit 114 determines whether the user terminal 2-2 of the user U2 is located within the region determined based on the position of the user terminal 2-1 when the user terminal 2-1 is located at the position indicated by at least one piece of positional information in the logs of the positional information of the user terminal 2-1 of the establisher U1 (step S1203). For example, the posting right giving unit 114 estimates a moving route of the user terminal 2-2 by connecting a plurality of points indicated by the logs of the positional information of the user terminal 2-2 according to the recording date and time by using linear interpolation or the like. For each piece of positional information included in the logs of the positional information of the user terminal 2-1, the posting right giving unit 114 estimates the position of the user terminal 2-2 at the same date and time as the recording date and time included in the positional information based on the recording date and time included in the estimated moving route and the logs of the positional information of the user terminal 2-2. For each piece of positional information included in the logs of the positional information of the user terminal 2-1, the posting right giving unit 114 calculates the distance between the position of the user terminal 2-1 and the position of the user terminal 2-2 at the same date and time. The posting right giving unit 114 determines whether the calculated distance is equal to or lose than the radius included in the region information. When the calculated distance is not equal to or less than the radius for all the positional information of the logs of positional information of the user terminal 2-1 (step S1203: NO), or when the position of the user terminal 2-2 is not within the region (step S1103: NO), the posting right giving unit 114 transmits a join non-allowance response to the user terminal 2-2 (step S1107), and the allowable/non-allowable join determination processing ends.

On the other hand, when the calculated distance is equal to or less than the radius for at least one piece of positional information in the logs of positional information of the user terminal 2-1 (step S1203: YES), or when the position of the user terminal 2-2 is within the region (step S1103: YES), the posting right giving unit 114 determines whether the joinable period is stored in the channel DB 14c-1 (step S1104). When the joinable period is stored (step S1104: YES), the posting right giving unit 114 determines whether the reading date and time is within the joinable period (step S1105). When the reading date and time is not within the joinable period (step S1105: NO), the process proceeds to step S1107.

On the other hand, when the reading date and time is within the joinable period (step S1105: YES), or, when the joinable period is not stored (step S1104: NO), the posting right giving unit 114 transmits the join allowance response to the user terminal 2-2 (step S1106), and the allowable/non-allowable join determination processing ends.

As described above, according to the present embodiment, the region corresponding to the channel moves as the establisher of the channel moves. The user who enters the region is given the right to post information to the channel. Therefore, a channel having a movable thing about which information is exchanged can be formed.

The invention claimed is:
1. A posting right giving device comprising:
at least one memory configured to store computer program code; and
at least one processor configured to access the at least one memory and operate according to the computer program code, the computer program code comprising:
a region information acquisition code configured to cause at least one of the at least one processor to acquire region information indicating a region designated by an establisher requesting creation of a community in which posting information and receiving the posted information via a network are allowed;
a storage control code configured to cause at least one of the at least one processor to store the acquired region information and community identification information for identifying the community in association with each other in a storage;
a positional information acquisition code configured to cause at least one of the at least one processor to acquire positional information indicating a position of a terminal device used by a user different from the establisher while within the region designated by the establisher, wherein the position of the terminal device indicated by the acquired positional information is detected using mobile phone tracking;

a join determination code configured to cause at least one of the at least one processor to determine, in response to a request from the user to join the community identified with the community identification information, whether to allow the user to join the community identified with the community identification information based on whether the stored region information corresponds to the position currently indicated by the acquired positional information; and a processing code configured to cause at least one of the at least one processor to execute, in response to the join determination code determining the position currently detected using the mobile phone tracking and indicated by the acquired positional information is included in the region indicated by the stored region information, processing for causing the user to join the community identified with the community identification information stored in association with the stored region information, wherein the join determination code is further configured to cause at least one of the at least one processor to, based on an initial position indicated by the acquired positional information not corresponding to the stored region information, periodically determine whether an updated position indicated by the acquired positional information corresponds to the stored region information at a time period designated by the establisher, and wherein the processing code is further configured to cause at least one of the at least one processor to execute, based on the updated position corresponding to the stored region information during the time period, the processing for causing the user to join the community identified with the community identification information stored in association with the stored region information.

2. The posting right giving device according to claim 1, wherein the region information acquisition code is configured to cause at least one of the at least one processor to acquire, in response to a request from the user for creation of a second community after the region information and the community identification information are stored in association with each other, second region information indicating a second region designated by the user, the computer program code further comprising:

a screen display control code configured to cause at least one of the at least one processor to cause, in response to the second region indicated by the acquired second region information and the region indicated by the stored region information overlapping each other, the terminal device to display a screen for selecting one of options including the creating the second community and joining the community; and a selection information acquisition code configured to cause at least one of the at least one processor to acquire selection information indicating the selection by the user on the screen displayed on the terminal device, the storage control code is configured to cause at least one of the at least one processor to store, in response to the acquired selection information indicating creating the second community, the acquired second region information and second community identification information for identifying the second community in association with each other in the storage, and the processing code is configured to cause at least one of the at least one processor to execute, in response to the acquired selection information indicating joining the community and the position indicated by the acquired positional information being included in the region indicated by the stored region information, the processing for causing the user to join the community identified with the community identification information.

3. The posting right giving device according to claim 1, wherein the storage is configured to store, for each of created communities including a third community and a fourth community, region information indicating a region designated for a respective community and community identification information indicating the respective community in association with each other, and in response to the position indicated by the acquired positional information being included in a region indicated by region information of each of the third community and the fourth community, the processing code is configured to cause at least one of the at least one processor to prioritize one of the third community and the fourth community over the other based on suitability of the third community to an attribute of the user and suitability of the fourth community to the attribute of the user, and execute the processing for causing the user to join the prioritized community.

4. The posting right giving device according to claim 1, wherein the storage is configured to store, for each of created communities including a fifth community and a sixth community, region information indicating a region designated for a respective community and community identification information indicating the respective community in association with each other, the computer program code further comprises an information display control code configured to cause at least one of the at least one processor to prioritize one of the fifth community and the sixth community over the other based on a distance between the position indicated by the acquired positional information and a region indicated by region information of each of the fifth community and the sixth community, and cause the terminal device to display community information about the prioritized community, and the processing code is configured to cause at least one of the at least one processor to execute, in response to the user selecting the displayed community information and the position indicated by the acquired positional information being included in the region indicated by the region information of one of the fifth community and the sixth community corresponding to the selected community information, the processing for causing the user to join the community corresponding to the selected community information.

5. The posting right giving device according to claim 1, wherein the positional information acquisition code is configured to cause at least one of the at least one processor to acquire a history of the positional information, and in response to the position indicated by at least one piece of the positional information included in the acquired history being included in the region indicated by the stored region information, the processing code is configured to cause at least one of the at least one processor to execute the processing for causing the user to join the community identified with the community identification information.

6. The posting right giving device according to claim 5, wherein
the terminal device is configured to transmit the positional information by wireless communication, and
the positional information acquisition code is configured to cause at least one of the at least one processor to acquire, in response to the terminal device entering a coverage area of the wireless communication from out of the coverage area, the history of the positional information.

7. The posting right giving device according to claim 1, wherein
the region information acquisition code is configured to cause at least one of the at least one processor to acquire the region information indicating that the designated region is a region determined based on a second position of an establisher terminal device used by the establisher,
the positional information acquisition code is further configured to cause at least one of the at least one processor to further acquire second positional information indicating the second position of the establisher terminal device, and
the processing code is configured to cause at least one of the at least one processor to execute, in response to the terminal device being located in a region determined based on the second position indicated by the second positional information when the establisher terminal device is located at the second position, the processing for causing the user to join the community identified with the community identification information.

8. The posting right giving device according to claim 1, wherein
the computer program code further comprises:
a second region information acquisition code configured to cause at least one of the at least one processor to acquire third region information indicating a third region designated by a second establisher requesting creation of a seventh community for at least one member who has joined the community identified with the community identification information;
a second storage control code configured to cause at least one of the at least one processor to store the acquired third region information and second community identification information for identifying the seventh community in association with each other in a second storage; and
a giving code configured to cause at least one of the at least one processor to execute, in response to the position indicated by the acquired positional information being included in the third region indicated by the stored third region information and the user having the right to post information to the community, processing for causing the user to join the seventh community identified with the second community identification information stored in association with the third region information.

9. The posting right giving device according to claim 1, wherein
the computer program code further comprises a third region information acquisition code configured to cause at least one of the at least one processor to acquire, in response to an information code corresponding to the community being read by the terminal device, the region information indicating the region corresponding to the community from the storage, and
the processing code is configured to cause at least one of the at least one processor to cause the user to join the community identified with the community identification information in response to the position of the terminal device indicated by the acquired positional information being included in the region indicated by the region information acquired from the storage.

10. The posting right giving device according to claim 9, wherein
the positional information acquisition code is further configured to cause at least one of the at least one processor to acquire time information indicating the time at which the terminal device is located at the position indicated by the positional information, and
the processing code is configured to cause at least one of the at least one processor to cause the user to join the community identified with the community identification information in response to the position of the terminal device being included in the region and an elapsed time from the time indicated by the acquired time information to a time corresponding to reading of the information code by the terminal device is within a predetermined time.

11. The posting right giving device according to claim 9, wherein
the positional information acquisition code is further configured to cause at least one of the at least one processor to acquire time information indicating a time at which the terminal device is located at the position indicated by the positional information,
the third region information acquisition code is further configured to cause at least one of the at least one processor to acquire period information indicating a period corresponding to the community, and
the processing code is configured to cause at least one of the at least one processor to cause, in response to the position of the terminal device being included in the region and the time indicated by the acquired time information being included in the period indicated by the acquired period information, the user to join the community identified with the community identification information.

12. The posting right giving device according to claim 9, wherein
the storage is configured to store the region information indicating the region corresponding to a plurality of the communities,
the third region information acquisition code is configured to cause at least one of the at least one processor to identify the community corresponding to the read information code from among the plurality of communities based on at least one of a plurality of information codes corresponding to the plurality of respective communities or decoded information obtained by decoding the at least one of the plurality of information codes, and
the processing code is configured to cause at least one of the at least one processor to cause the user to join the identified community among the plurality of communities.

13. The posting right giving device according to claim 9, wherein
the third region information acquisition code is configured to cause at least one of the at least one processor to acquire the region information indicating a plurality of regions corresponding to the community, and
the processing code is configured to cause at least one of the at least one processor to cause the user to join the community identified with the community identification information in response to the position of the terminal device being included in any one of the plurality of regions.

14. The posting right giving device according to claim 1, wherein the computer program code further comprises a post control code configured to cause at least one of the at least one processor to allow the user to post information to the community when the user has joined the community, and to prohibit the user from posting the information to the community when the user has not joined the community.

15. A posting right giving method performed by a computer, the method comprising:
acquiring region information indicating a region designated by an establisher requesting creation of a community in which posting information and receiving the posted information via a network are allowed;
storing the acquired region information and community identification information for identifying the community in association with each other in a storage;
acquiring positional information indicating a position of a terminal device used by a user different from the establisher while within the region designated by the establisher, wherein the position of the terminal device indicated by the acquired positional information is detected using mobile phone tracking;
determining, in response to a request from the user to join the community identified with the community identification information, whether to allow the user to join the community identified with the community identification information based on whether the stored region information corresponds to the position currently indicated by the acquired positional information;
executing, in response to determining the position currently detected using the mobile phone tracking and indicated by the acquired positional information is included in the region indicated by the stored region information, processing for causing the user to join the community identified with the community identification information stored in association with the stored region information;
based on an initial position indicated by the acquired positional information not corresponding to the stored region information, periodically determining whether an updated position indicated by the acquired positional information corresponds to the stored region information at a time period designated by the establisher; and
executing, based on the updated position corresponding to the stored region information during the time period, processing for causing the user to join the community identified with the community identification information stored in association with the stored region information.

16. A non-transitory computer readable medium storing thereon a computer program, the computer program causing a computer to:
acquire region information indicating a region designated by an establisher requesting creation of a community in which posting information and receiving the posted information via a network are allowed;
store the acquired region information and community identification information for identifying the community in association with each other in a storage;
acquire positional information indicating a position of a terminal device used by a user different from the establisher while within the region designated by the establisher, wherein the position of the terminal device indicated by the acquired positional information is detected using mobile phone tracking;
determine, in response to a request from the user to join the community identified with the community identification information, whether to allow the user to join the community identified with the community identification information based on whether the stored region information corresponds to the position currently indicated by the acquired positional information;
execute, in response to determining the position currently detected using the mobile phone tracking and indicated by the acquired positional information is included in the region indicated by the stored region information, processing for causing the user to join the community identified with the community identification information stored in association with the stored region information;
periodically determine, based on an initial position indicated by the acquired positional information not corresponding to the stored region information, whether an updated position indicated by the acquired positional information corresponds to the stored region information at a time period designated by the establisher; and
executing, based on the updated position corresponding to the stored region information during the time period, processing for causing the user to join the community identified with the community identification information stored in association with the stored region information.

* * * * *